United States Patent [19]
Rathbun

[11] Patent Number: 6,138,123
[45] Date of Patent: *Oct. 24, 2000

[54] METHOD FOR CREATING AND USING PARALLEL DATA STRUCTURES

[76] Inventor: Kyle R. Rathbun, 2357 Stonehedge Dr., Apt. E, East Lansing, Mich. 48823

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,705

[22] Filed: Jul. 15, 1997

Related U.S. Application Data

[60] Provisional application No. 60/023,340, Jul. 25, 1996, and provisional application No. 60/022,616, Jul. 26, 1996.

[51] Int. Cl.[7] .................................................. G06F 17/30
[52] U.S. Cl. ......................... 707/201; 707/102; 345/339; 345/800
[58] Field of Search ................................... 707/102, 201, 707/5, 104, 2, 3, 4, 101, 531, 7, 8, 10; 395/800, 200; 364/231, 490, 468; 455/456; 370/381, 389, 256, 406; 711/129, 153, 173, 206; 345/339, 349, 440, 800; 358/1, 18

[56] References Cited

U.S. PATENT DOCUMENTS

| | | | |
|---|---|---|---|
| 5,230,047 | 7/1993 | Frey, Jr. .................................... | 395/182 |
| 5,319,778 | 6/1994 | Catino ....................................... | 707/102 |
| 5,430,869 | 7/1995 | Ishak et al. .............................. | 707/101 |
| 5,475,837 | 12/1995 | Ishak et al. .............................. | 707/101 |
| 5,475,851 | 12/1995 | Kodosky et al. ........................ | 345/339 |
| 5,535,408 | 7/1996 | Hillis ....................................... | 345/800 |
| 5,539,922 | 7/1996 | Wang ....................................... | 455/456 |
| 5,551,027 | 8/1996 | Choy et al. ............................... | 707/201 |
| 5,602,754 | 2/1997 | Beatty et al. ............................. | 364/489 |
| 5,608,903 | 3/1997 | Prasad et al. ............................. | 707/10 |

OTHER PUBLICATIONS

R.G. Gallager et al., "A Distributed Algorithm for Minimum–Weight Spanning Trees", Jan. 1983, *ACM Transactions on Programming Languages and Systems*, vol. 5, No. 1, pp. 66–77.

Richard Weinberg, "Parallel Processing Image Synthesis and Anti–Aliasing", Aug. 1981, *Computer Graphics*, vol. 15, No. 3, pp. 55–62.

Shmuel Zaks, "Optimal Distributed Algorithms for Sorting and Ranking", Apr. 1985, *IEEE Transactions on Computers*, vol. C–34, No. 4, pp. 376–379.

Clyde P. Kruskal, "Searching, Merging, and Sorting in Parallel Computation", Oct. 1983, *IEEE Transactions on Computers*, vol. C–32, No. 10, pp. 942–946.

Carla Schlatter Ellis, "Distributed Data Structures: A Case Study", May 1985, *The 5th International Conference on Distributed Computing Systems*, IEEE Computer Society, Computer Society Press, pp. 201–208.

Ossama I. El–Dessouki et al., "Distributed Search of Game Trees", May 1984, *The 4th International Conference on Distributed Computing Systems*, IEEE Computer Society, Computer Society Press, pp. 183–191.

(List continued on next page.)

*Primary Examiner*—Wayne Amsbury
*Assistant Examiner*—Thu-Thao Havan
*Attorney, Agent, or Firm*—Harness, Dickey & Pierce, P.L.C.

[57] ABSTRACT

Parallel data-structures distribute a given data set to system components by grouping the data set according to ranges. These ranges are sub-divided for distribution into parallel form. A given data value is located by its placement within an appropriate range; the ranges are located by their relationships to each other and the data set as a whole; thus, the ranges are related to each other, the order of the data set is maintained and access is gained to the data set by range. Each range may be distributed to multiple nodes; each node may be contained in a separate data-structure; each separate data-structure may be maintained on a separate system component. The result is a method of creating and using parallel data-structures that may take a wide variety of forms and be used to control data distribution and the efficient distribution of system resources.

36 Claims, 68 Drawing Sheets

OTHER PUBLICATIONS

Raphael Finkel and Udi Manber, "DIB—A Distributed Implementation of Backtracking", May 1985, *The 5th International Conference on Distributed Computing Systems*, IEEE Computer Society, Computer Society Press, pp. 446–452.

W. Daniel Hillis and Guy L. Steele, Jr., "Data Parallel Algorithms", Dec. 1986, *Communications of the ACM*, vol. 29, No. 12, pp. 1170–1183.

Jishnu Mukerji and Richard B. Kieburtz, "A Distributed File System for a Hierarchical Multicomputer", Oct. 1979, *The 1st International Conference on Distributed Computing Systems*, IEEE Computer Society, Catalog No. 79CH1445–6 C, pp. 448–457.

Keki B. Irani et al., "A Combined Communication Network Design and File Allocation for Distributed Databases", Apr. 1981, *The 2nd International Conference on Distributed Computing Systems*, IEEE Catalog No. 81CH1591–7, Computer Society Press, pp. 197–210.

Bruce Lindsay, "Object Naming and Catalog Management for a Distributed Database Manager", Apr. 1981, *The 2nd International Conference on Distributed Computing Systems*, IEEE Catalog No. 81CH1591–7, Computer Society Press, pp. 31–40.

Ajay K. Gupta et al., "Load Balanced Priority Queues on Distributed Memory Machines", Western Michigan University Research, Fellowship from the Faculty Research and Creative Activities Support Funds, WMU–FRCASF 90–15 and WMU–FRACASF 94–040 and National Science Foundation, Grant No. USE–90–52346.

Elise de Doncker et al., "Two Methods for Load Balanced Distributed Adaptive Integration", Department Computer Science, Western Michigan University, National Science Foundation, Grant No. CCR–9405377.

Elise de Doncker et al., "Use of ParInt for Parallel Computation of Statistics Integrals", Department Computer Science, Western Michigan University, National Science Foundation, Grant Nos. CCR–9405377 and DMS–9211640.

Elise de Doncker et al., "Development of a Parallel and Distributed Integration Package—Part I", Department Computer Science, Western Michigan University, National Science Foundation, Grant No. CCR–9405377.

METHOD FOR CREATING AND USING PARALLEL DATA STRUCTURES

CROSS-REFERENCE TO RELATED APPLICATIONS

This application claims priority under 35 U.S.C § 119(e) to the following related provisional applications: Ser. No. 60/023,340, filed Jul. 25, 1996 and Ser. No. 60/022,616, filed Jul. 26, 1996.

BACKGROUND OF PROBLEM AND SOLUTION

In recent years, the need for more computational power and speed in computer systems has lead to the use of multiple processors to perform computational tasks. The processors work cooperatively, sharing resources and distributing work amongst themselves by sending data over communication lines or through shared memory. This practice of utilizing multi-processors to accomplish a single task is known as parallel processing or distributed processing. Although the terms parallel and distributed may describe distinct forms of multi-processing, they are in essence synonymous. The problems described and solved by the present invention apply equally to parallel and distributed processing. In addition, these problems/solutions apply to any component or aspect of a computer system to which work may be distributed amongst multiple components, even in non-parallel systems: one such "non-parallel" application described herein is the use of the present invention to manage dynamic access storage devices (DASD) such as disk drives [see section *Rules for Fullness and Ordering Scheme for B-trees Stored on Disk*].

Dividing work amongst multi-processors in such a way that the work is divided evenly and performed in an efficient manner is the goal of parallel/distributed processing, and dividing work amongst multiple system components equally and efficiently is also desirable in sequential (single-processor) systems. Many well-known sequential methods, systems or processes exist to efficiently perform computational tasks (sorting, merging, etc.). Their parallel counterparts have yet to be invented. Some new parallel methods are parallelized versions of existing sequential methods, for example, the parallel recursive merge-sort [see "Introduction to Parallel Methods" by Joseph JaJa, Addison-Wesley, 1992]. The invention described herein is a method of creating parallel data-structures. The preferred embodiment of the present invention parallelizes single-processor, ordered list methods to efficiently distribute the work and storage for ordered list maintenance amongst multiple processors, processing components and/or storage locations: this ordered list maintenance is carried out through adapted versions of single-processor data-structures expressed as graphs (B-trees, AVL trees, linked-lists, m-way trees, heaps, etc.).

DISCUSSION OF PROBLEM AND PREFERRED EMBODIMENT

The goal in parallel processing is to utilize a number of processors (P) to increase the system's speed and power by a factor of P: optimally, a task requiring time T on a single-processor can be accomplished in time T/P on P processors. The problem is the even distribution of work amongst the P processors. Many new methods have arisen from the field to efficiently distribute the work for standard computational tasks (e.g. sorting, merging, etc.). One standard task is the maintenance of ordered lists of data: many methods exist for single-processor systems to accomplish ordered list maintenance; the problem described and solved herein is the efficient distribution of work amongst multi-processors to accomplish efficient ordered list maintenance. (The term "ordered list" includes many data-structures: sorted lists, heaps, stacks, trees, etc.).

In general (regardless of the type of system keeping the lists), the maintenance of ordered lists consists of two basic operations: Insert() and Remove() (Search()/Find() is implied.). Insertion into the lists requires that an element of data be added to the list and that its position within the list be defined. Assuming the ordered list {5,12,46,67,80,99}, the Insertion (Insert(x)) of the numeric element 35 (Insert (35)) results in the list {5,12,35,46,67,80,99}. Removal (Remove(x)) of an element can take several forms: removal by location, by value, by range of values, etc. Again, assuming the list {5,12,46,67,80,99}, Removal of the fourth (4th) element results in {5,12,46,80,99}, Removal of the value 12 results in {5,46,67,80,99}, Removal of the smallest element greater than 50 results in {5,12,46,80,99}. The Remove operation is considered to return the value of the removed element for use, if present, or to return the information that a specific value is not contained in the list, if not present.

The problem presented and solved in the preferred embodiment is the parallelizing of the list maintenance described above. The essential functioning of the list remains the same in the parallel version of the data-structure. The Insert(x) and Remove(x) operations produce the same results. However, on a single-processor system these operations are performed by one processor which can only Insert or Remove one element at a time; on a multi-processor system with P processors, the parallel version of the method can Insert and/or Remove P elements at a time as described below.

Assuming a multi-processor system with 3 processors (P=3), and also assuming a list containing the elements {4,13,14,20,28,34,39,43,53,67,76,81} we have the following parallelized result: each processor keeps approximately one-third of the elements at any given time; each processor may Insert(x) into its own sub-list at any given time (possibly sending the element x to one of the other processors for Insertion into one of the other sub-lists); each processor may Remove(x) from its sub-list at any time and may request that other processors attempt to locate element x in their sub-lists if x is not present in the original processor's sub-list; any other processor finding x in its sub-list then sends x to the original processor.

The sub-lists are distributed in this example by cutting the list into equal thirds. This manner of distribution is for the purpose of a generalized example only. The Example given in this section is intended to introduce the reader to the problem in the most generalized manner possible; the Example here contains none of the specific details of the parallel method.

The Parallel List

Processor #1 (P1) keeps one-third of the elements:
  Sub-list S1={4,13,14,20}
Processor #2 (P2) keeps one-third of the elements:
  Sub-list S2={28,34,39,43}
Processor #3 (P3) keeps one-third of the elements:
  Sub-list S3={53,67,76,81}
Insertion into the Parallel List
The elements 72, 22, and 12 are to be Inserted. All three processors simultaneously perform the Insertion giving the results:
Processor #1 (P1): Insert(72)—sends element 72 to P3, receives element 12 from P3

Sub-list S1={4,12,13,14,20}

Processor #2 (P2): Insert(22)—inserts element 22 directly into its sub-list (S2)

Sub-list S2={22,28,34,39,43}

Processor #3 (P3): Insert(12)—sends element 12 to P1, receives element 72 from P1

Sub-list S3={53,67,72,76,81}

Removal from the Parallel List (List Contains Elements from Insertion Above)

The values 37, 28 and 13 are to be found and Removed. All three processors simultaneously perform the Removal, giving the results:

Processor #1 (P1): Remove(37)—requests another processor to find 37 and receives reply from P2 that the element 37 is not present, receives request for element 13 from P3 and Removes 13 from the list.

Sub-list S1={4,12,14,20}

Processor #2 (P2): Remove(28)—removes 28 directly from the list, replies "37 not present" to P1

Sub-list S2={22,34,39,43}

Processor #3 (P3): Remove(13)—requests another processor to find 13, receives 13 from P1

Sub-list S3={53,67,72,76,81}

It must be stressed that the example above is a generalized example intended to explain the basic logical functionality of the problem. The precise details and organization of parallelized lists are described in subsequent sections.

The essential functioning of an ordered list is described above; however, many different forms of lists are used on modern systems, and many different types of data may be stored. Efficient methods/data-structures are used to maintain such lists on single-processor systems: heaps, binary trees, AVL trees, B-trees, etc which are well known in the art. (For descriptions of such methods/data-structures see "File Structures Using Pascal" by Nancy Miller, The Benjamin/Cummings Publishing Co., Inc. (1987)). The methods used on modern systems were designed to function on single-processor systems efficiently. This efficiency is expressed by asymptotical time-complexity functions. The functions are generally expressed in terms of n in the form $O(f(n))$ [e.g. $O(\log_2 n)$ or $O(n^2)$]. For the problem to be truly solved, a parallel version of a list maintenance method must distribute the work amongst the P processors efficiently so that the time-complexity approaches optimum improvement (speedup). Perfect speedup for a given parallelized method would be $O(f(n)/P)$.

SUMMARY

The present invention is a means to create parallel data-structures and associated maintenance programs. The data-structures and programs may take a variety of forms, all using the same essential steps and components. The parallel data-structures distribute a given data set to system components by grouping the data set according to ranges. These ranges are sub-divided for distribution into parallel form. A given data value is located by its placement within an appropriate range; the ranges are located by their relationships to each other and the data set as a whole; thus, as the ranges are related to each other, the order of the data set is maintained and access may be gained to the data set by range, and as the data values are related to the ranges, the data values themselves may be maintained as well.

In order for a data set to change, the values or the relationships between the values must change. The present invention allows this change by altering the ranges or the relationships between the ranges and thereby altering the values or relationships between values. Altering a range may alter the sub-set of data contained by the range, and this range alteration may then be used to re-distribute data values and maintain appropriate sizes and locations for the data sub-sets. The maintenance of the ranges, sub-sets and data value distribution within the sub-sets offers a wide variety of possible over-all distributions of data sets and methods of maintaining order. Some of these distributions and methods are parallel forms of serial data-structures.

The present invention offers many advantages including: a flexible means to create a wide variety of parallel data-structures rather than simply defining a single instance of a particular parallel data-structure; flexible methods of distributing data within a structure for efficiency; the ability to create parallel versions of serial data-structures that maintain the essential efficiency and express the essential form of the serial data structures without significant alteration of the principles or methods that underlie the serial data-structures.

OBJECTS AND ADVANTAGES

One object of the method of creating data-structures is to distribute work and storage to multiple system components. The method can accomplish the distribution of work by allowing simultaneous access to multiple parallel nodes, graphs or indexes by multiple processing elements in a flexible manner. It can accomplish the distribution of storage by distributing multiple parallel nodes to multiple storage locations.

Another object is to provide the ability to distribute data more evenly. A data set with a skewed distribution may be more evenly distributed by breaking the data into sub-sets. Each sub-set may be distributed evenly while all of the sub-sets taken together still express the original distribution of the data set.

An advantage of the method when used to transform serial data-structures into parallel form is that the original structure of the serial algorithm can be expressed without altering the essence of the algorithm.

Another advantage is the wide range of possible structures created. Many serial data-structures may be adapted using the same principles as well as many new parallel data-structures created.

Another advantage is the use of various components of the method to refine the functioning, data distribution, work distribution and efficiency of the data-structures and associated maintenance programs through the characteristics of the rules that support the various components. For only one example, see the *Rules for Fullness and Ordering Scheme for B-trees Stored on Disk* section contained herein.

Still other objects and advantages will become apparent through a consideration of the other descriptions of the invention contained herein.

PREFERRED EMBODIMENT

Introduction

The preferred embodiment of present invention relates to a process of creating parallel data-structures which adapts sequential data-structures and their associated processing programs for use in parallel or distributed environments. The invention achieves this by creating parallel data-structures that are identical in form and function to the sequential data-structures in a parallel environment. The adapted parallel data-structures and methods can be used in the same way as their sequential counterparts but in a parallel environment. The sequential data-structures which are adapted must have configurations determined by the orderable qualities of the data contained in the data-structures. The sequential data-structures and their associated maintenance programs generally have three functions in common: Find(), Insert() and Remove() functions.

Figure 58:
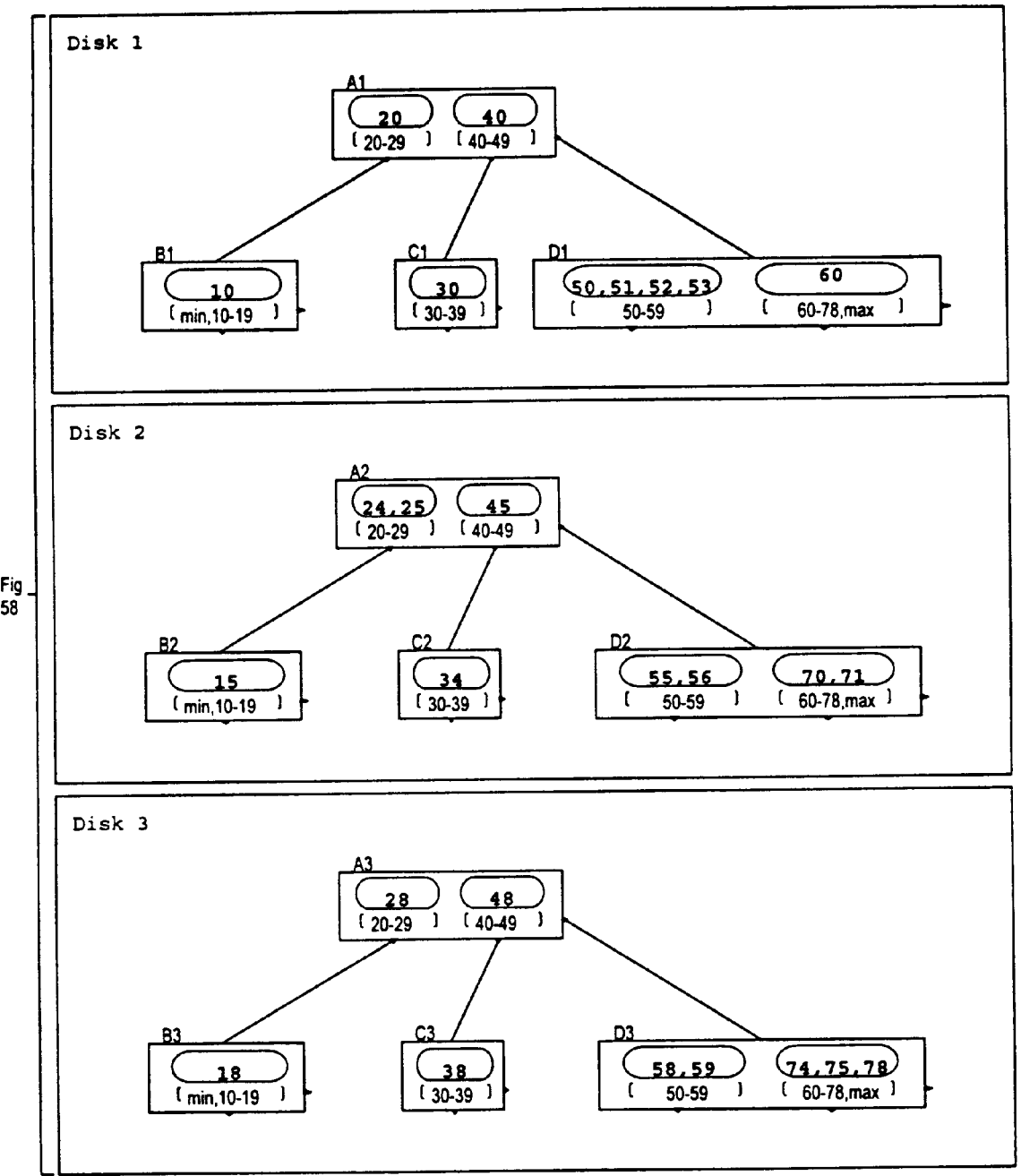
FIG. 58 B-tree of FIG. 55 after another addition of elements.
Figure 68:
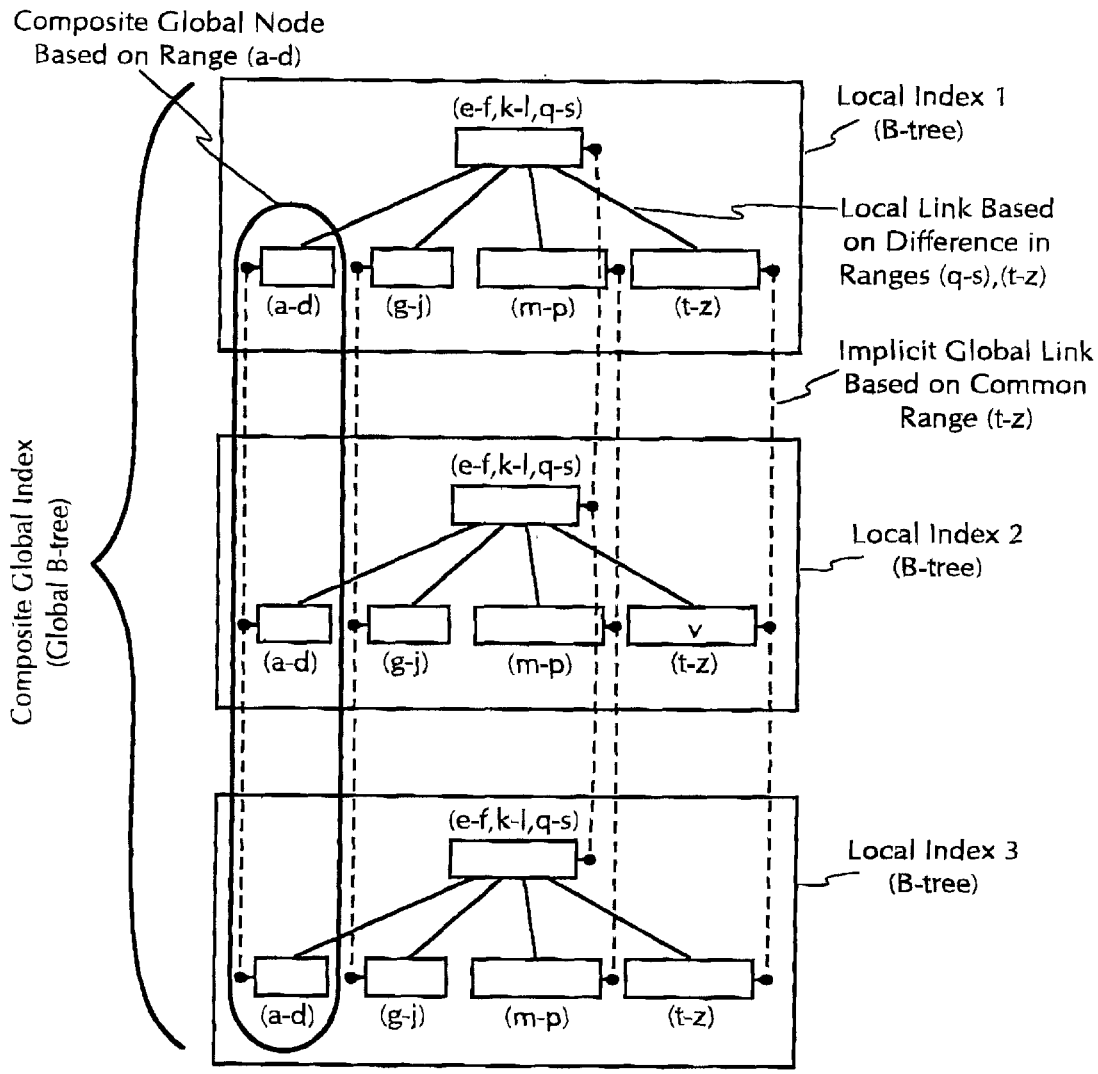
FIG. 68 is a block diagram illustrating the principles of the invention.

FIG. 58 depicting applicant's parallel indexing method. FIG. 68 depicts composite Global Index comprising three local indexes; one of the five composite global nodes is circled and labeled (a–d); figure shows common structure and access methods for all indexes, common ranges on all indexes, local links based on range difference, global links based on range commonality, and storage of one value "v" on index 2 in Range (t–z). A query on the value "V" can originate on any index 1, 2 or 3 equivalently. Assuming the query starts on index 1, the request may be shunted immediately to either index 2 or 3 if the processor for index 1 is busy: indexes 2 and 3 could also pass control to any other local index. The query travels down the rightmost local link on the controlling processor, locating the range (t–z) as the range to hold v; in the preferred embodiment, index 2 is immediately calculated as the specific index to hold V within the range (t–z) by virtue of its being the center of range (t–z) If index 2 does not already have control, the query then traverses the rightmost global link to index 2 at range (t–z) and index 2 accesses the range and thereby the value within (v), This process produces at least three different paths to v chosen dynamically at query time; if the query started on local index 2, then it requires 2 accesses ( 1 at the root plus 1 at the local node (t–z); if it started on either local index 1 or 3, then it requires 3 accesses ( 2 for the local index plus 1 at index 2 ).

In the parallel data-structures, each processor may contain multiple elements at any position v within the structure. The number of elements contained at position v is determined by the Rule for Fullness and Ordering Scheme for the given parallel data-structure. The simplest Rule and Scheme allow zero (0) through two (2) elements per processor to be contained at any position v. Such a simple Rule and Scheme are assumed for the introduction and any other section of this application unless otherwise stated.

In the Insert() function, for sequential data-structures, the insertion of an element y [Insert(y)] results in the placement of the element y in the sequential data-structure at some position V. The position v is determined the element y's orderable or ordinal relationship to the other elements and the positions of the other elements in the data-structure. The position v is determined by the "rule for insert" for the given sequential data-structure. Position v is also determined by the rule for insert in the parallel data-structure: each processing element creates a configuration for the data-structure identical to the configurations at all other processing elements.

Using the Rule for Fullness and Ordering Scheme mentioned above for parallel data-structures, each processor may contain as many as two elements $y_1$, and $y_2$ at position v. Consequently with P identical data-structures, one at each processor, there exist in total $1 \leq n \leq (2P-1)$ elements $y_{ij}$ ($1 \leq i \leq P$) ($1 \leq j \leq 2$) at all positions v, taken cumulatively. Any processor i ($1 \leq i \leq P$) may insert any element y into the parallel data-structure, and the element y will be placed at position v in one of the data-structures held by one of the processors. Although this may result in different configurations for the sequential and parallel versions of the structures, the essential relationships between the data elements in the data-structures will remain the same for both versions of a given data-structure.

The Remove() function for sequential data-structures has one of two forms. A Remove() according to position finds an element in a given position in the data-structure and removes the element. A Remove() according to value, searches the data-structure for a given value of y and removes the element. In both cases, the data-structure may be re-ordered to compensate for the absence of the removed element. In an adapted parallel version of a given data-structure, any or all of the processors may execute a Remove(y) function appropriate to the sequential data-structure with the same result.

For parallel inserts and removes, a given processor simply locates the position v in the data-structure either by position or value. Multiple processors may then cooperate to search for a desired data element y within position v. The processors search through the $1 \leq n \leq (2P-1)$ elements at the positions v at all processors i ($1 \leq i \leq P$) in parallel. If the removal of an element y at position v leaves position v sufficiently empty, then each processor re-orders its data-structure according to the missing position v corresponding to the element y in the same way that the sequential method would. If the addition of an element y requires more nodes to contain the larger data set, then each processor re-orders its data-structure according to an additional position w corresponding to the element y in the same way that the sequential method would.

Preferred Embodiment—Uses of Data-Structures

The uses of the adapted parallel versions of the data-structures and maintenance programs are the same as the uses of their sequential counter-parts, only in a parallel environment. The speedup of the parallelization brought about by the present method is very efficient and justifies its design.

Preferred Embodiment

Definitions

Many terms must be defined to adequately describe the Process of Adaptation.

At Will (Implies Blind)—an activity that a processor may perform at any time regardless of the activities of other processors;

Blind (Blindly)—Activities performed by a processor or set of processors with no cooperation from other processors;

Cooperative (cooperatively)—activities performed by a set of processors that require communication and/or coordination between processors;

Data-structure—an organization or method of organization for data. Preferably, the data-structures are based (form or configuration and functioning) on orderable data; e.g. heaps, B-trees, binary search trees, etc.;

Defined G-node: See G-node

Element—a single data-value within a data-structure. Each element may be of any type (e.g. integer, real, char, string, enumerated, pointer, record, or other). The elements must all relate to each other in some orderable fashion;

Element Deletion—Removal of an element from a G-node;

Element Addition—Insertion of an element to a G-node;

Explicit G-node Range—see G-node Range

Global—all of the processors;

G-node (Global Node)—a set of P(number of processors) P-nodes. Each G-node contains 0<n<(xP) elements (x=Max number of elements in each P-node). In the preferred embodiment, each P-node in a G-node occupies the same position in each per-processor data-structure. Each P-node in a G-node contains the G-node Range of that G-node. The G-node functions in the parallel method in the same way an S-node functions in the corresponding sequential method. The G-node uses the G-node Range to relate to the other G-nodes. G-nodes are created simultaneously with the P-nodes which are contained in the G-node.

G-nodes have the following properties: each has a G-node Range; all the G-nodes in a parallel data-structure may become full or empty or partially empty; when a G-node becomes full, it is Split; when a G-node becomes sufficiently empty, it is deleted. The determination of when a G-node is full or sufficiently empty depends on the Rule for Fullness for the G-node. Each G-node is composed of P sets of data elements within the G-node Range; each of the P sets may contain from 0 to X elements. A Defined G-node is a G-node with a fully defined G-node Range. An Undefined G-node has a G-node Range with one or more boundaries left open or undefined.

G-node removal—deletion of a G-node from the data-structure; this effectively removes old G-node Ranges from the data-structure;

G-node insertion—Addition of a G-node from the data-structure; this effectively adds new G-node Ranges to the data-structure;

G-node Range—The G-node Range is the range of values that the G-node may contain, in the preferred instance, a set of two values $R(G_{oio})=\{R(g_{oi1}), R(g_{oi2})\}$ that are the minimum and maximum values of the elements which may be contained in the G-node G. The G-node Range determines the proper placement of the G-node within the parallel data-structure and thereby determines the proper placement of an element or P-node within each per-processor data-structure;

The G-node is stored across multiple processors, but the G-node Range uses the same range for each component of the G-node on each processor. The Range is stored with the G-node. The Range may be stored either explicitly or implicitly: explicit storage of the G-node Range is the listing of the values that define the range; implicit storage would be the storage of one or more values from which a range could be calculated.

G-node Split—A G-node Split occurs when a G-node becomes full. The Splitting process divides all of the values contained in the G-node into two roughly equal sets X and Y with distinct ranges. One set X remains in the G-node, the other set Y is stored in a newly created G-node. The G-node Ranges of the two nodes are set according to the division of the sets X and Y. The G-node Split is a method of adding new G-nodes to the set of G-nodes comprising the parallel data-structure; by virtue of the G-node Range as the basis for this process it is also a range addition method.

Implicit G-node Range—see G-node Range

Link—representation and reference to the relationship of adjacent nodes;

MAXVAL—Maximum possible value (oo)

MINVAL—Minimum possible value (-oo)

Ordering Scheme—The manner in which data elements are arranged within a G-node. May be ascending, descending, partially or fully sorted, completely unordered in addition to many other arrangements. Different Schemes may be defined for different data-structures. Schemes may be defined to provide efficient access paths, efficient data distribution, proper placement of an element into an appropriate P-node within a G-node, or other provisions;

Ordinable—data that has the capacity to be ordered;

P—number of processors on a parallel machine or distributed network;

Parallel—processes or entities performed or existing on multiple processing or memory storage units, designed to perform or exist on multiple processors or system components, or having a structure that lends itself to similar distribution;

Parallel Data-structure or Global Data-structure—the data-structure that results from applying this process of adaptation to a sequential data-structure. A parallel or Global data-structure is composed of a set of P sequential data-structures each of which is composed of a set of P-nodes and incident links. The P-nodes and links form precisely the same configuration on each processor.

Partially Defined G-node: See G-node

Partially Undefined G-node: See G-node

Per-processor—sequential activities on a processor or on a set of processors: this term conceptually divides a parallel entity or process into its sequential parts and refers to each processor's activity separately;

P-node (Parallel Node) an adaptation of an S-node. A P-node contains 0 to n elements which fall into its G-node Range. In addition, a P-node relates to the other P-nodes in the data-structure not only by the value of the elements contained in the P-node but also by the P-node's G-node Range which is contained in each P-node and determined by the G-node to which the P-node belongs. Each P-node in a data-structure is part of a G-node. When converting an S-node into a P-node, extra links are not added for the extra elements. The rules for relationships between P-nodes on a processor are the same as the rules for relationships between the S-nodes of the sequential data-structure from which the parallel version was derived with respect to G-node Ranges. Except for P-nodes created at the very beginning of the process, P-nodes are generally created through the splitting of G-nodes;

Processor—a processing element or CPU with or without its own local memory in a parallel or distributed environment. The processors are all interconnected in the parallel machine or network by communication lines or by shared memory. Also used to refer to any system component to which work may be distributed.;

Range Relation Function—This function R() determines how G-node Ranges relate to each other (i.e. less than, greater than, equal to, subsets of, supersets of each other, etc.);

Range Determination Rules—these rules determine ranges for the data: in the preferred instance, the range is based on data placement (the number, value, distribution and/or positions of element values for splits); however, ranges may also be set to force a change in the data placement, or set according to other criteria;

Rule for Fullness—The rule by which the fullness or emptiness of a G-node is determined. Full G-nodes are split; empty G-nodes are removed. Different Rules may be defined for different data-structures. The goal in setting the rules for determining the fullness of G-nodes is to make the most efficient use of space, and processing time. The Rule for Fullness expresses and may be used to maintain: range or G-node fullness, emptiness, range breadth (narrowness or broadness), density and distribution of data values within data structures, etc.;

Rule for Insert (Also referred to as Rule for Remove and Rule for Positioning Nodes)—the ordinal or orderable relationships between the data elements contained in the nodes of a given data-structure; especially in the Insert() and Remove() functions of sequential programs and data-structures and the same functions (with respect to G-node Ranges) for their parallel counterparts;

Sequential or Serial—processes or entities performed or existing on a single processor or designed to perform or exist on a single processor;

S-node (Sequential node)—a single cell within a sequential data-structure that contains a single element. Each S-node relates to its adjacent nodes or to the rest of the data-structure according to the ordinable relationships between the element the node contains and the elements contained in the other nodes;

Preferred Embodiment

Symbols

Data-structures—Sets of nodes containing elements, and incident links.

Elements An element is a single piece of ordinable data. Elements are generally depicted in one of two ways: 1. An element may be thought of as having a constant value; such an element usually belongs to a set that contains members with single subscripts: $(w=\{w_1, W_2, W_3, \ldots W_n\})$; 2. An element may also be referenced by its position in a data-structure; these are usually referenced by the subscripted cell letters to which they belong: $(x=\{x_{111}, x_{112}, x_{121}, x_{122} \ldots \}$ Elements are also frequently depicted as their actual values, both in set and graphical form.

G-node Ranges : A G-node Range is considered consistent over the entire G-node, and therefore has the same kind of notation at each P-node. Because the actual values of the range may be explicit or implicit, the Range is indicated by a function reference [R(G-node)]. The parameter G-node is expressed in the manner appropriate to the given example. If the function receives an element parameter, it may then be used to compare the element to ranges to determine proper placement of the element. The function R() may be called by any processor and may use any other additional parameters needed to calculate the Range. In the preferred instance, the result is a minimum and maximum value allowable for the P-node and/or G-node: $R(A_{oio)=\{R(a_{oi1})},R(a_{oi2})\}=$ {minimum, maximum}; the naught in the third position may generally be replaced with a 1 or a 2 indicating the limits of the Range; most G-node Ranges consist of two values. Example (for integer type elements): G-node $T_{o5o}$, has G-node Range $R(T_{o5o})=\{R(t_{o51}), R(t_{o52})\}=\{75, 116\}$; this means that G-node $T_{o5o}$ a may contain elements between 75 and 116 in value and still be consistent with the data-structure rules. On diagrams, G-node Ranges are depicted parenthesized under the P-nodes (G-nodes) to which they apply.

Figure 1:
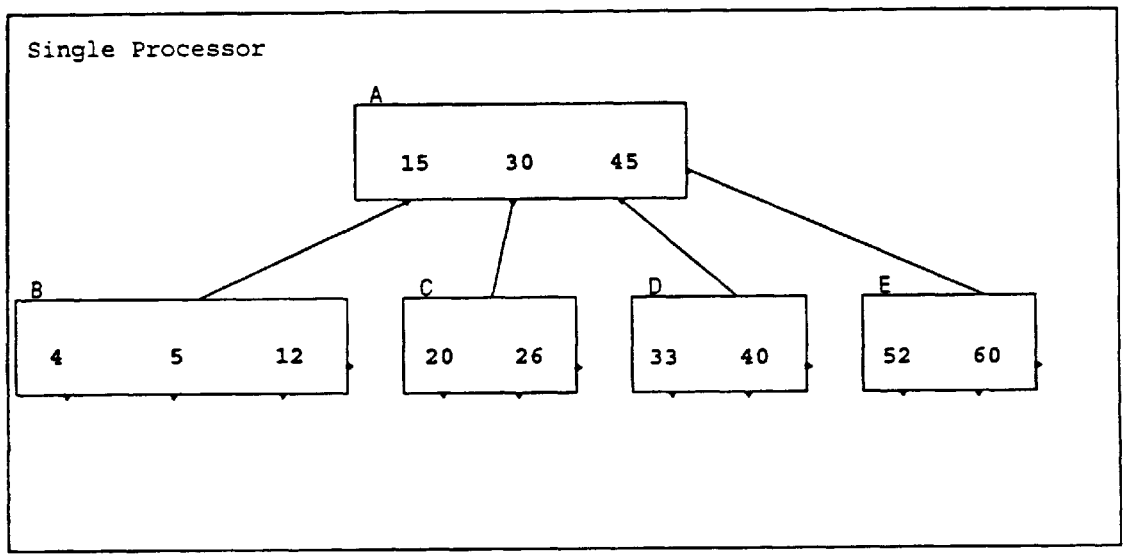
FIG. 1 shows serial b-tree.
Figure 2:
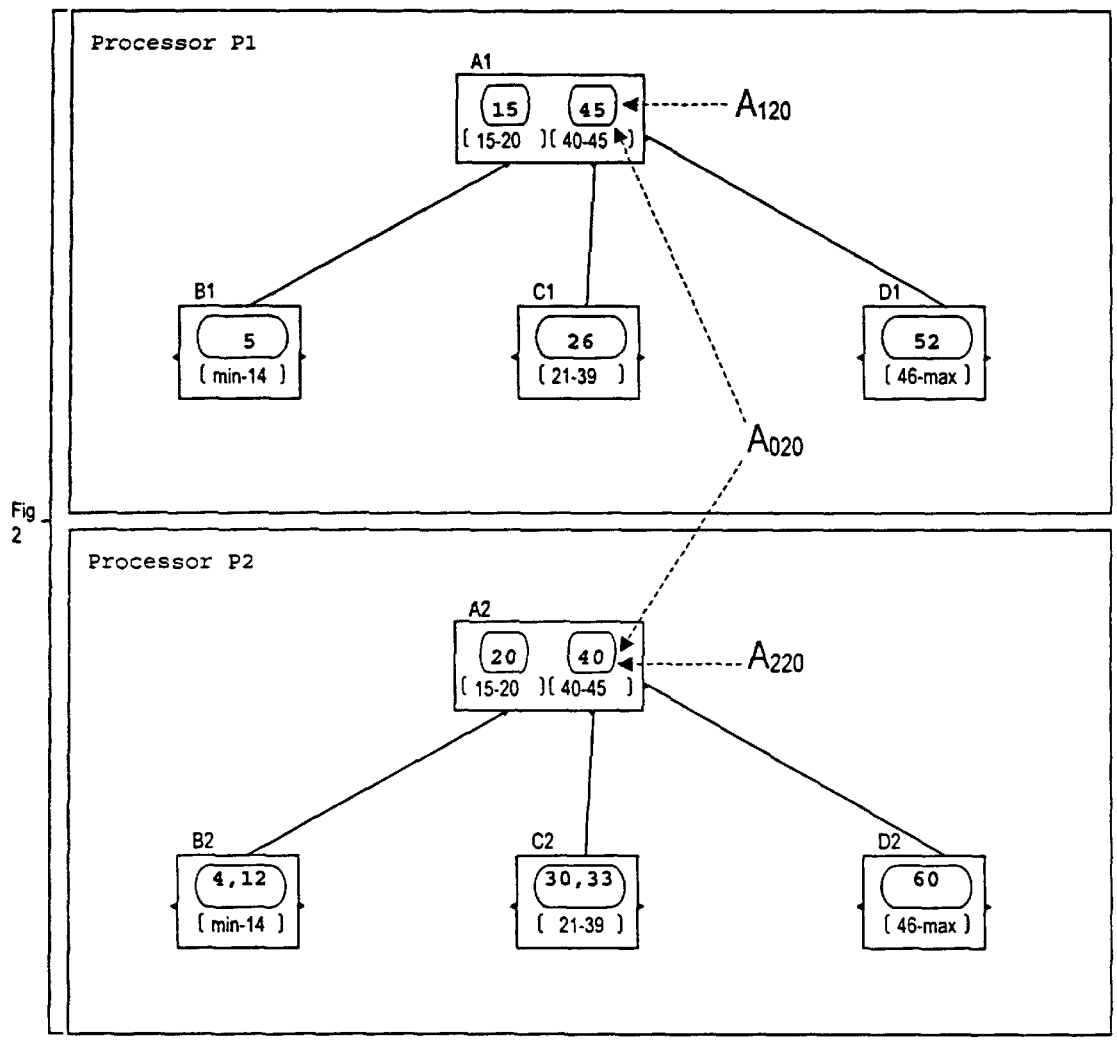
FIG. 2 shows parallel b-tree on two processors with indication of G-node and P-nodes for preferred embodiment.

G-nodes—a set of P-nodes related by their G-node Ranges. If the processor number subscript and the element number subscript of a set member are naught, then the representation is of a G-node. The set T as a set of G-nodes: $T=\{t_{o1o}, t_{o2o}, t_{o3o}, t_{o4o}\}$ The graphical representation of a G-node is rather unique, being distributed amongst processors around the page. FIGS. 1 and 2 contain the same set of data values on a serial b-tree and a parallel b-tree respectively. FIG. 2 contains five (5) G-nodes: $A_{o1o}, A_{o2o}, B_{o1o}, C_{o1o}, D_{o1o}$. Assuming the parallel B-tree in FIG. 2 contains the set S of integer data elements, we depict the set S as data-structure nodes, G-nodes, and P-nodes: $S=\{A, B, C, D\}=\{\{A_{o1o}, A_{o2o}\}, \{B_{o1o}\}, \{C_{o1o}\}, \{D_{o1o}\}\}=\{\{\{A_{11o}, A_{21o}\}, \{A_{12o}, A_{220}\}\}, \{B_{11o}, B_{21o}\}, \{C_{11o}, C_{21o}\}, \{D_{11o}, D_{21o}\}\}$. G-node $A_{o2o}$ comprising P-nodes $A_{12o}$ and $A_{22o}$ is identified in FIG. 2.

P-nodes—assume a number (P>1) of processors: P-nodes assume multiple elements; P-nodes have three(3) subscripts (processor-number, node-number, element or cell number). A P-node has multiple cells for elements; when the element-number subscript is specified, the reference is to a specific cell within the P-node; when the element-number subscript is naught (o), the reference is to the entire P-node. Reference to P-node cells: (on processor1) $T=\{t_{111}, t_{112}, t_{121}, t_{122}, t_{131}, t_{132}\}$; Reference to P-nodes: $T=\{t_{110}t_{120}, t_{130}\}$. For greater convenience, P-nodes may be identified by a node letter and non-subscripted processor number (e.g. A1, A2, B1, B2, etc.) See G-nodes.

Sets—S, P, G-nodes and sets of elements. Sets are designated by upper case letters; members of sets are generally designated by lower case, subscripted letters;

S-nodes—nodes within a sequential data-structure. S-nodes in a set generally have only one subscript $S=\{S_1, S_2, S_3, \ldots \}$;

Subscripts—integers or variables between 1 and 9 inclusive, or a naught (o). Subscript numbers will not exceed 9 unless otherwise stated. Naught (o)—represents an absence of specification of individual members of a set with regard to the subscript position, and, thereby, will define a sub-set. Variables with three(3) subscripts have the following subscript order: $S_{ijk}$: $S_{processor\ number,\ node\ number,\ cell\ number}$ Preferred Embodiment
Preferences for Adaptable Data-Structures 1). Ordinal data is preferred for the elements contained and ordered within the sequential data-structure by the sequential method and/or rules of ordering.

2). The sequential data-structure is preferred to be capable of representation by nodes containing data elements and links that relate the nodes according to the relationships of the elements contained in the nodes. The relationships represented by the links may relate the node to adjacent nodes, non-adjacent nodes and/or to the rest of the data-structure as a whole. 3). The adapted nodes are preferred to have the capability of the calculation of G-node Ranges which may be related to each other in an ordinal fashion. 4). Contiguity: the structure is preferred to have the quality that the placement of nodes makes the data ranges contiguous with respect to the structure and rules of the graph and the data set contained and organized according to its ranges.

Preferred Embodiment
General Description

The purpose of this section is to describe the data-structures and functions in a less technical manner than that of the pseudo-code contained in other sections.

This section contains only a generalized description of the present method and does not contain all the details of the invention. For ease of understanding, the description in this section is presented using graphical depictions of the data-structures in their sequential (single-processor) forms along with accompanying descriptions of the graphical figures; the parallelized forms of the data-structures are then depicted in the same fashion. It may serve as an introduction to the basic concepts of the present method so that the reader will find the other descriptions easier to follow.

The problem that the invention solves is presented in the section Discussion of Problem. The example given in that section functions in the same manner as the examples given here, but the description in this section explains the underlying functionality that produces the results shown in the previous section. In addition, two Examples are shown here to ensure that the general concept is understood to apply to various types of data-structures. A complete description of the present method, the basic parallel method, its functionality and the data-structures that it produces are described in other sections.

Preferred Embodiment
Description of the Shapes of Single-processor Data-Structures and their Multi-processor Counter-parts This section describes the configuration of adapted parallel data-structures, how they are stored on multiple processors or memory storage devices, and how they are similar to their single-processor counter-parts. The values of the data elements in a single-processor data-structure determine its shape. [see single B-tree FIG. 1] The single-processor B-tree in FIG. 1 contains 12 distinct values and has 12 distinct positions for those values. The numerical relationships (greater-than/less-than) between the 12 elements in the B-tree in FIG. 1 determine the shape of the tree and the positions of the elements.

The values of the data elements in a multi-processor data-structure also determine its shape; however, they determine its shape according to the ranges of values into which they fall [see parallel B-tree FIG. 2]. Although the same 12 elements populate the parallel B-tree in FIG. 2, the shape of the parallel B-tree is not determined by the positions of 12 distinct elements, but by the positions of 5 distinct ranges that the 12 elements fall into.

Comparing the trees in FIG. 1 and FIG. 2, we see that the elements 20 and 26 occupy node C in FIG. 1. The contents of node C are determined by the fact that the parent node A of the tree contains the two values 15 and 30: therefore all elements greater than 15 and less than 30 are placed in node C. The Adapted parallel version of the tree in FIG. 2 also has a node C; however, the parallel node C has two parts C1 (on processor 1) and C2 (on processor 2). The contents of the parallel node C are determined by the fact that the parallel parent node A contains two ranges of values (15 to 20) and (40 to 45): therefore all elements greater than (15 to 20) and less than (40 to 45) are placed in parallel node C. Therefore the elements in parallel node C fall into the range (21 to 39); these elements are 26,30 and 33.

The parallel B-tree in FIG. 2 is composed of two identically shaped trees (one on each processor). The elements in these identical trees are also positioned identically within the tree according to the ranges that they fall into. This grouping of elements according to identical ranges on each processor creates a Global-node or G-node: the G-node is a collection of data elements in identical positions within identical data-structures contained on multiple processors or processing components. Each G-node has its range (G-node Range) recorded on each processor. The G-node with G-node range (40 to 45) is positioned as the second entry in node A in FIG. 2. If the value 43 were Inserted by either processor into the parallel B-tree, then it would take position in this G-node because it falls into the G-node range (40–45). This G-node would then contain the values 40,43, and 45. The concept of the G-node is central to the functioning of the parallelized method/data-structure: once the concepts of the G-node, the G-node Range and the G-node Split are firmly grasped, the present method should be fairly easy to comprehend. The G-node Split is explained in the following section.

Preferred Embodiment
Verbal Description (Insert and Remove)

This section gives a verbal description of how the preferred embodiment functions. Adapted parallel data-structures created by the preferred embodiment are always composed of P identical data-structures, each contained on one of P processors or system components. The adapted parallel data-structures take form and are organized according to the same principles (with respect to G-node Ranges) that form and organize the single-processor data-structures from which the parallel versions are derived.

As mentioned previously, the single-processor data-structures to be adapted are created and maintained through the use of Insert and Remove functions for the respective data-structures. The ability to Insert and Remove from ordered lists of data implies the ability to search. Search (Find) functions are preferred aspects of the single-processor Insert and Remove functions in general.

The multi-processor Insert, Remove and Find functions may be originated at any time, on any processor (1 to P). The processor originating the Insert, Remove or Find function may or may not need to involve the other processors in the effort. In some cases these functions can be executed by a single processor within the parallel or distributed system. Whether or not other processors need to be involved, depends on how much room there is in a G-node for Insert and whether or not a specific value is present on a given processor for Find or Remove.

For this general description, the parallel versions of the Insert and Remove functions may be said to have three phases: (1) Location of the proper G-node on the originating processor (2) Location of the proper processor (1 through P) with insertion or removal of the element on that processor (3) Performance of G-node Split or G-node deletion if necessary. Step 1 can be performed by any single-processor, at any time, independent of the other processors. Step 2 involves more than one processor in a cooperative effort unless the "proper processor" is the processor that originated the Insert or Remove. Step 3 usually requires all processors to communicate for a G-node Split because the elements in the G-node must be sorted across processors for a Split; Step 3 usually does not require all processors to communicate for a G-node deletion.

The following steps 1 through 3 are also identified in the pseudo-code for the parallel Insert and Remove functions given in the Program Adaptation section.

Step 1

(Location of the proper G-node on the originating processor (Find G-node))

The functioning of the parallelized method depends on the functioning of the single-processor method. The single-processor method functions according to the relationships between the values of the elements: the multi-processor method functions according to the relationships of the ranges of values of the elements.

The search of an ordered list is performed by comparing the values found at positions within the data-structure. For Example: Searching the single-processor B-tree for 33 in FIG. 1, we start at the top node and compare the values. 33 falls between 30 and 45, so we travel down the link under 45 and find node D. Searching node D from left to right we immediately locate 33. Searching the multi- processor B-tree for 33 in FIG. 2, we start at the top node and compare the ranges. 33 falls between the ranges (15 to 20) and (40 to 45), so we travel down the link under (40 to 45) and find node C. Parallel node C may be located by either processor 1 or processor 2. Searching parallel node C for the value 33 is described in Step 2.

Step 2

(Location of the proper processor (1 through P)) Once a given processor p has successfully located the proper G-node within its data-structure, it may then send the location of this G-node to the other processors in the system. Each of these processors may then attempt to locate the search value within its own portion of the G-node or attempt to place a value in the proper G-node.

In Step 1 above, we located G-node C (FIG. 2) as the proper node for 33. If the originating processor is processor 1, it sends a request to processor 2 to search G-node C; processor 2 then searches its portion of G-node and finds the value; it may then Insert or Remove the value from the data-structure. If the originating processor is processor 2, it immediately locates the value 33 and need not make any request of processor 1.

Whether or not the originating processor needs to send requests to other processors for location of values is dependent on the ordering of values within the G-node. The data-structures in FIG. 2 have G-nodes with unordered internal values. For a discussion on ordering values within G-nodes, see other sections.

Step 3

(Performance of G-node Split or G-node deletion if necessary) A G-node Split is the creation of a new G-node;

a G-node deletion is the destruction of an existing G-node. When a G-node is considered full, it is Split; when it is considered empty (or sufficiently empty), it is destroyed and deleted from the data-structure. The fullness or emptiness of a G-node is similar in conception to the fullness or emptiness of a node in a single-processor B-tree or m-way search tree. The Rule for Fullness in this section is set forth in detail below.

The G-node Split is described in the definition section above; this definition is sufficient for the General Description. For a more detailed description, see the Function Explanation sections. The G-node deletion is simply the removal of the G-node from the data-structure.

Figure 3:
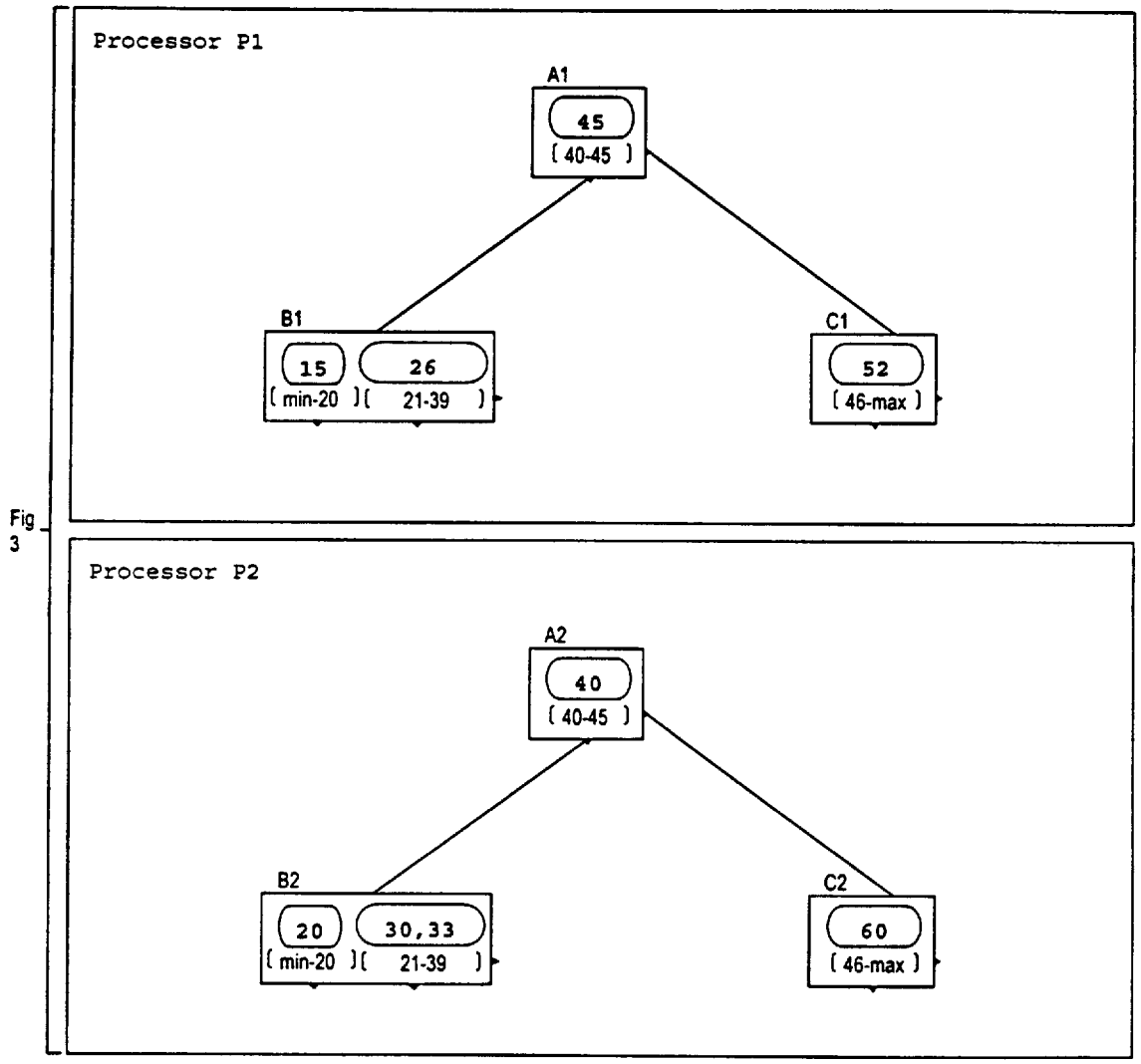
FIG. 3 shows parallel b-tree of FIG. 2 after removal of one G-node.

Once a G-node is created or destroyed, it must be added or deleted from the given data-structure according to the Rules for the data-structure with respect to the G-node Ranges. Examining the data-structure on processor 1 in FIG. 2, we see that it is a valid B-tree, in its own right, regardless of the existence of other processors: if we remove the value 5 from this serial B-tree, we produce the B-tree on processor 1 in FIG. 3. When both processor 1 and 2 perform this removal simultaneously, each processor redistributes the B-tree according to the rules of B-tree configuration: the result is a G-node deletion. Note that this would require the absence of all three values in the G-node: 4, 5, and 12. The point being made here is that G-node additions and deletions function according to the same rules as the single-processor data-structures. This process is clarified further in the two examples in the following section.

Preferred Embodiment

Descriptions by Example

A single-processor method creates its data-structure (such as a B-tree) by Inserting and Removing the values contained in the list to be maintained according to the Rules of the Insert and Remove functions for the data-structure. The Method of Adapting single-processor methods and their associated data-structures into multi-processor methods and data-structures makes use of the single-processor method. Each of the following two Examples will create precisely the same configurations for their data-structures in both the single and multi-processor versions described. A reader understanding the functioning of AVL trees and B-trees should be able to see the functioning of the multi-processor method as a transformation of the single-processor method in each case. The present method transforms the single-processor method into the multi-processor method.

Any implementation of a parallelized data-structure may utilize variations on the Rules for Fullness of G-nodes and the Ordering Scheme of elements within G-nodes. The following rules and ordering scheme will be used for these two Examples:

1. Rules for fullness/emptiness: each G-node in these Examples will be composed of 3 sets of elements; each set will contain zero through two elements. A G-node i is full when all three sets contain two elements (the G-node therefore containing six elements). The G-node is empty when all three sets contain zero elements.
2. Ordering Scheme: each P-node set within a G-node is contained on a single-processor (P1, P2 or P3 ). The elements in the G-node will be kept in ascending order across the processors and evenly distributed (P1 containing the smallest values, P2 the mid-most, P3 the largest).

The following two Examples explain the underlying functioning of the preferred embodiment by maintaining the same list of values on two parallelized data-structures. Each Example first describes the functioning of the single-processor version of the data-structure on a similar list. Each Example then describes the parallel version of the data-structure. These Examples both use three (P=3) processors for the parallel data-structures.

The single-processor versions of the lists are roughly one-third the size of the parallel versions. Each single value inserted or deleted in the single-processor data-structure is matched by several values for the parallel version. The multiple values inserted and deleted in the parallel version are specifically chosen to fall into the proper G-node Ranges so that the single and multi-processor data-structures take on the same configurations: this is done so that the identical functioning, form and structure of the single and multi-processor versions can be easily seen. The functioning of the parallel versions is in no way dependent on any choice of element values (any list of ordinable data elements may be Inserted or Removed in any order).

EXAMPLE 1

Single-processor Method

The single-processor AVL tree method is composed of finding the proper location for a new node, adding that node, and performing rotation.

Figure 4:
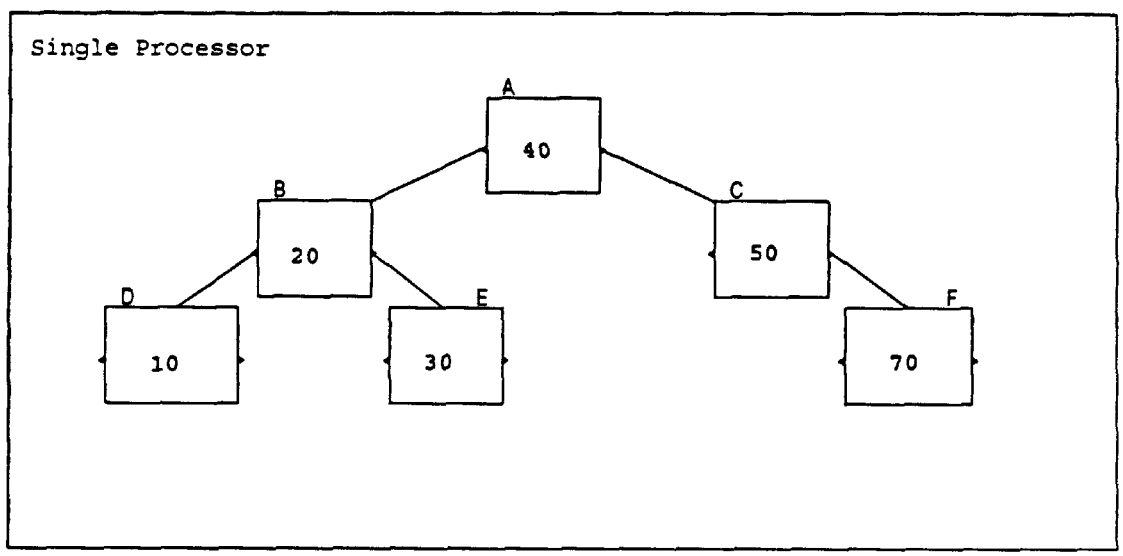
FIG. 4 shows serial AVL tree of Example 1 for preferred embodiment.

Example 1 begins with FIG. 4, showing a properly ordered single-processor AVL tree containing the elements from the single-processor initial list.

1.) Insert(60)

Figure 5:
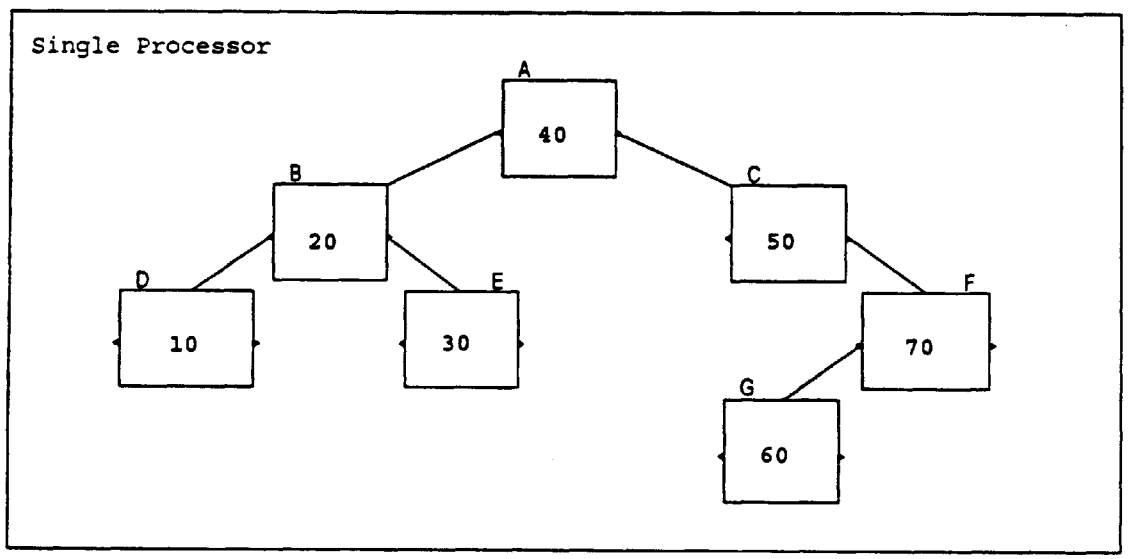
FIG. 5 AVL tree of FIG. 4 after addition of element.

Comparing values at each node: Root-node A: [60>40], travel down the right-most link to node C; node C: [60>50], travel right to node F; node F: [60<70]—F has no left link so we create a new node G and place it to the left of node F. (FIG. 5)

Figure 6:
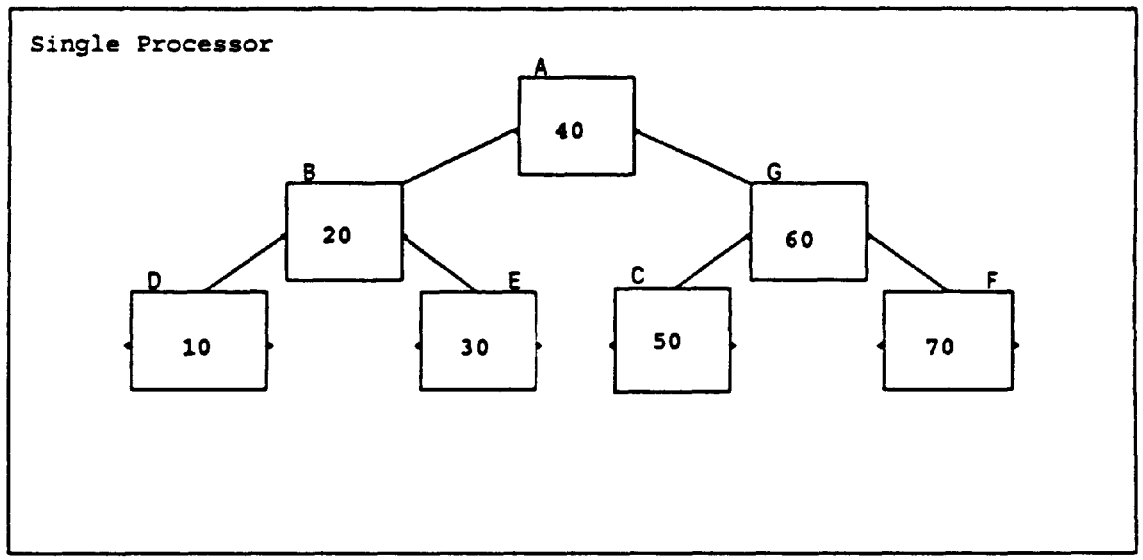
FIG. 6 AVL tree of FIG. 4 after rotation.

Node G has been added in its proper place; the AVL tree is left unbalanced, therefore we perform RL rotation (FIG. 6).

2.) Insert(80)

Figure 7:
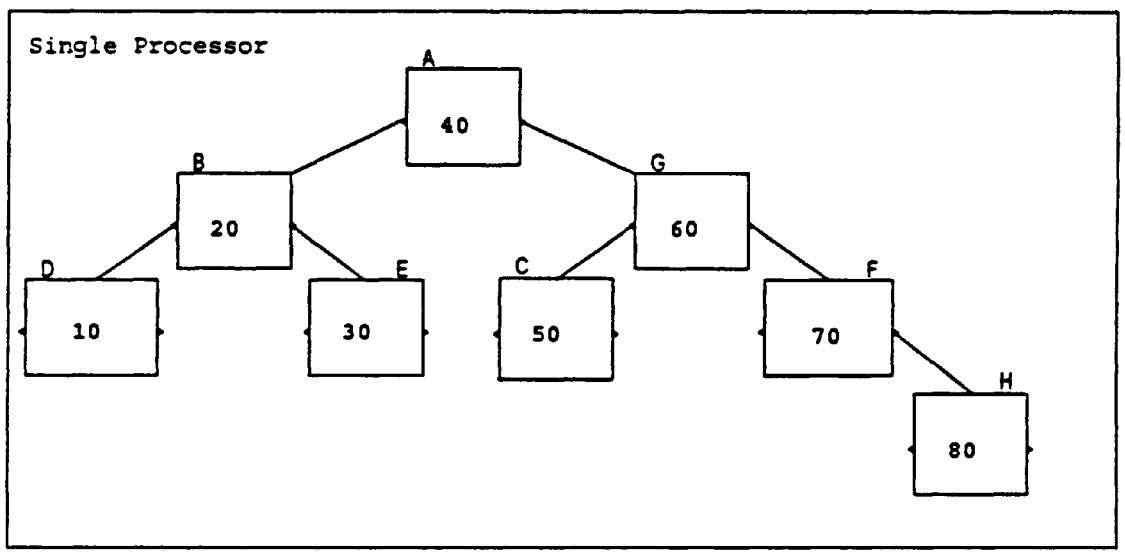
FIG. 7 AVL tree of FIG. 4 after another addition.

Root-node A: [80>40] travel right to node G; node G: [80>60] travel right to node F; node F: [80>70]—F has no right link so we create a new node H and place it to the right of node F. The tree is still balanced (no rotation) (FIG. 7).

3.) Insert(90)

Figure 8:
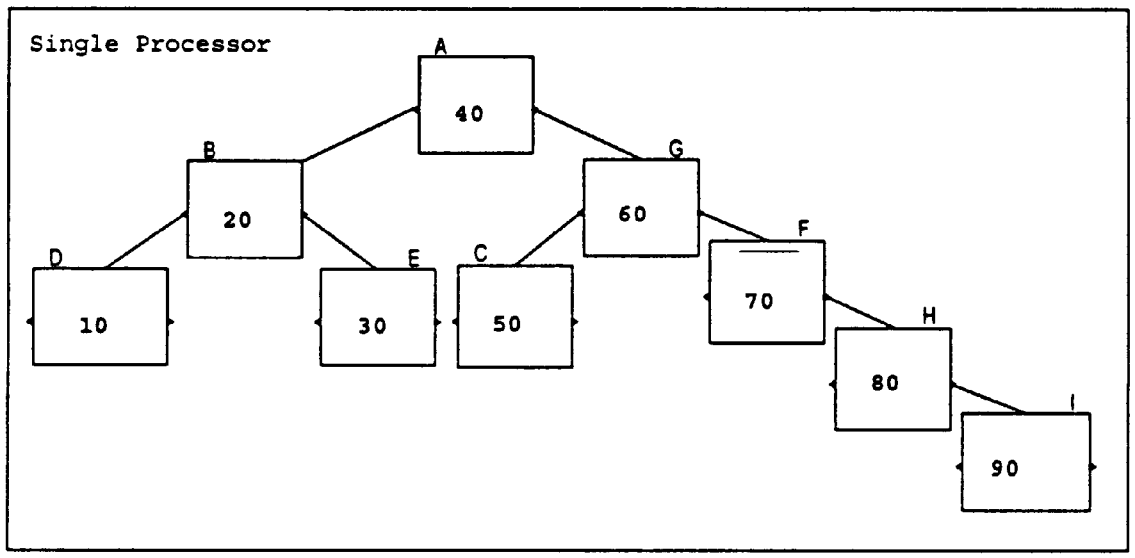
FIG. 8 AVL tree of FIG. 4 after another addition.

Root-node A: [90>40], travel right to node G; node G: [90>60], travel right to node F; node F:[90>70], travel right to node H; node H: [90>80]—H has no right link, so we create a new node I and place it to the right of H (FIG. 8).

Figure 9:
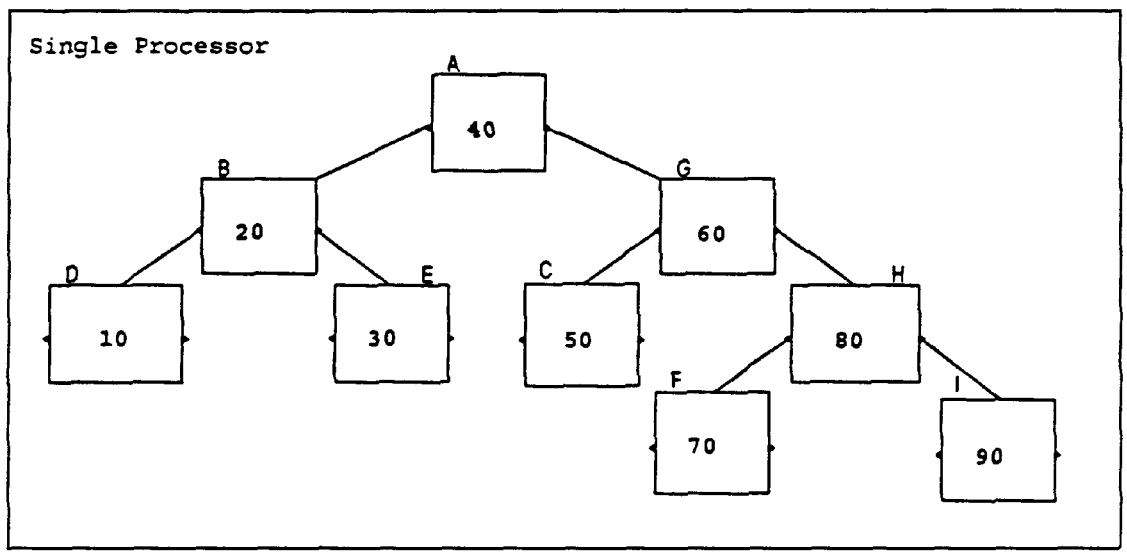
FIG. 9 AVL tree of FIG. 4 after rotation.

Node I has been added in its proper place; the AVL tree is left unbalanced, therefore we perform RR rotation (FIG. 9).

4.) Remove(60)

Figure 10:
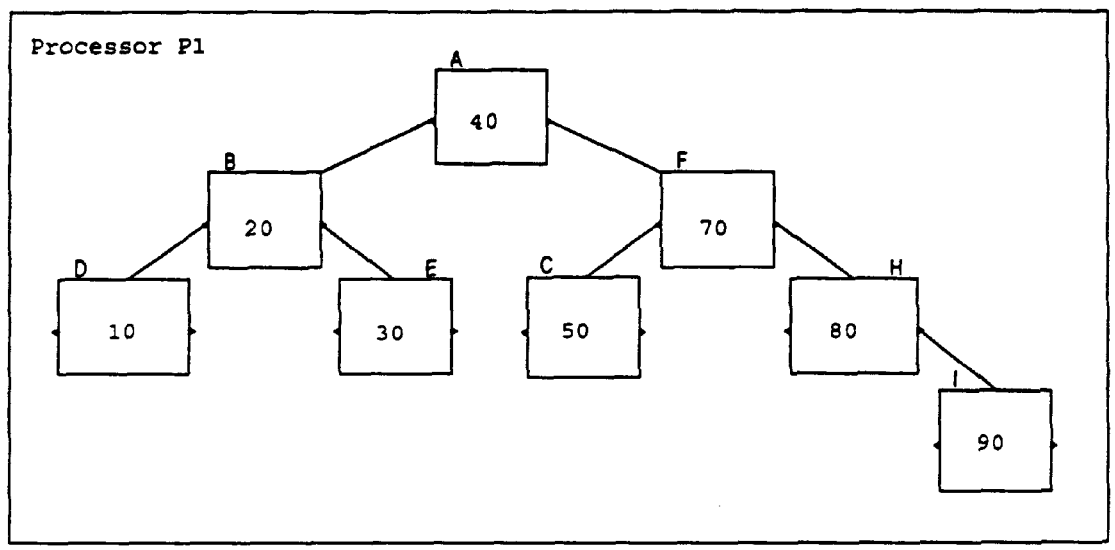
FIG. 10 AVL tree of FIG. 4 after removal of element.

Root-node A: [60>40], travel right to node G; node G: [60=60], therefore delete node G; replace node G with the left-most child of the right sub-tree (node F). The tree is still balanced (no rotation) (FIG. 10).

Multi-processor Method

The multi-processor AVL tree method is composed of finding the proper location for a new value, inserting the values until a G-node Split thereby creating a new G-node, adding that G-node, and then performing rotation in parallel.

Refer to Steps 1 through 3 in the Verbal Description section.

Figure 11:
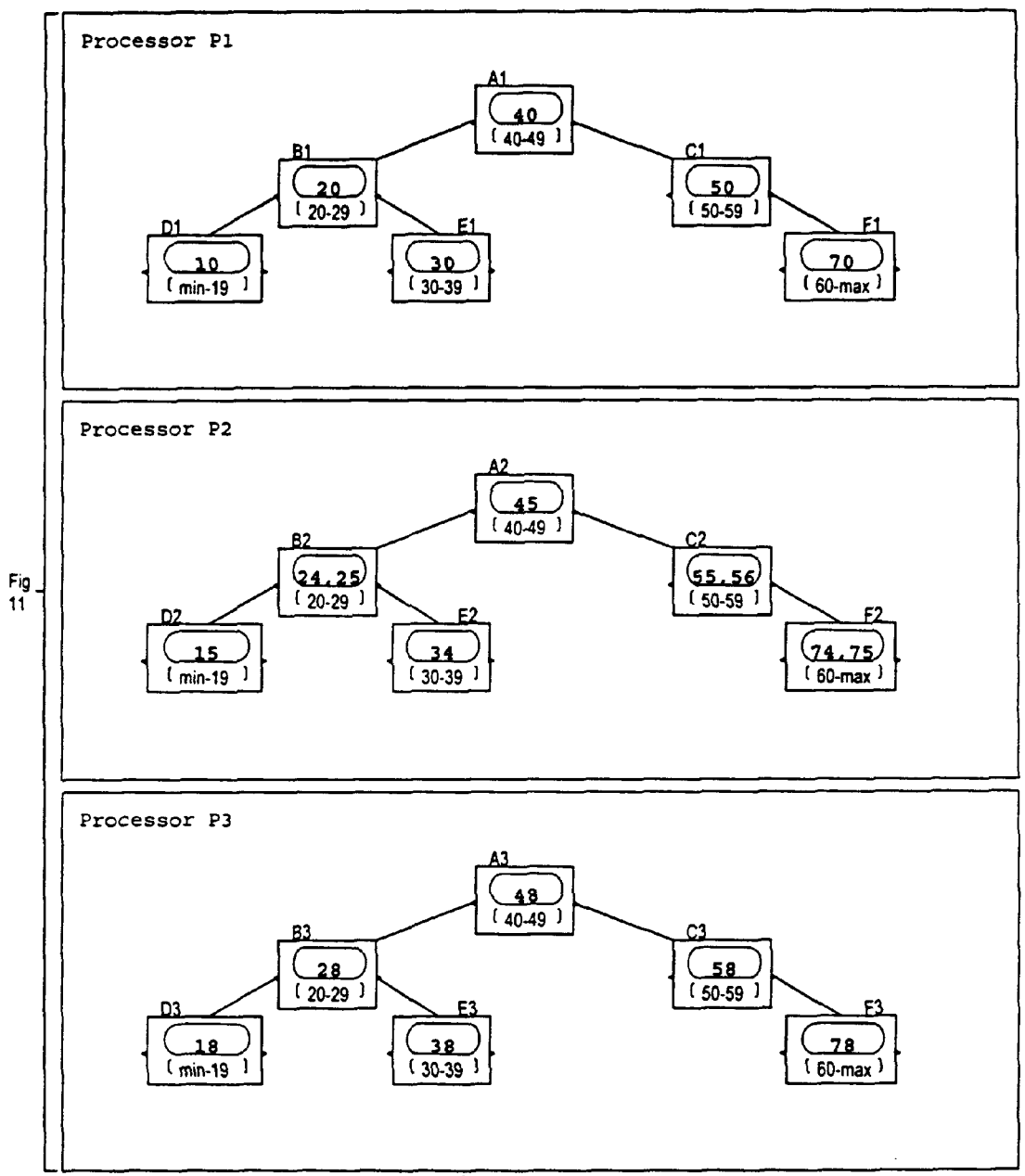
FIG. 11 parallel AVL tree of Example 1 for preferred embodiment, comprising 3 separate trees stored on 3 processors.

Example 1 (multi-processor) begins with FIG. 11, showing an Adapted AVL tree composed of 3 properly ordered AVL trees on 3 processors containing the elements from the multi-processor initial list. The G-node Ranges are shown beneath the parallel nodes.

1.) Insert(60) [after which Insert(65)]
Insert(60) at processor P1
Step 1

Comparing values at each G-node:

Root-node A1: [(60)>(40–49)], travel down the rightmost link to node C1; node C1: [(60)>(50–59)], travel right to node F1; node F1: [(60)=(60-max)]—60 falls within G-node Range (60-max), so we add 60 to this G-node at processor P1.
Step 2

The values are properly ordered within the G-node, so step 2 is not necessary.
Step 3

Figure 12:
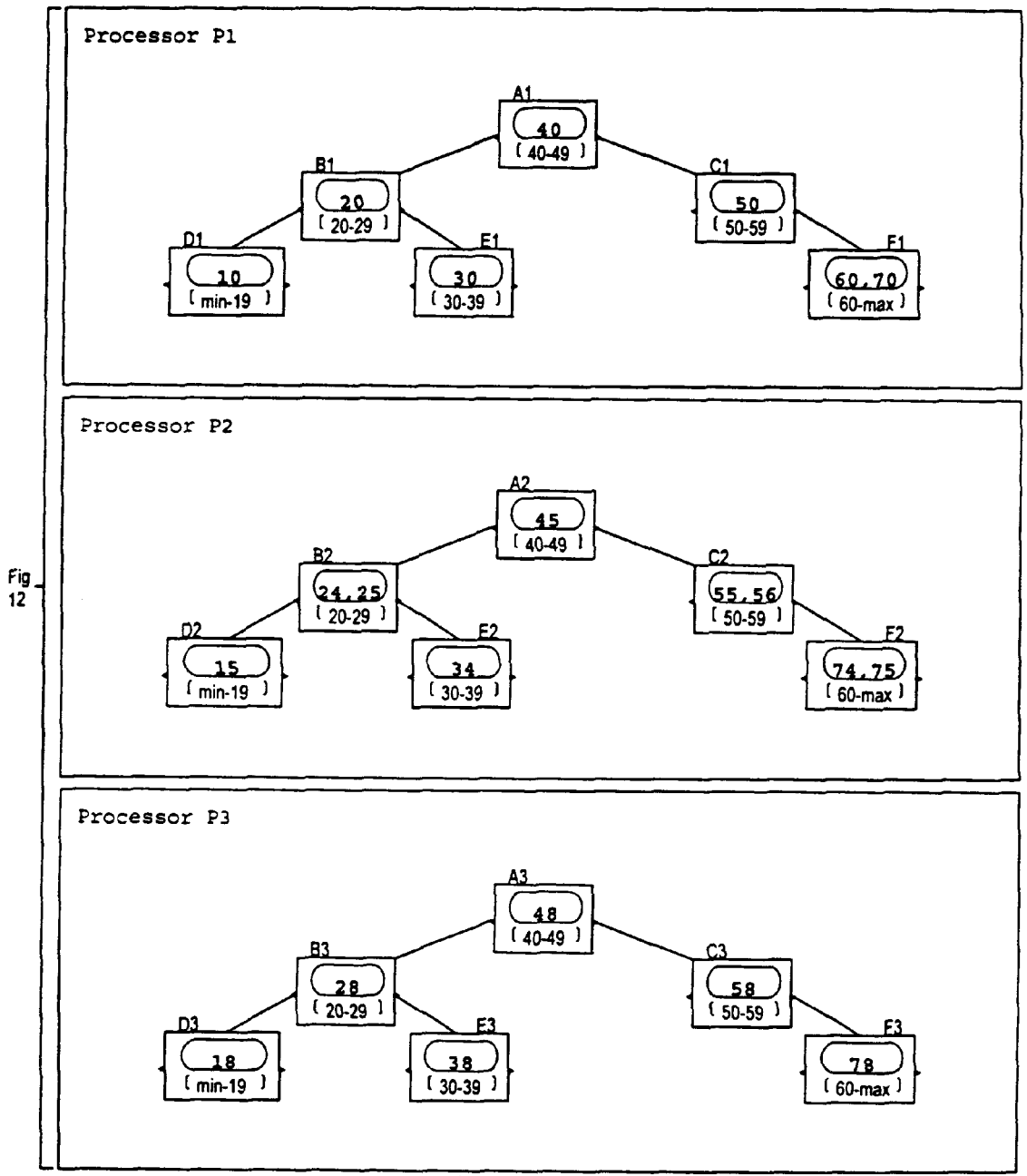
FIG. 12 AVL tree of FIG. 11 after addition of element.

The G-node is NOT full, so Step 3 is not necessary (no G-node Split). (FIG. 12)
Insert (65) at Processor P1
Step 1

Root-node A1: [(65)>(40–49)] travel right to node C1; node C1: [(65)>(50–59)] travel right to node F1; node F1: [(65)=(60-max)]—65 falls within G-node Range (60-max), so we add 65 to this G-node at processor P1. (FIG. 13)
Step 2

Figure 13:
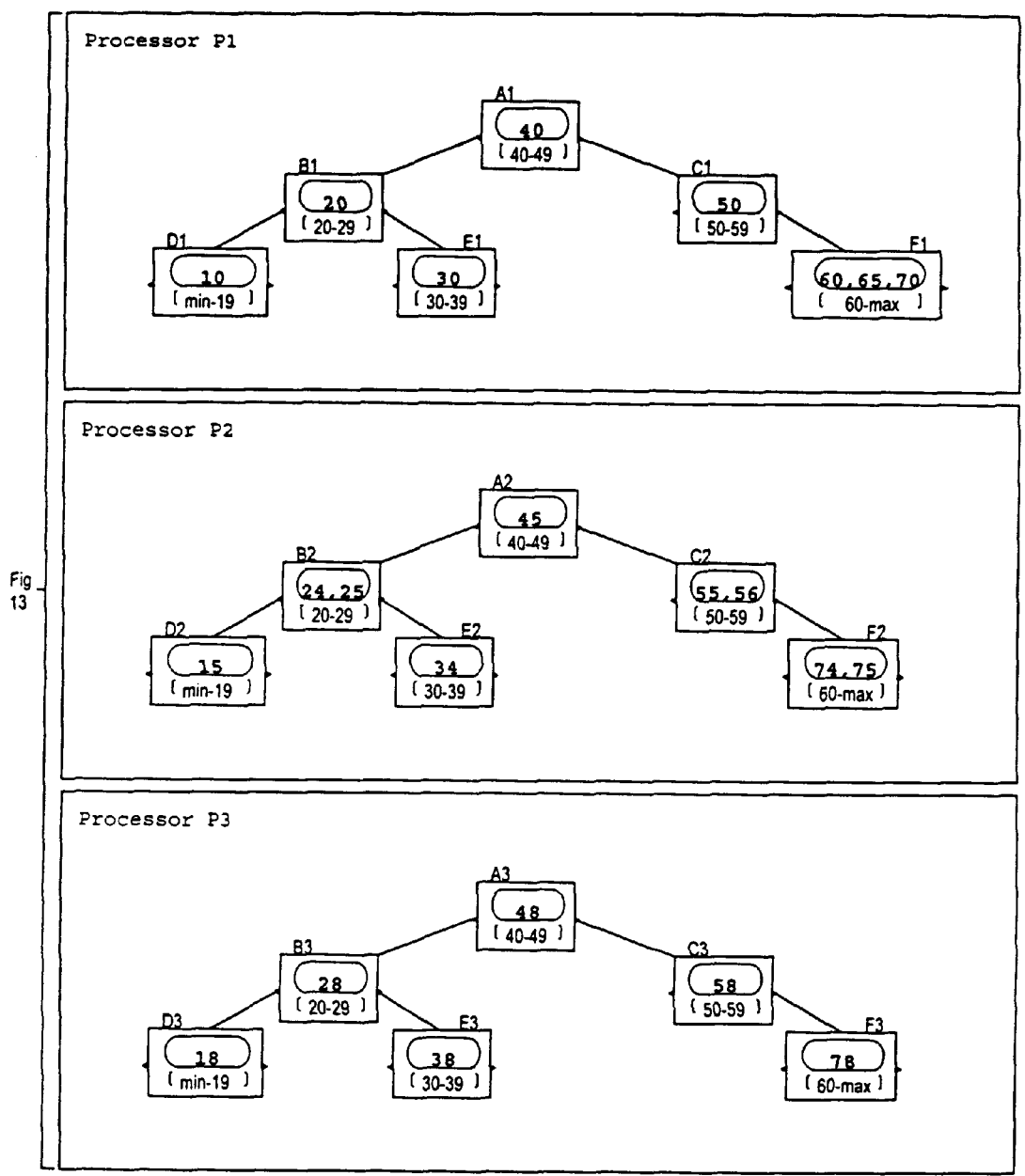
FIG. 13 AVL tree of FIG. 11 after another addition.
Figure 14:
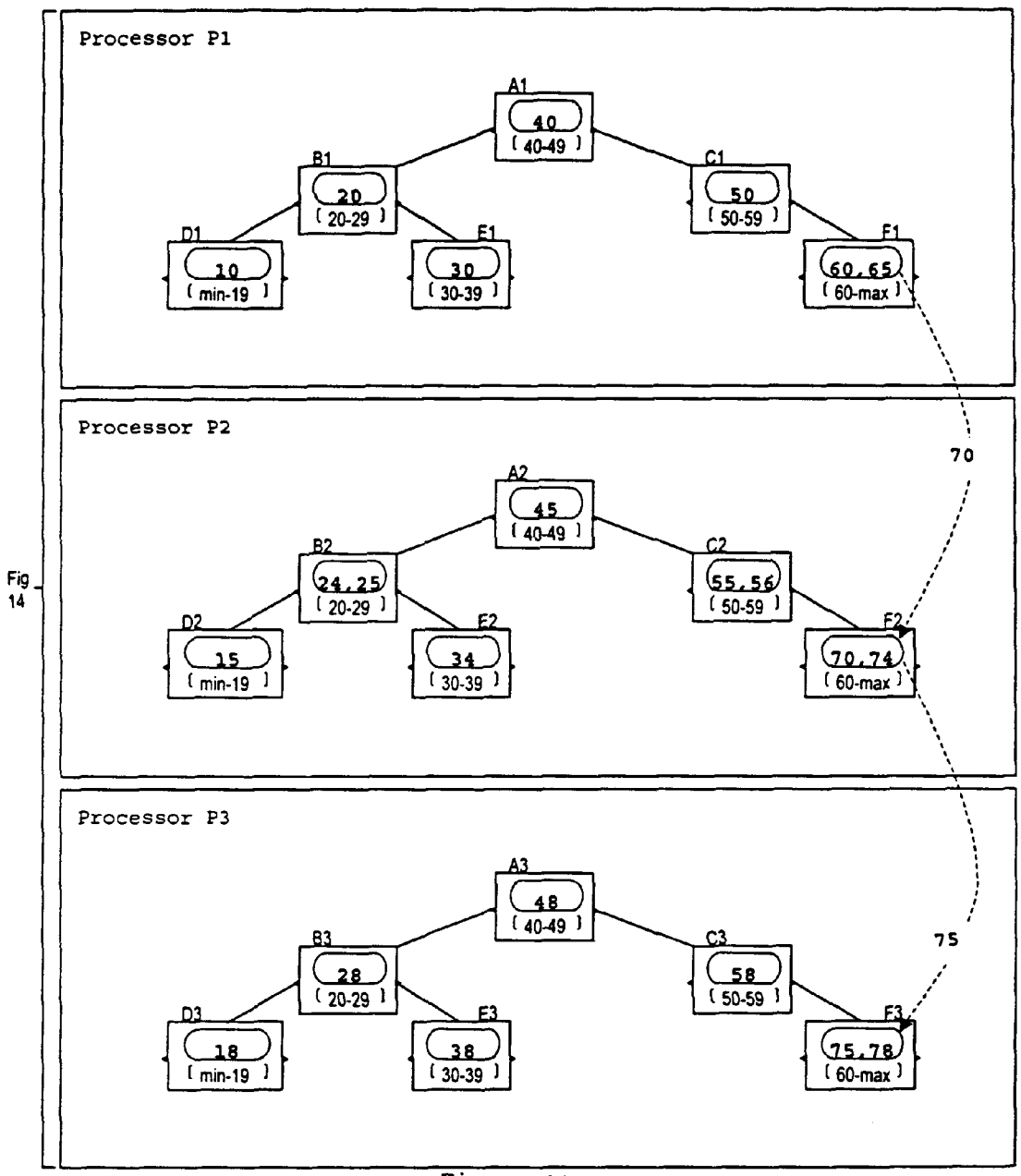
FIG. 14 shows redistribution of elements to maintain Ordering Scheme.
Figure 15:
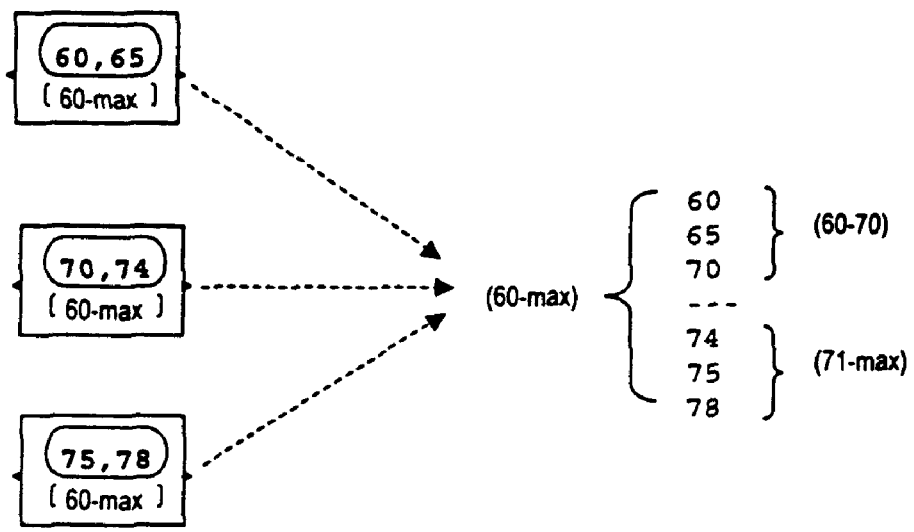
FIG. 15 shows range split and redistribution of elements resulting in creation of new G-node (G-node Split) for Examples 1 and 2 of preferred embodiment.
Figure 15:
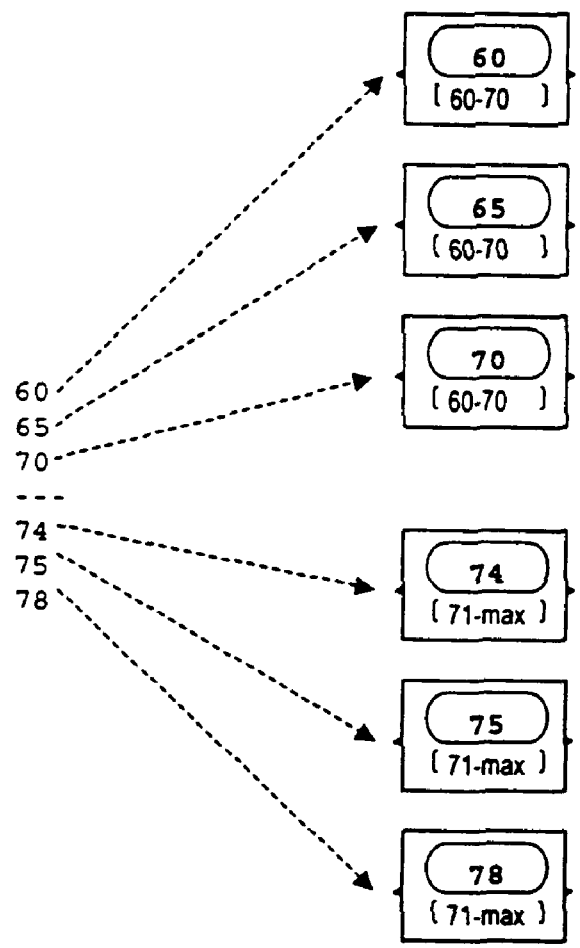

As FIG. 13 shows, the G-node F1 at processor P1 has 3 values. This is greater than maximum number of values per processor per G-node, so we perform Step 2 to properly order the values within the G-node in F. Processor P1 sends the value 70 to P2, and P2 sends 75 to P3. This exchange of elements maintains the Ordering Scheme within G-nodes, locating the proper processors for each value (rule 2 listed above) (FIG. 14).
Step 3:

After addition of 65 to this G-node, the G-node is full, therefore we perform a G-node Split. The G-node Split divides the values 60,65,70,74,75,78 into two ranges. The lower range is placed into a newly created G-node (in G), the upper range is kept in the G-node in F (FIG. 15).

Figure 16:
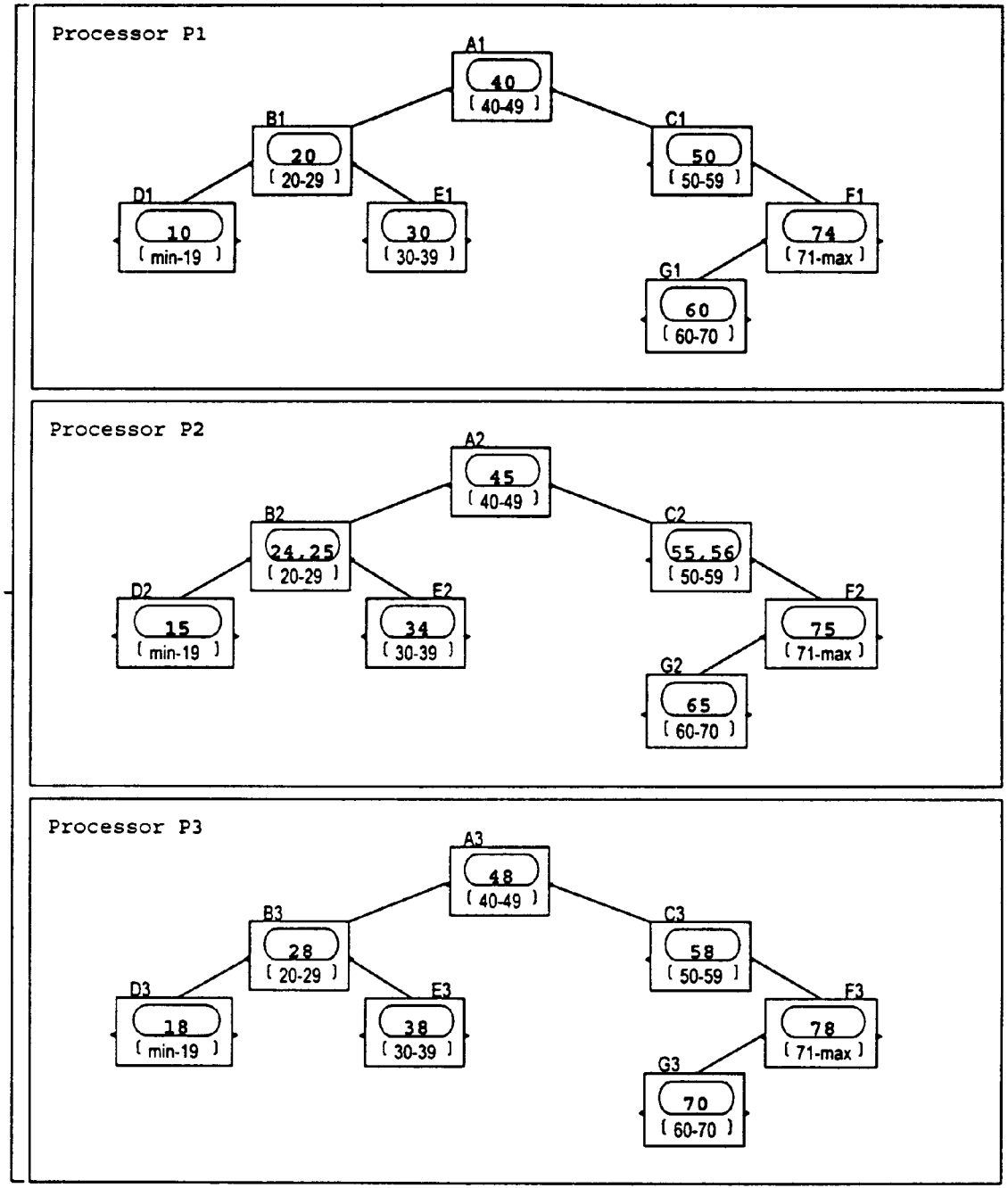
FIG. 16 AVL tree of FIG. 11 after insertion of G-node.

The new G-node (in G) is placed to the left of the G-node in F because its G-node Range (60–70) is less than the G-node Range of F (71-max) (FIG. 16).

Figure 17:
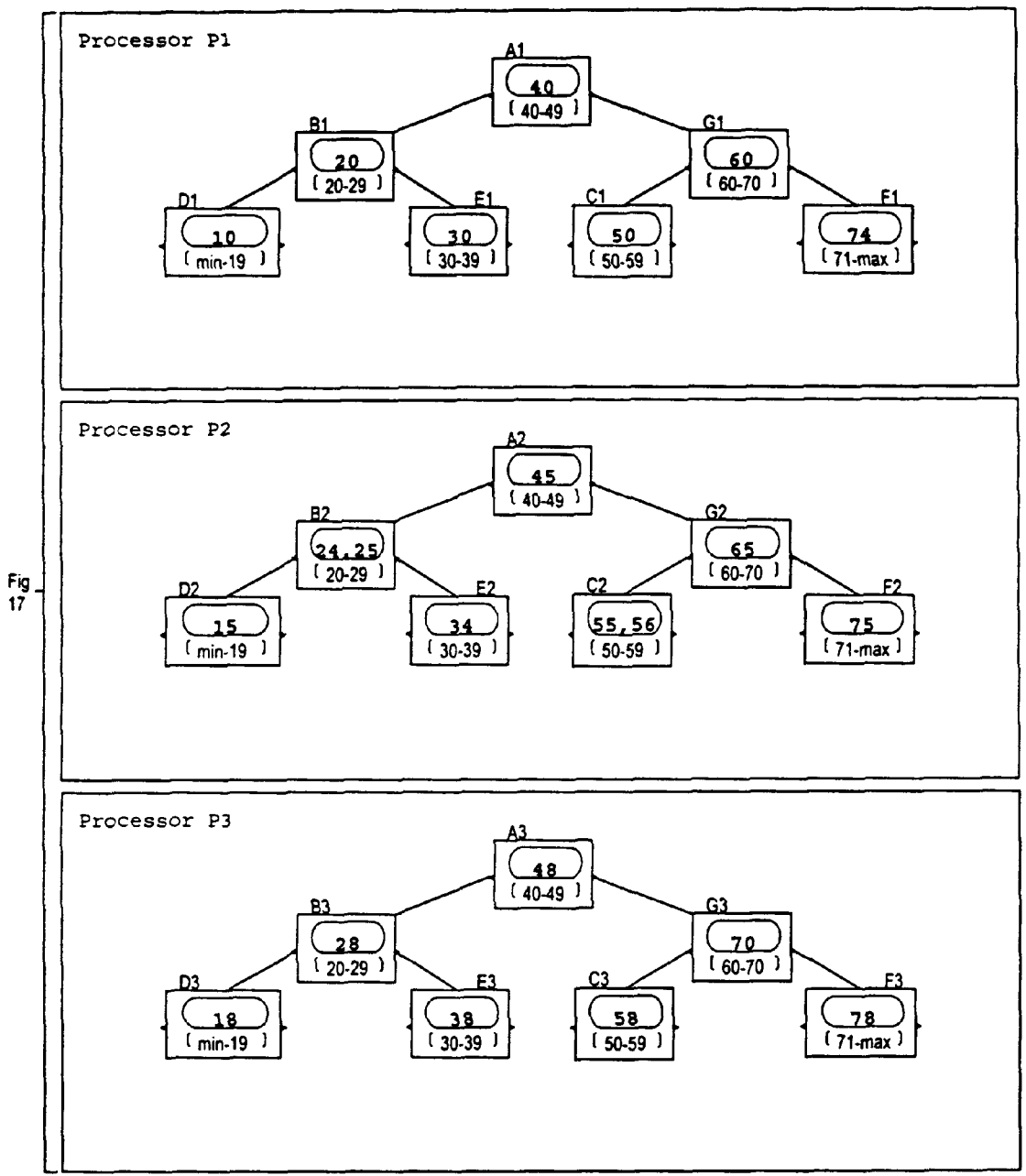
FIG. 17 AVL tree of FIG. 11 after rotation.

The addition of the new node F leaves the AVL tree unbalanced as it did in the single-processor example, therefore we perform RL rotation in parallel (FIG. 17). 2.) Insert(80),Insert(89),Insert(85)

These three Insertions are performed simultaneously. Because the Insertions at processors P1, P2, and P3 all follow the same procedure, we will follow Step 1 only at processor P2.
Insert(80) at P1, Insert(89) at P2, Insert(85) at P3
Step 1 at Processor P2

Figure 18:
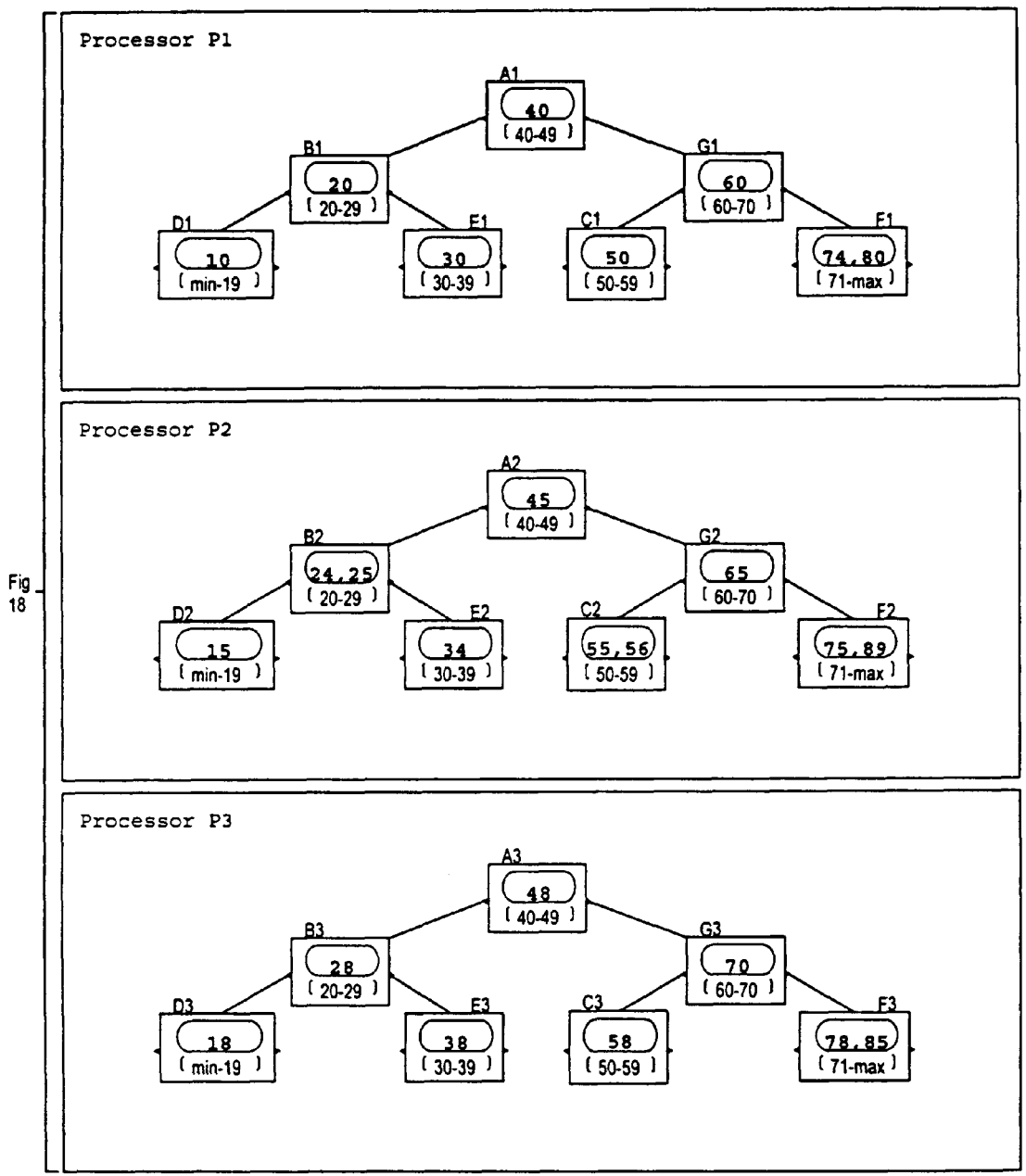
FIG. 18 AVL tree of FIG. 11 after another addition of elements.
Figure 19:
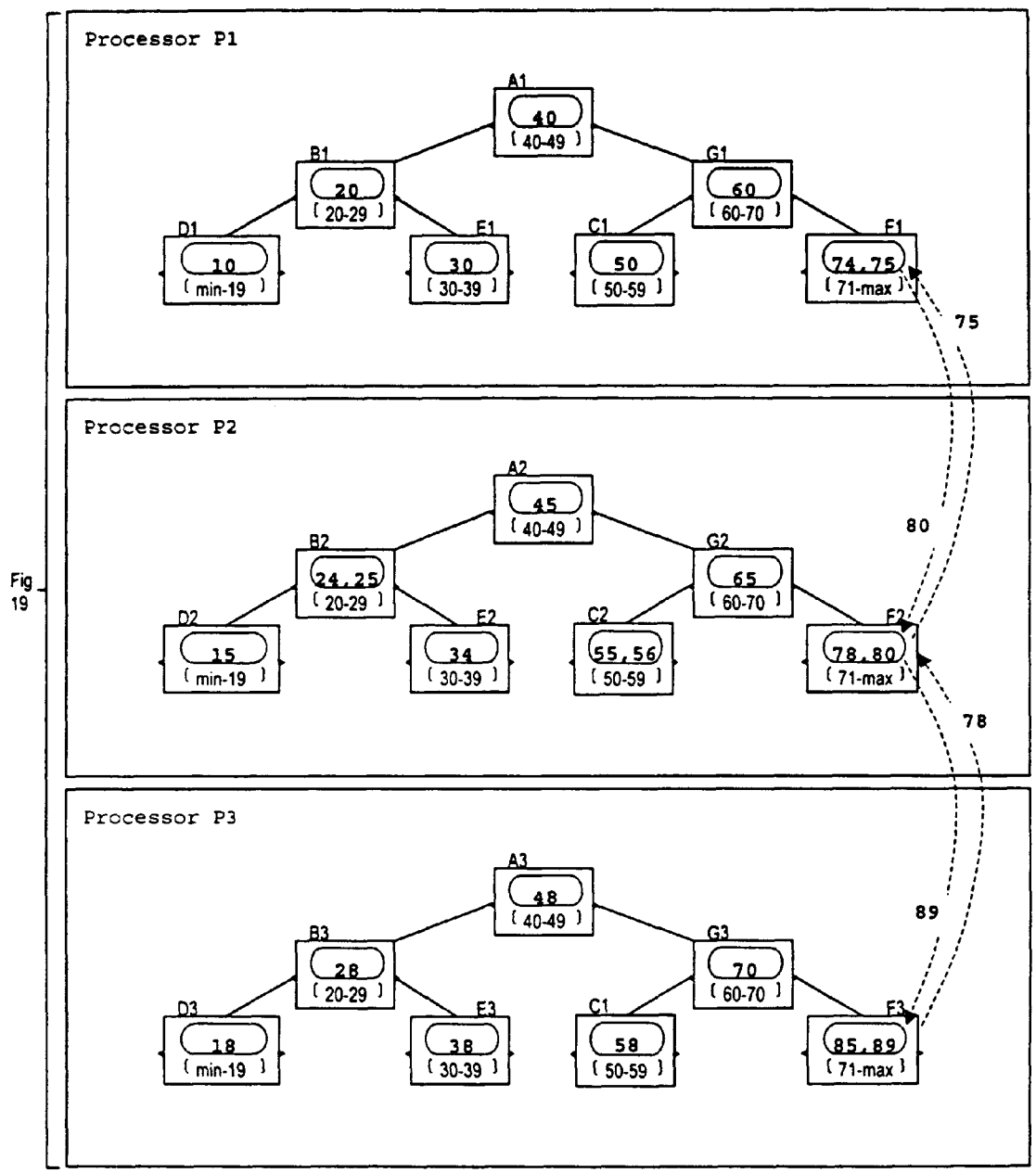
FIG. 19 shows redistribution of elements to maintain Ordering Scheme.
Figure 20:
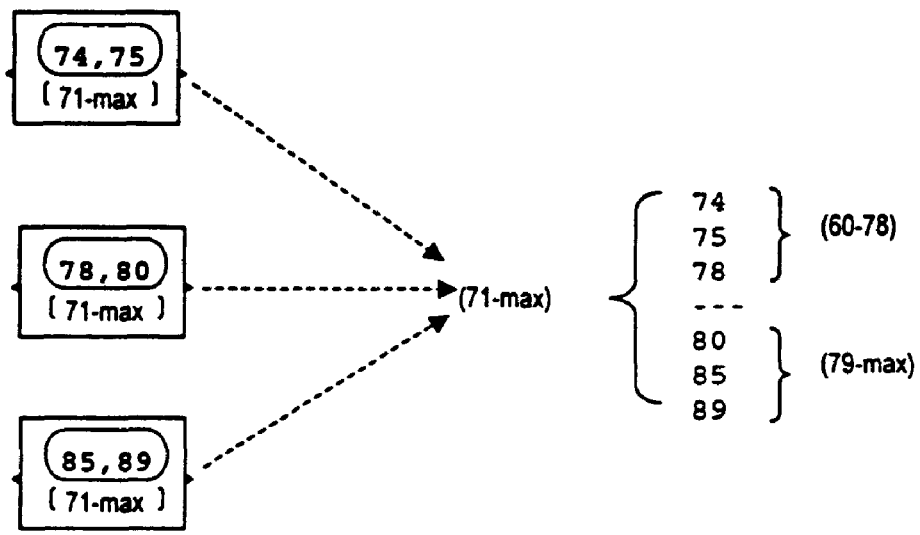
FIG. 20 shows range split and redistribution of elements resulting in creation of new G-node (G-node Split) for Examples 1 and 2 of preferred embodiment.
Figure 20:
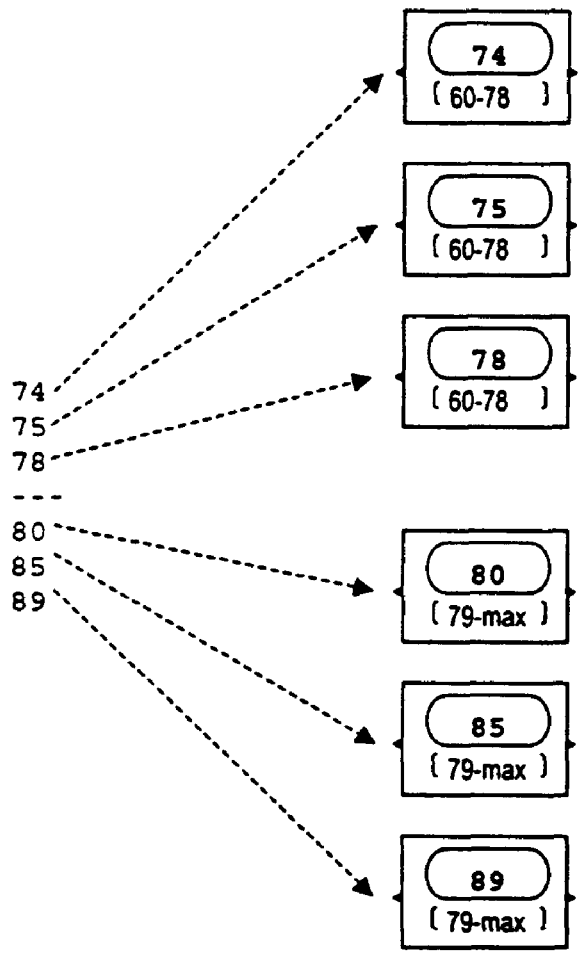

Root-node A2: [(89)>(40–49)], travel right to node G2; node G2: [(89)>(60–70)], travel right to node F2; node F2: [(89)=(71-max)]—89 falls within G-node Range (71-max), so we add 89 to this G-node at processor P2. Following identical comparisons at processors P1 and P3, the values 80 and 85 have been added to the same G-node (FIG. 18).
Step 2:

As FIG. 18 shows, the values are not arranged in ascending order within the G-node in F, so we perform Step 2. Processor P1 sends the value 80 to P2, and P2 sends 75 to P1 and also 89 to P3, P3 sends 78 to P2. This exchange of elements maintains the Ordering Scheme within G-nodes, locating the proper processors for each value (rule 2 listed above) (FIG. 19).
Step 3:

After addition of 80, 89 and 85 to this G-node, the G-node is full, therefore we perform a G-node Split. The G-node Split divides the values 74,75,78,80,85,89 into two ranges. The lower range is placed into a newly created G-node which is in the AVL tree node (F), the upper range is kept in the G-node in the newly formed AVL tree node (H) (FIG. 20).

Figure 21:
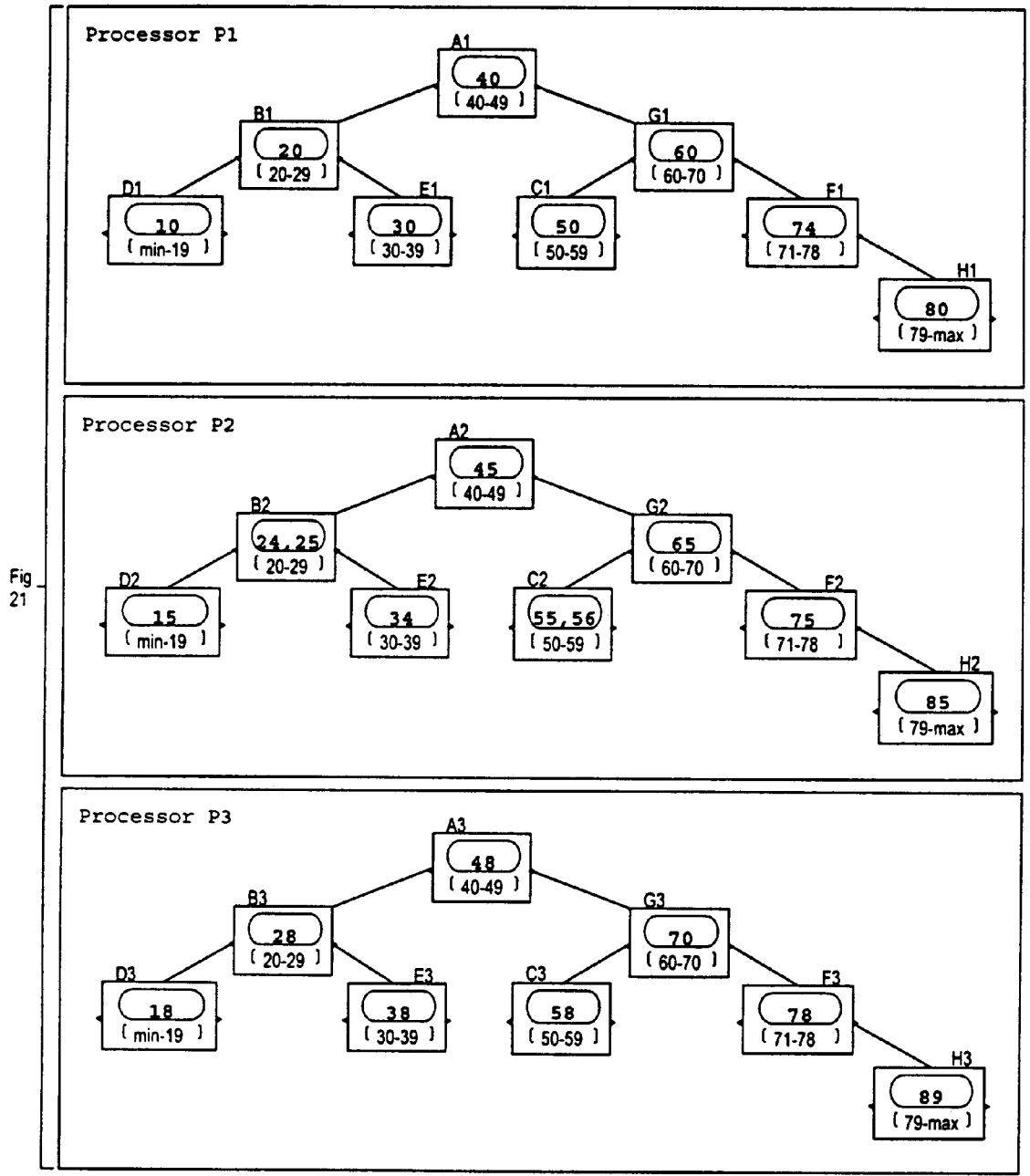
FIG. 21 AVL tree of FIG. 11 after insertion of G-node.

The AVL tree node (H) containing the old G-node is placed to right of node F because its G-node Range (79-max) is greater than the G-node Range of F (71–78) (FIG. 21). The addition of the new node H leaves the AVL tree balanced (no rotation).

3.) Insert(98),Insert(95),Insert(90)

These three Insertions are performed simultaneously. Because the Insertions at processors P1, P2, and P3 all follow the same procedure, we will follow Step 1 only at processor P3.
Insert(98) at P1, Insert(95) at P2, Insert(90) at P3
Step 1 at Processor P3

Figure 22:
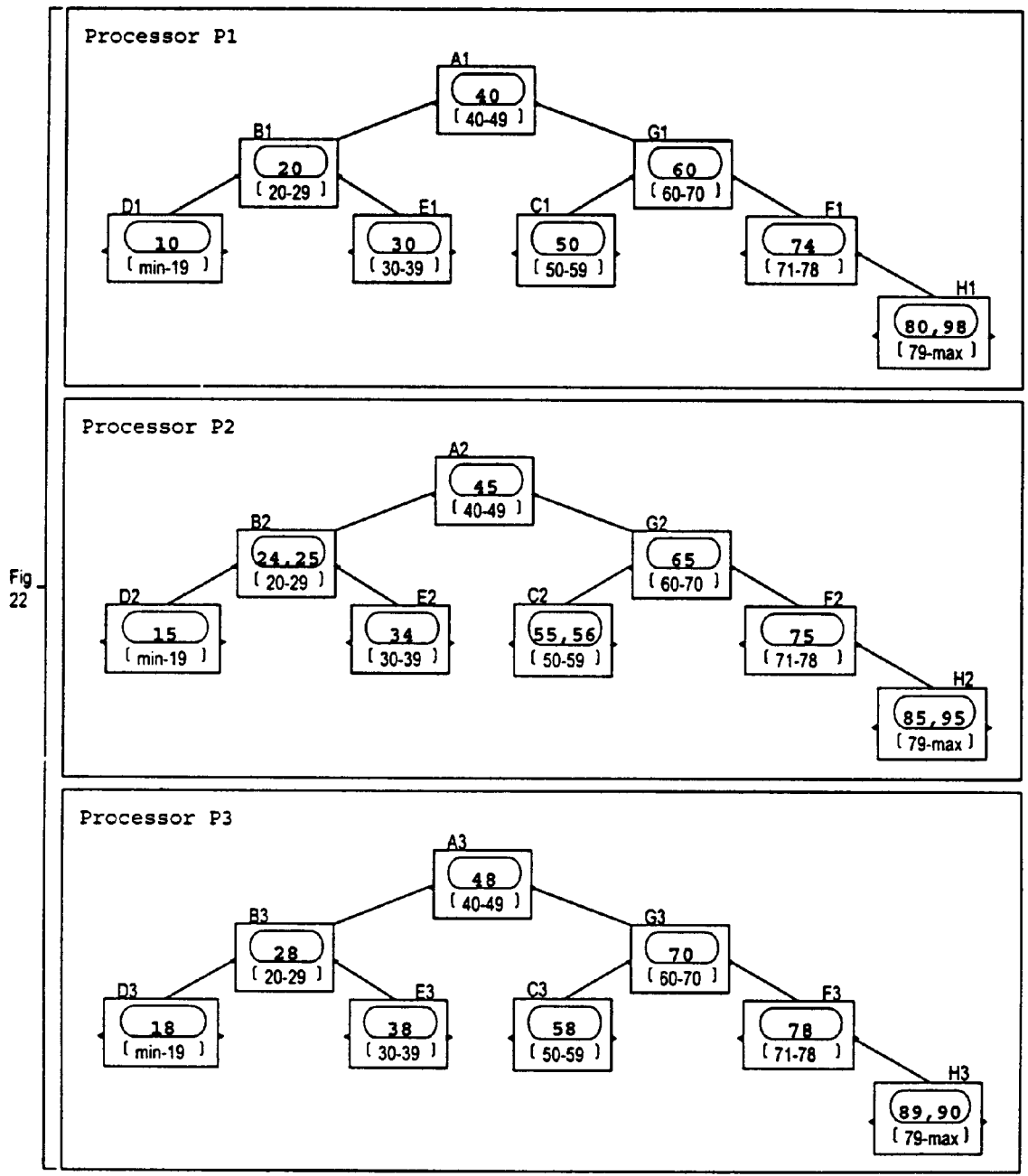
FIG. 22 AVL tree of FIG. 11 after another addition of elements.

Root-node A3: [(90)>(40–49)], travel right to node G3; node G3: [(90)>(60–70)], travel right to node F3; node F3: [(90)>(71–78)], travel right to node H3; node H3: [(90)=(79-max)]—90 falls within G-node Range (79-max), so we add 90 to this G-node at processor P3. Following identical comparisons at processors P1 and P2, the values 98 and 95 have been added to the same G-node (FIG. 22).
Step 2

Figure 23:
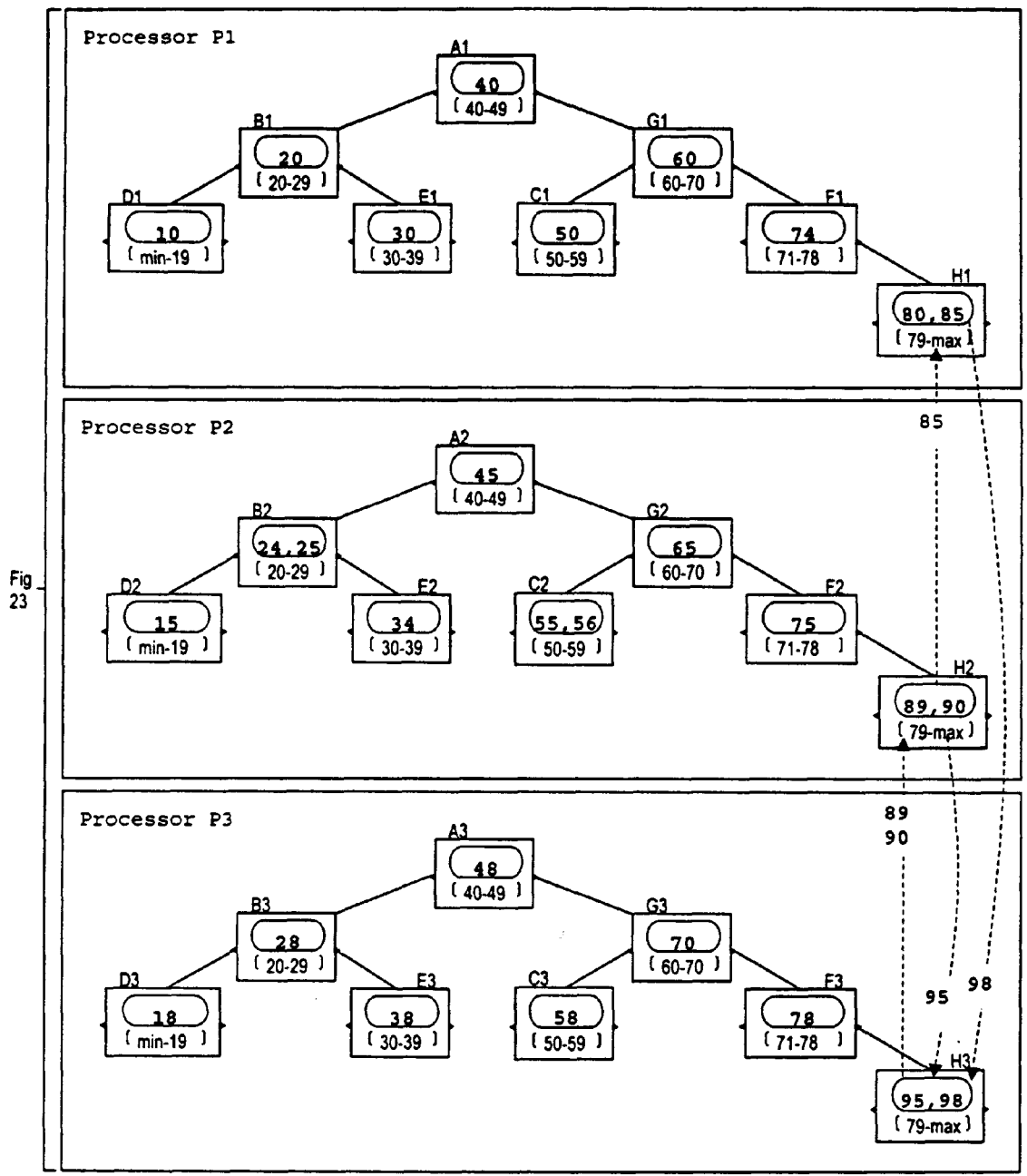
FIG. 23 shows redistribution of elements to maintain Ordering Scheme.

As FIG. 22 shows, the values are not arranged in ascending order within the G-node in H, so we perform Step 2. Processor P1 sends the value 98 to P3, and P2 sends 85 to P1 and also 95 to P3, P3 sends 89 and 90 to P2. This exchange of elements maintains the Ordering Scheme within G-nodes, locating the proper processors for each value (rule 2 listed above) (FIG. 23).
Step 3

Figure 24:
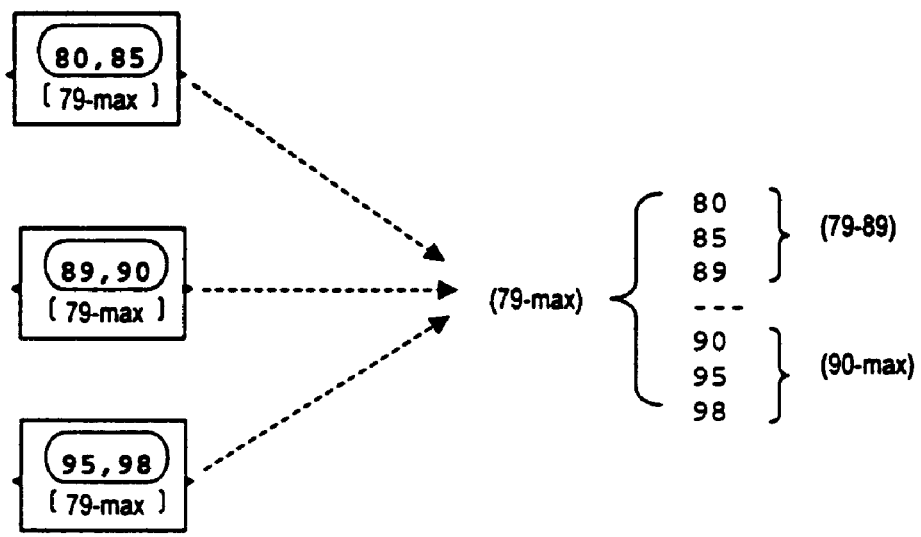
FIG. 24 shows range split and redistribution of elements resulting in creation of new G-node (G-node Split) for Examples 1 and 2 of preferred embodiment.
Figure 24:
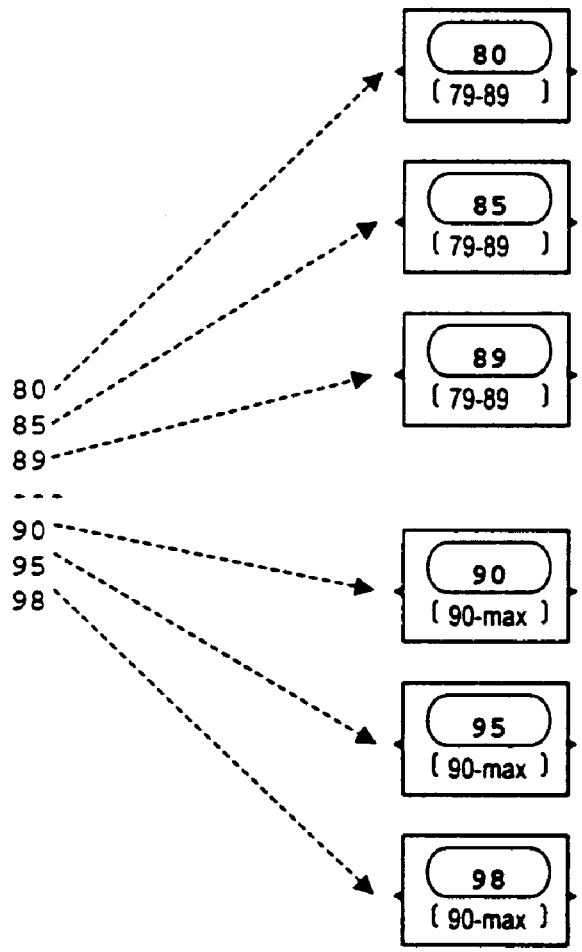

After addition of 98, 95 and 90 to this G-node, the G-node is full, therefore we perform a G-node Split. The G-node Split divides the values 80,85,89,90,95,98 into two ranges. The upper range is placed into a newly created G-node (I), the lower range is kept in the G-node in H (FIG. 24).

Figure 25:
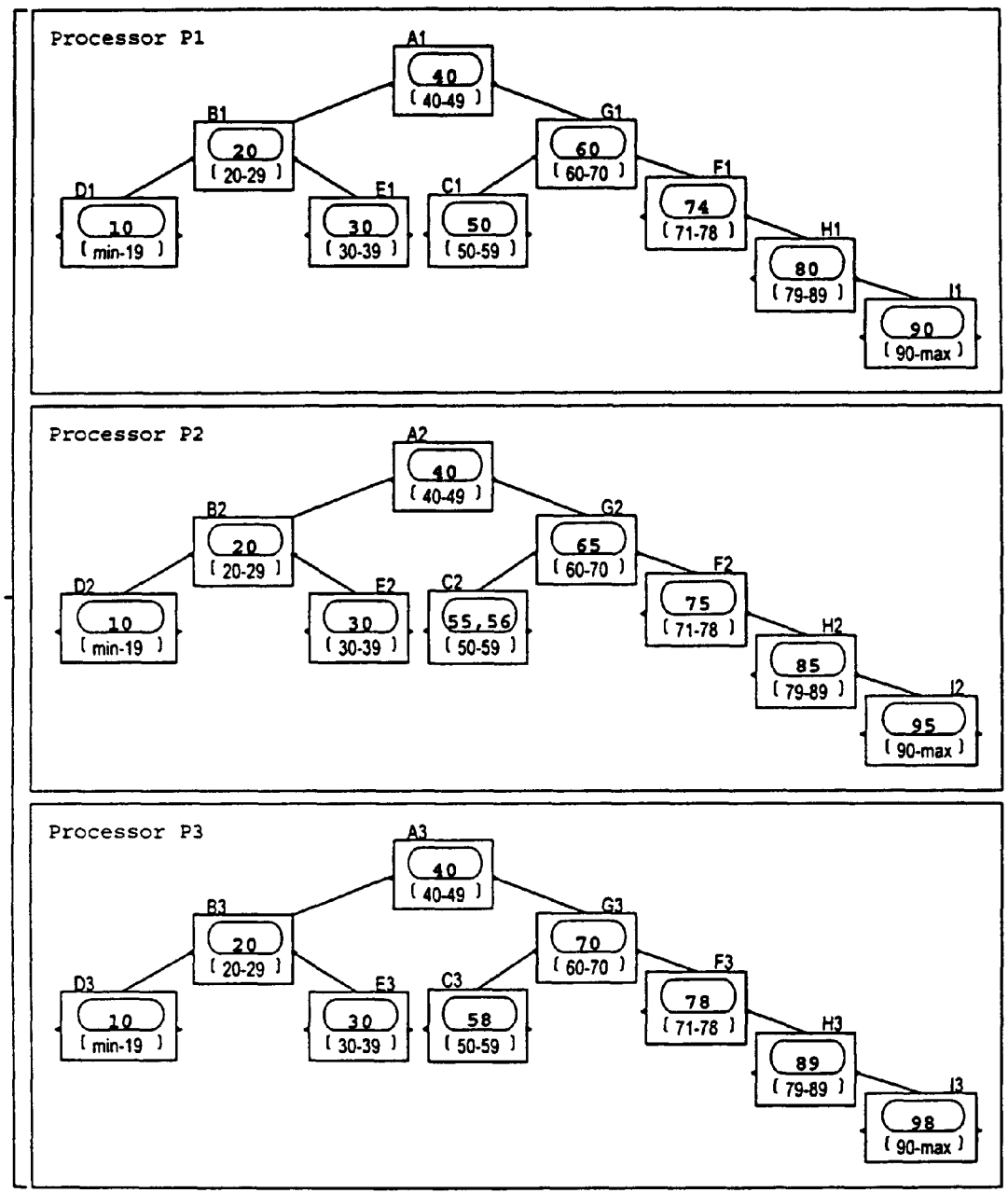
FIG. 25 AVL tree of FIG. 11 after insertion of G-node.
Figure 26:
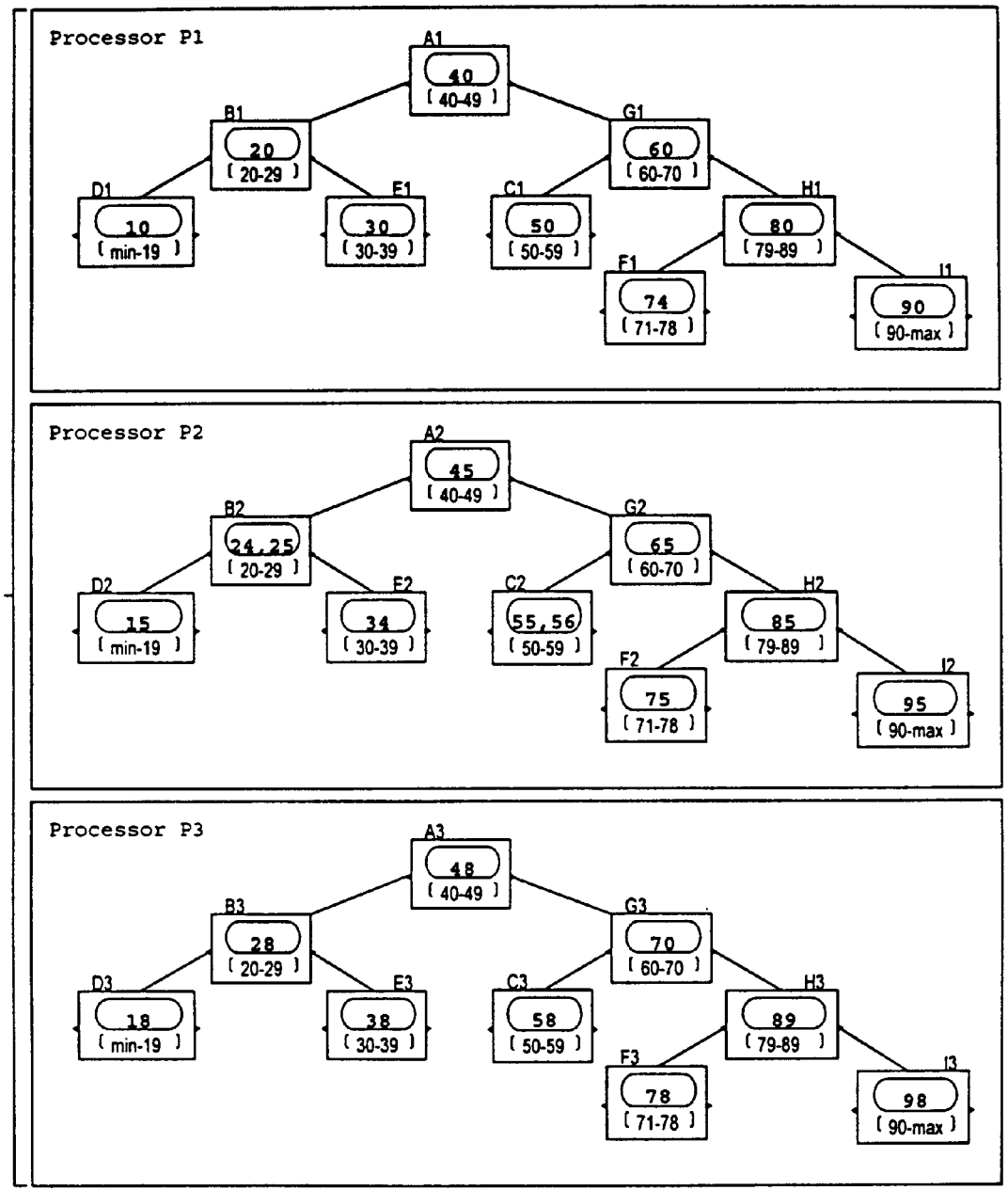
FIG. 26 AVL tree of FIG. 11 after rotation.

The new G-node (I) is placed to right of G-node H because its G-node Range (90-max) is greater than the G-node Range of H (79–89) (FIG. 25). The addition of the new G-node I leaves the AVL tree unbalanced as it did in the single-processor example, therefore we perform RR rotation in parallel (FIG. 26).

4.) Remove(55), Remove(65), Remove(70), [after which Remove(60)]

Remove(55) at P1, Remove(65) at P2, Remove(70) at P3 (performed simultaneously)

Remove(55) at P1
Step 1

Root-node A1: [(55)>(40–49)], travel right to node G1; node G1: [(55)<(60–70], travel left to node C1: node C1: [(55)=(50–59)]—55 falls within the G-node Range (50–59), so processor P1 looks in node C1 for the value 55. 55 is not in node C1 at processor P1, so we must perform Step 2.
Step 2

Figure 27:
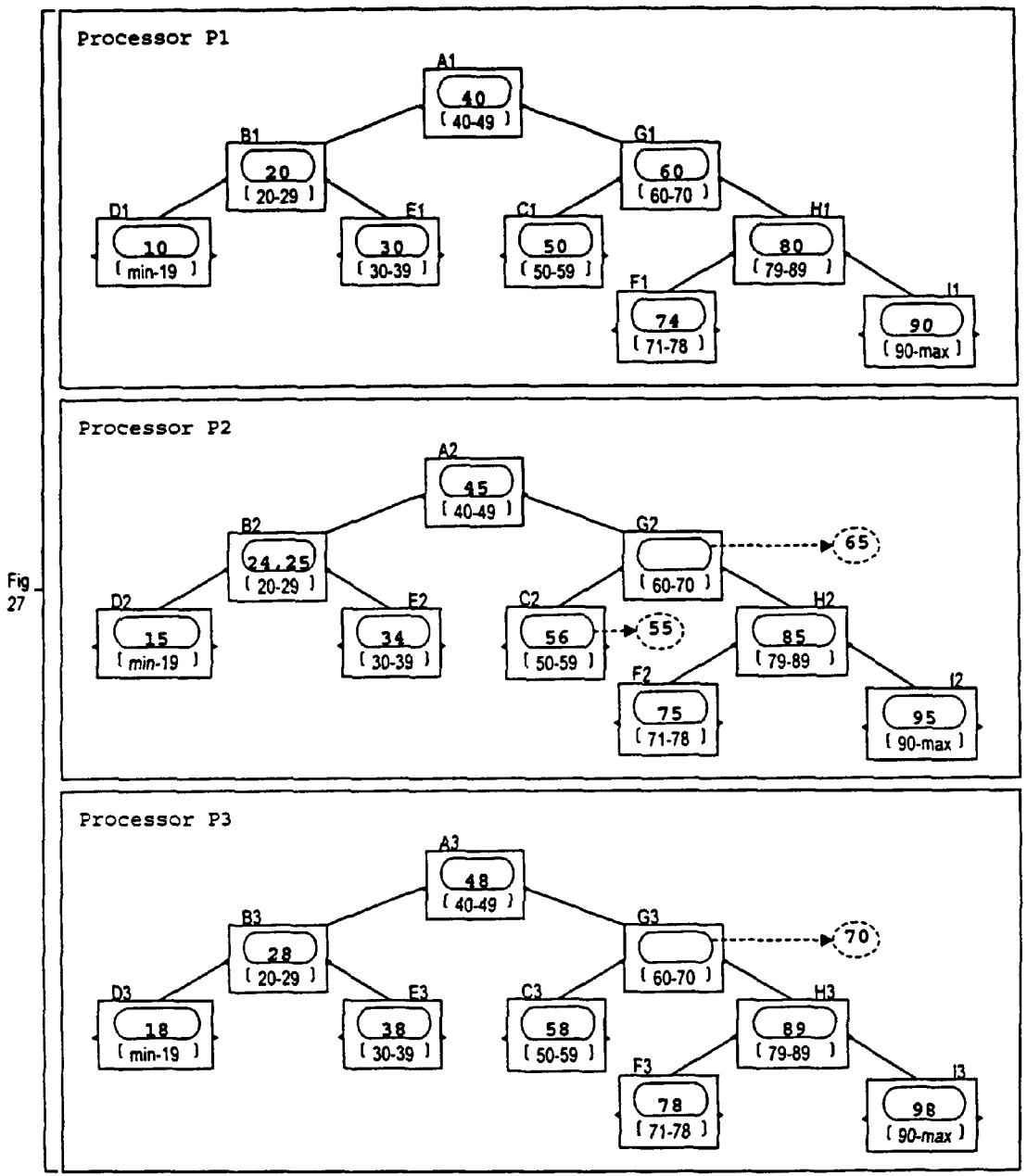
FIG. 27 shows removal of elements from tree of FIG. 11.

P1 send a request to the other processors to look for 55 in their respective nodes C2 and C3. Processor P2 finds 55 in its node. P2 removes the value 55 from node C2 and sends it to P1 (FIG. 27).
Step 3

G-node C is not empty and so Step 3 is not necessary.

Remove(65) at P2

Root-node A2: [(65)>(40–49)], travel right to node G2;
    node G2: [(65)=(60–70)]—65 falls within the G-node Range (60–70), so processor P2 looks in node G2 for the value 65 and finds 65 in G2.

P2 then removes 65 from node G2.

Step 2

The value that P2 searched for (65) was found at P2, therefore Step 2 is not necessary (FIG. 27).

Step 3

G-node G is not empty and so Step 3 is not necessary.

Remove(70) at P3

Root-node A3: [(70)>(40–49)], travel right to node G3; node G3: [(70)=(60–70)]—70 falls within the G-node Range (60–70), so processor P3 looks in node G3 for the value 70 and finds 70 in G3.

P3 then removes 70 from node G3.

Step 2

The value that P3 searched for (70) was found at P3, therefore Step 2 is not necessary (FIG. 27).

Step 3

The G-node in G is not empty and so Step 3 is not necessary.

Remove(60) at P2

Root-node A2: [(60)>(40–49)], travel right to node G2; node G2: [(60=(60–70)]—60 falls within the G-node Range (60–70), so processor P2 looks in node G2 for the value 60. 60 is not in node G2 at processor P2, so we must perform Step 2.

Step 2

Figure 28:
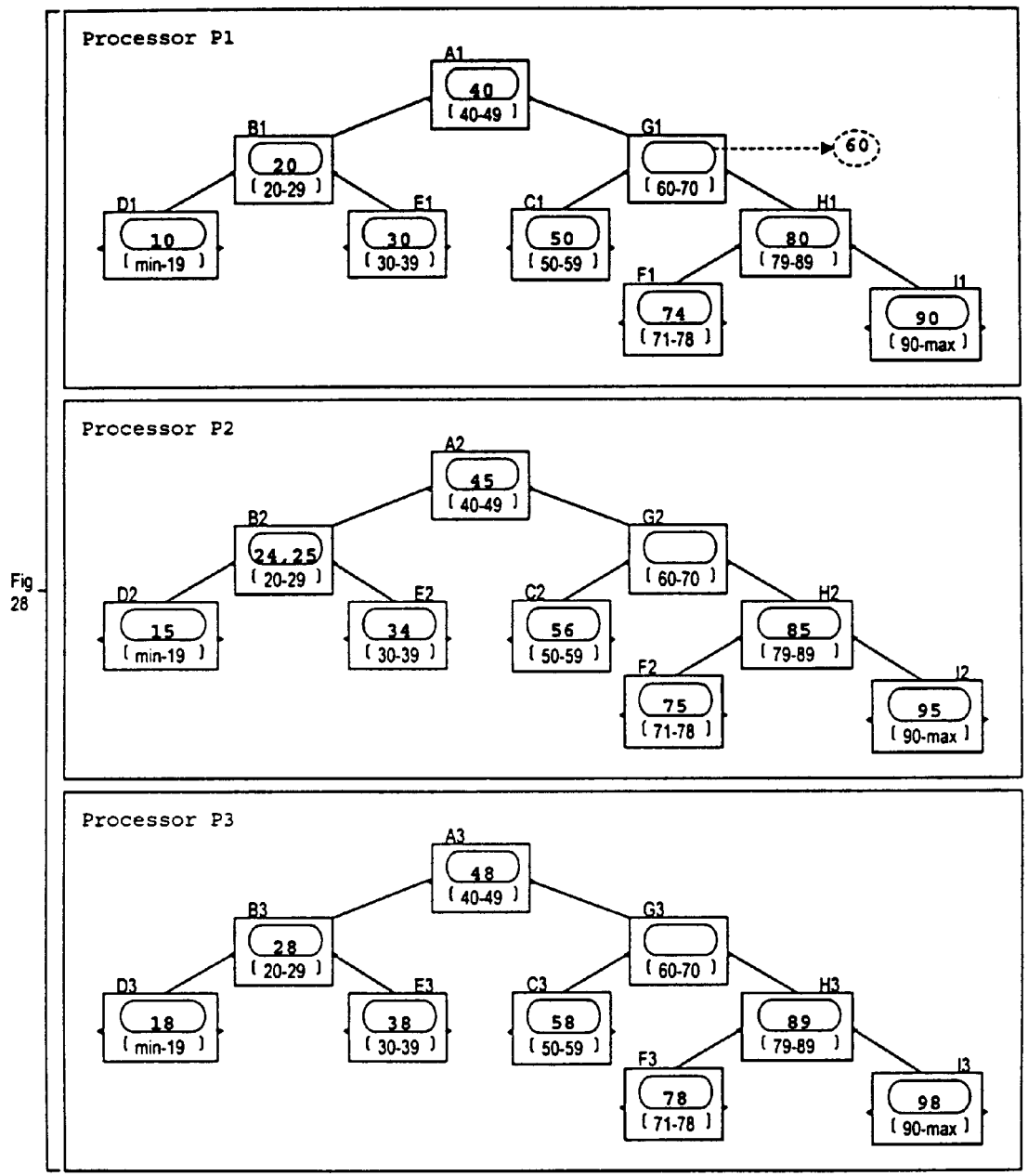
FIG. 28 is shows another removal of elements from tree of FIG. 11.

P2 sends a request to the other processors to look for 60 in their respective nodes G1 and G3. Processor P1 finds 60 in its node G1. P1 removes the value 60 from node G1 and sends it to P2 (FIG. 28).

Step 3

Figure 29:
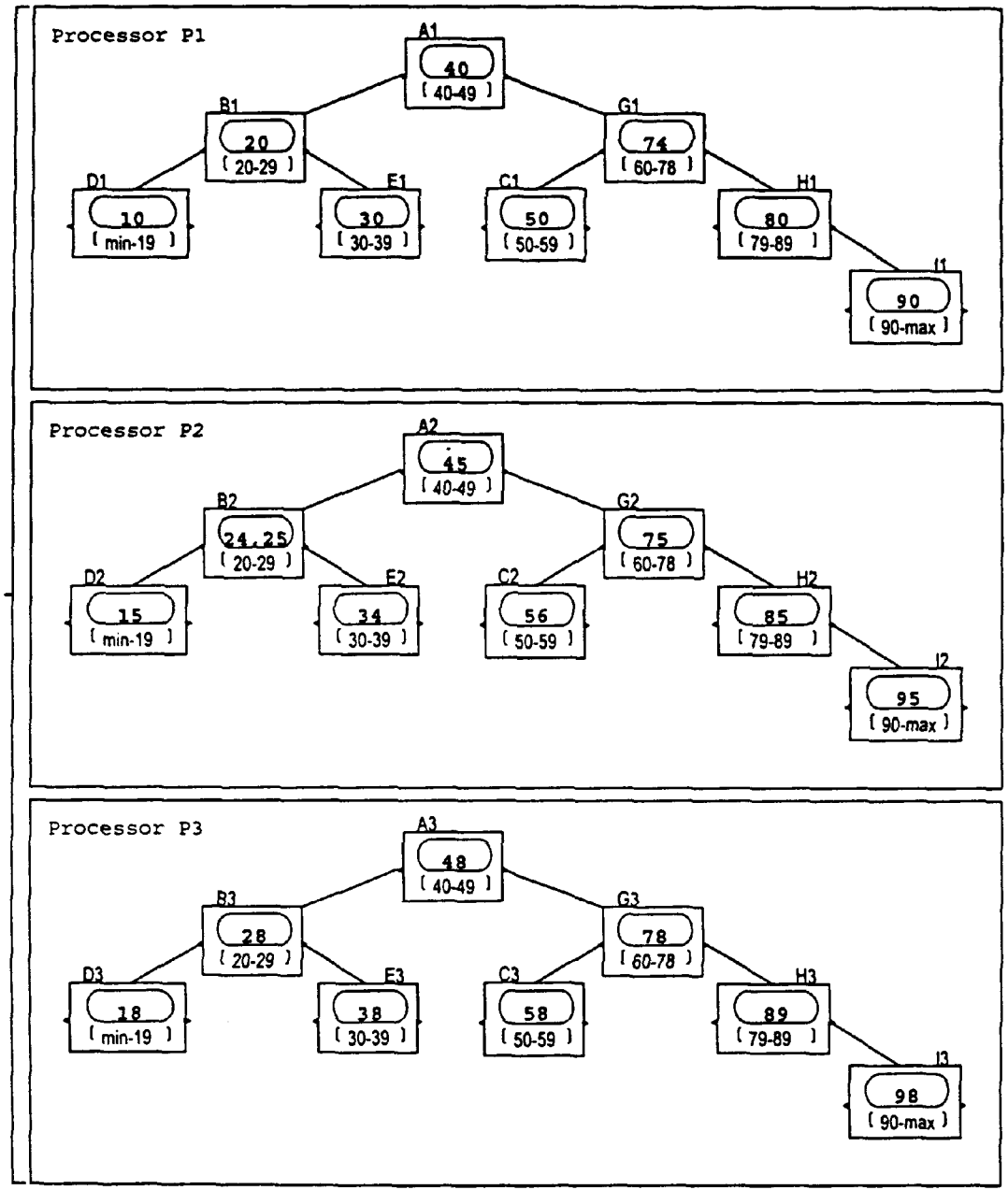
FIG. 29 shows result of G-node removal from tree of FIG. 11.

The G-node in G is empty and so we perform Step 3. The removal of the G-node G is simply a matter of each of the processors P1, P2 and P3 performing a normal AVL node removal. P1 removes G1 from its tree; P2 removes G2 from its tree; P3 removes G3 from its tree. Each of the processors re-orders the tree according to the single-processor AVL tree method and replaces node G with the left-most child of the right sub-tree and performs range adjustment (node F) (FIG. 29).

EXAMPLE 2

Single-processor Method

The single-processor B-tree method is composed of finding the proper location for a new value, adding that value, and performing B-tree splits when the B-tree nodes are full (contain 3 values).

Figure 30:
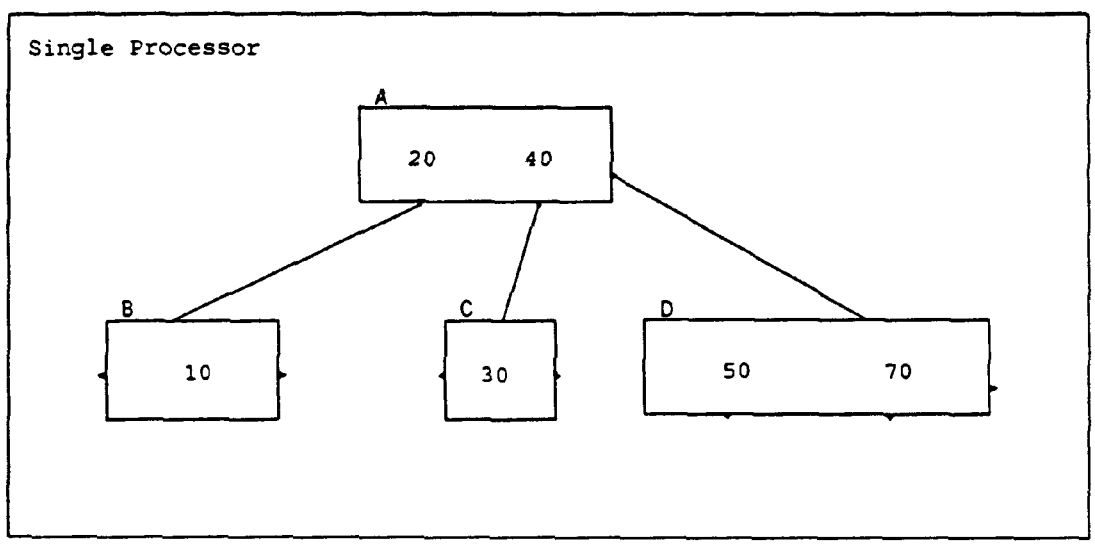
FIG. 30 shows serial B-tree of Example 2 for preferred embodiment, comprising 3 separate trees stored on 3 processors.

Example 2 begins with FIG. 30, showing a properly ordered single-processor B-tree (degree 3) containing the elements from the single-processor initial list.

1.) Insert(60)

Figure 31:
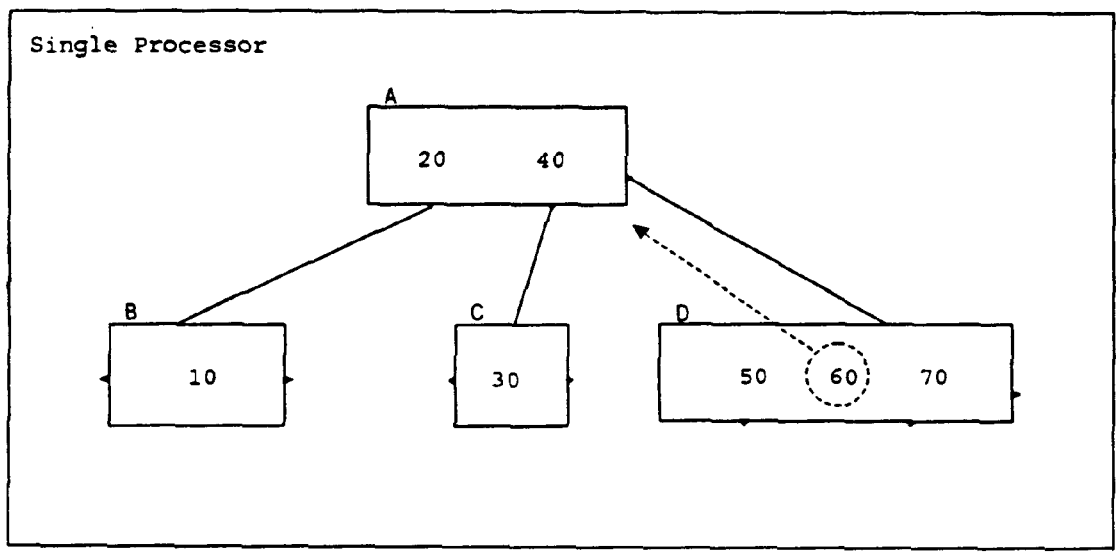
FIG. 31 B-tree of FIG. 30 after addition of element.

Comparing values at each node, moving through the tuples from left to right:

Root-node A: [60>20], move right; [60>40], travel down the right-most link to node D; node D: insert 60 between 50 and 70 at node D (FIG. 31).

Figure 32:
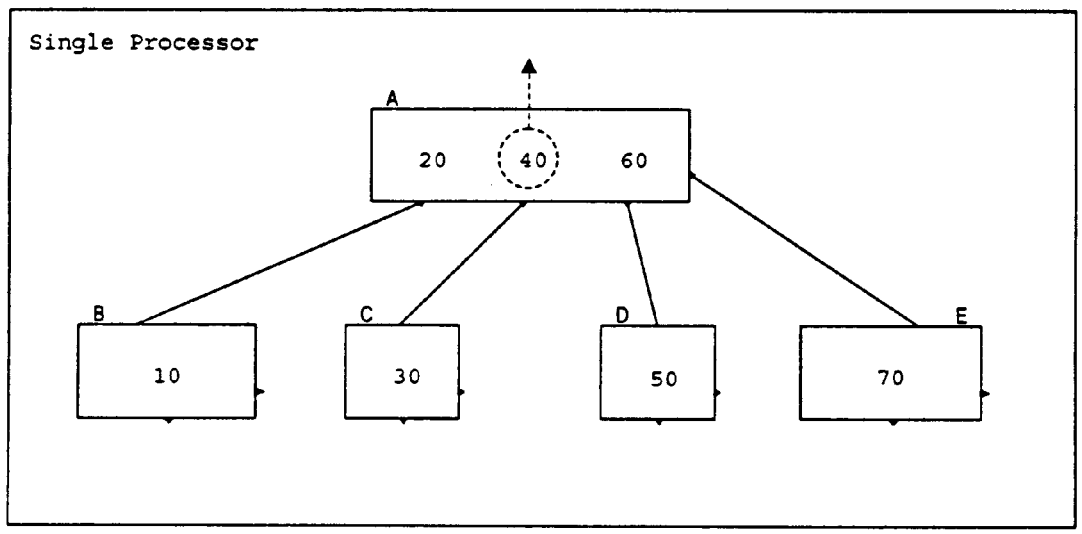
FIG. 32 B-tree of FIG. 30 after b-tree node split.

D now has 3 values and must be split. The right-most value goes in the new node (E). The left most value is kept in node D; the middle value (60) becomes the parent value of D and is re-inserted at the parent node A (FIG. 32).

Figure 33:
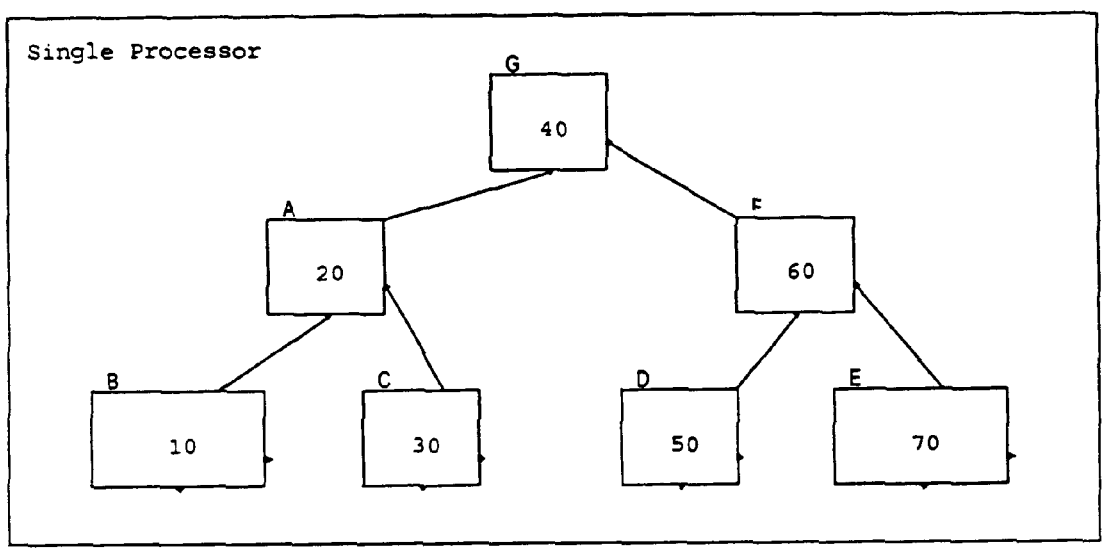
FIG. 33 B-tree of FIG. 30 after additional b-tree node split.

The parent node A (root-node) now has 3 values and must be split. The right-most value goes in the new node (F). The left most value is kept in node A; the middle value (40) becomes the parent value of A and is re-inserted at the parent (no parent exists for the root, so a new root is created—node G) (FIG. 33).

2.) Insert(80)

Figure 34:
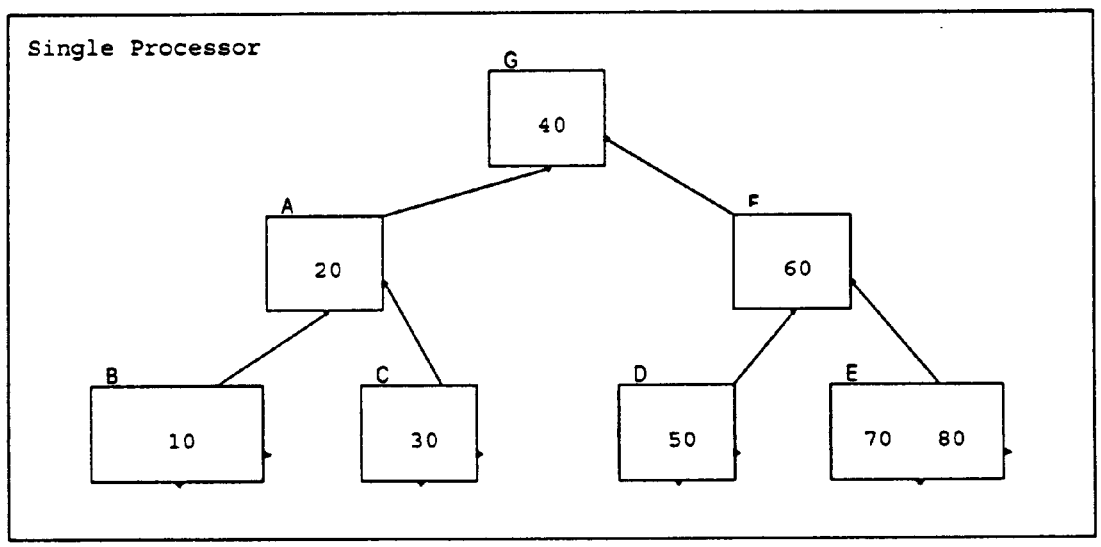
FIG. 34 B-tree of FIG. 30 after another addition.

Root-node G: [80>40] travel right to node F; node F: [80>60] travel right to node E; node E: insert 80 after 70 at node E (FIG. 34).

3.) Insert(90)

Figure 35:
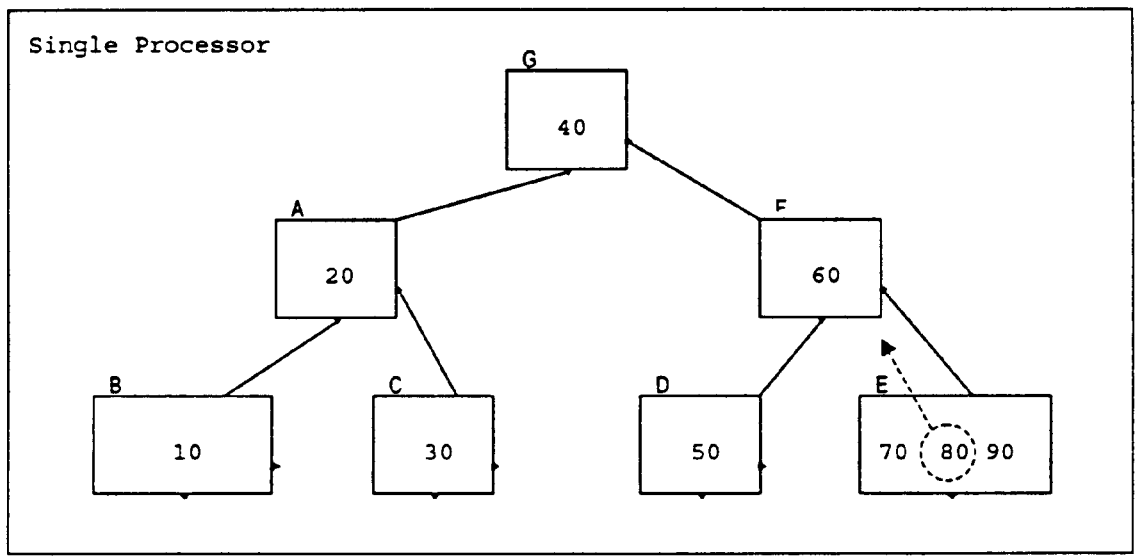
FIG. 35 B-tree of FIG. 30 after another addition.
Figure 36:
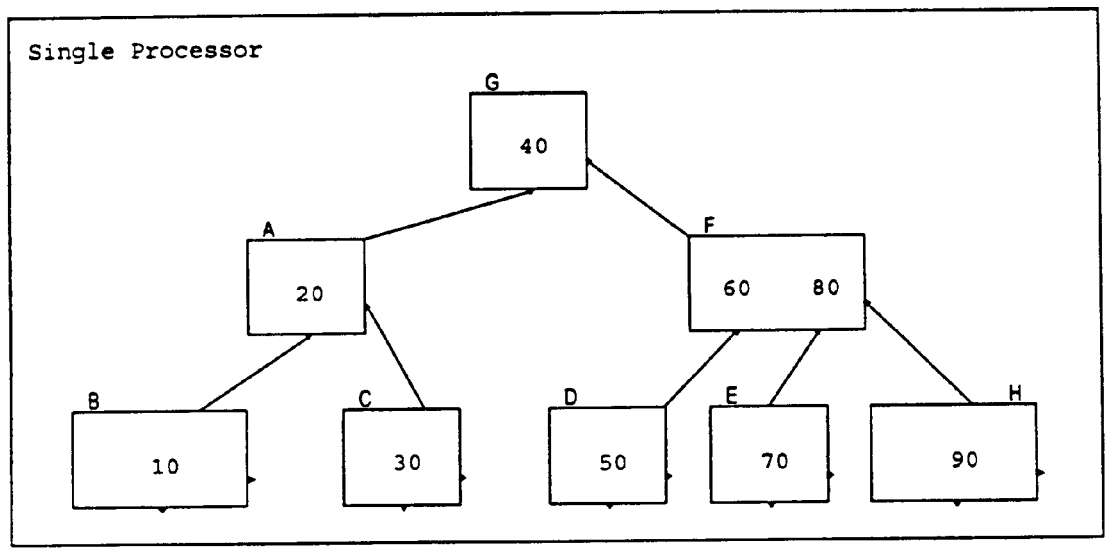
FIG. 36 B-tree of FIG. 30 after b-tree node split.

Root-node G: [90>40], travel right to node F; node F: [90>60], travel right to node E; node E: insert 90 after 80 at node E (FIG. 35). Node E now has 3 values and must be split. The right most value goes in the new node (H). The left most value is kept in node E; the middle value (80) becomes the parent value of E and is re-inserted at the parent node F (FIG. 36).

4.) Remove(60)

Figure 37:
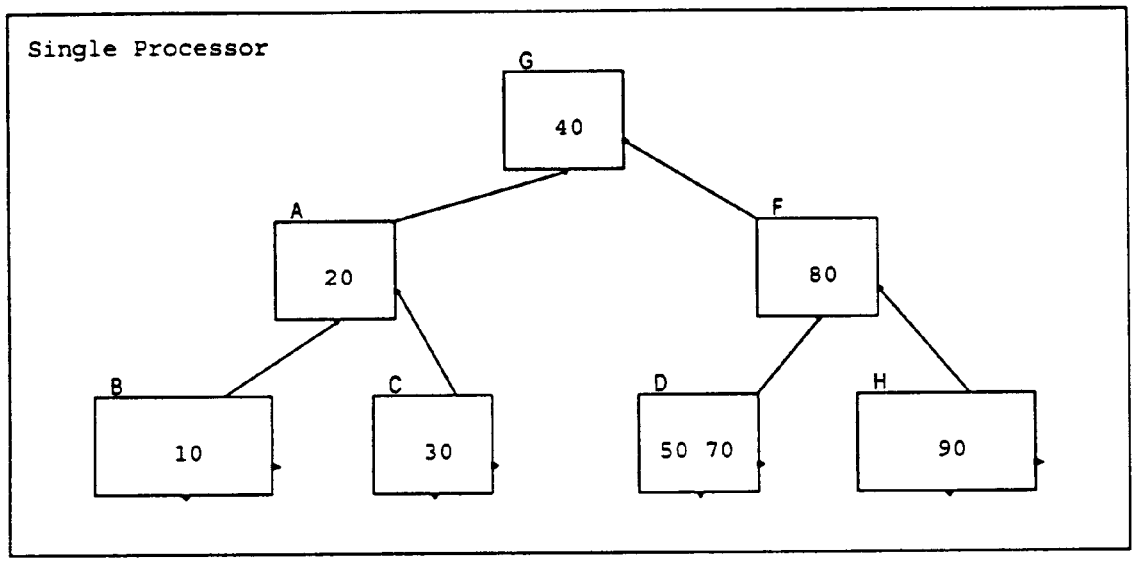
FIG. 37 B-tree of FIG. 30 after removal of element and b-tree node merge.

Root-node G: [60>40], travel right to node F; node F: 60 is found at node F and removed. This leaves F with too few values, so it removes node E, places its value (70) in node D, and makes 80 the parent value of node D (FIG. 37).

Multi-processor Method

The multi-processor B-tree method is composed of finding the proper location for a new value, inserting the values until a G-node Split thereby creating a new G-node, adding that G-node, and performing B-tree splits when the B-tree nodes are full (contain 3 G-nodes). (The G-nodes constitute the elements of the B-tree.)

Refer to Steps 1 through 3 in the Verbal Description Section

Figure 38:
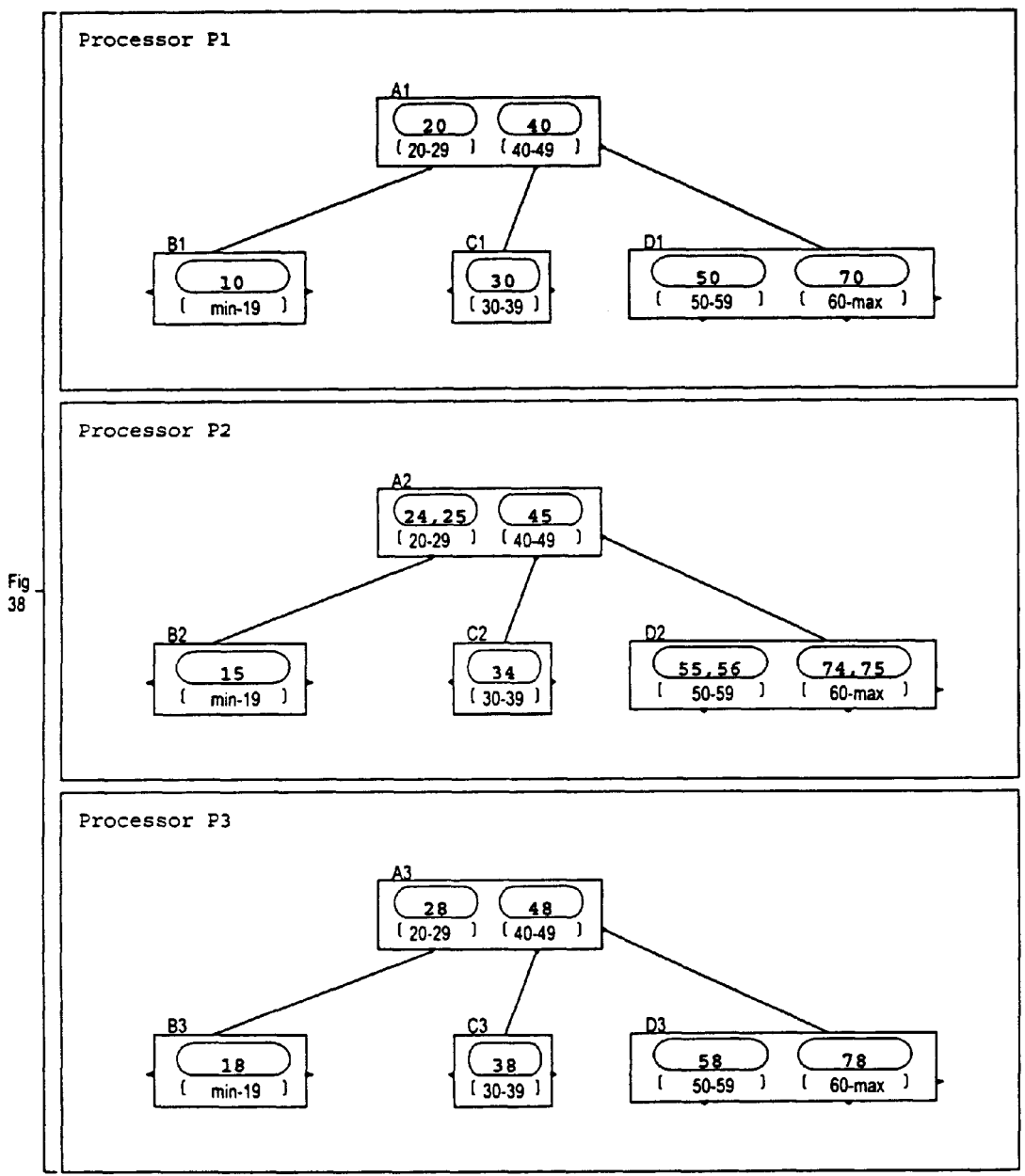
FIG. 38 parallel B-tree of Example 2 for preferred embodiment.

Example 2 (multi-processor) begins with FIG. 38, showing an Adapted B-tree composed of 3 properly ordered B-trees on 3 processors containing the elements from the multi-processor initial list. The G-node Ranges are shown beneath the parallel G-nodes.

1.) Insert(60) [after which Insert(65)]

Insert(60) at processor P1

Step 1

Comparing values at each node, moving through the tuples from left to right:

Root-node A1:[(60)>(20–29)], move right; [(60)> (40–49)], travel down the right-most link to node D1; node D1: insert 60 into right-most G-node in node D.

Step 2

The values are properly ordered within the G-node, so step 2 is not necessary.

Step 3

Figure 39:
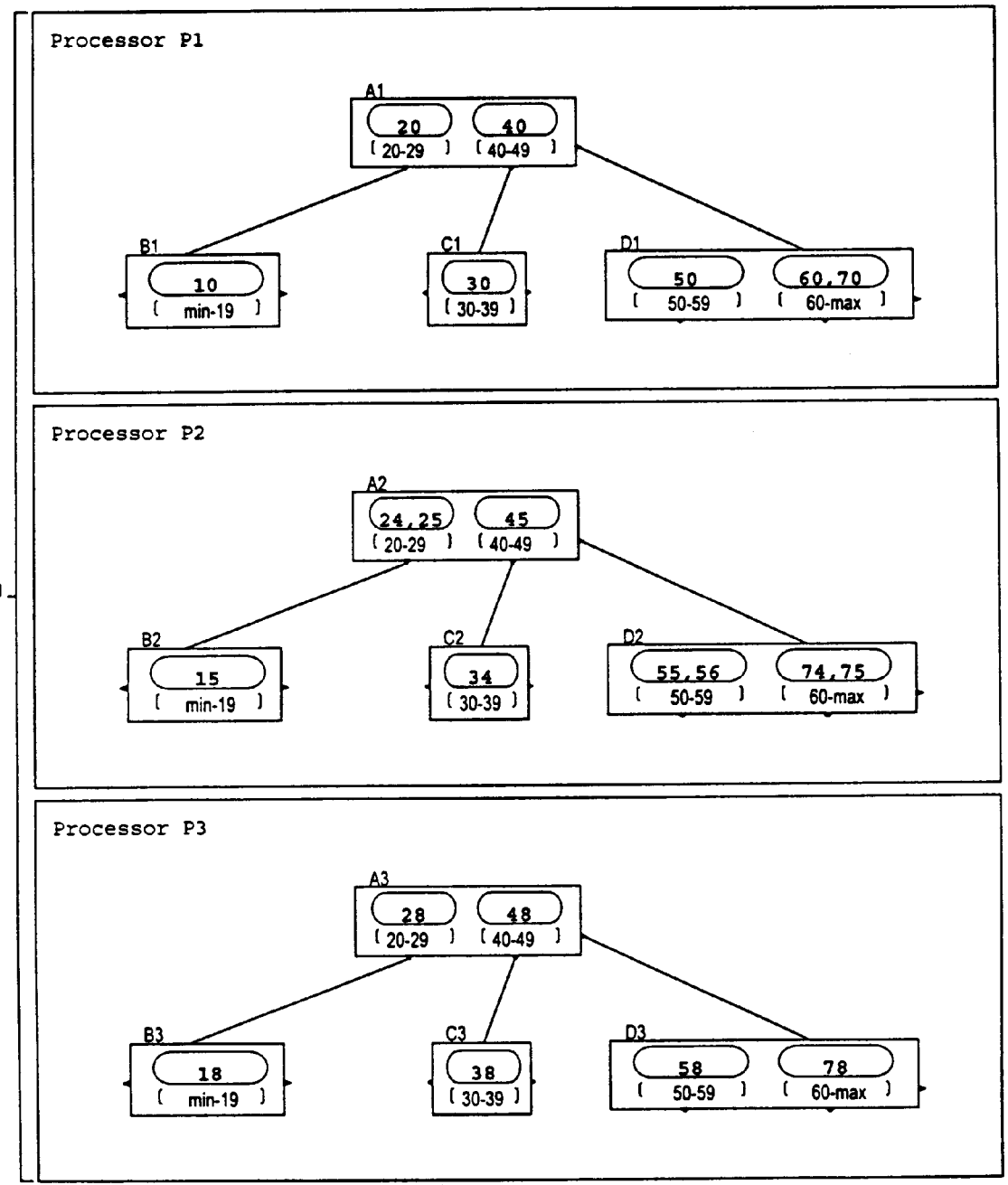
FIG. 39 B-tree of FIG. 38 after addition of element.

The G-node is NOT full, so Step 3 is not necessary (no G-node Split). (Note that although node D1 has three values, it contains only 2 G-nodes and therefore does not need a B-tree split.) (FIG. 39)

Insert (65) at processor P1

Step 1

Figure 40:
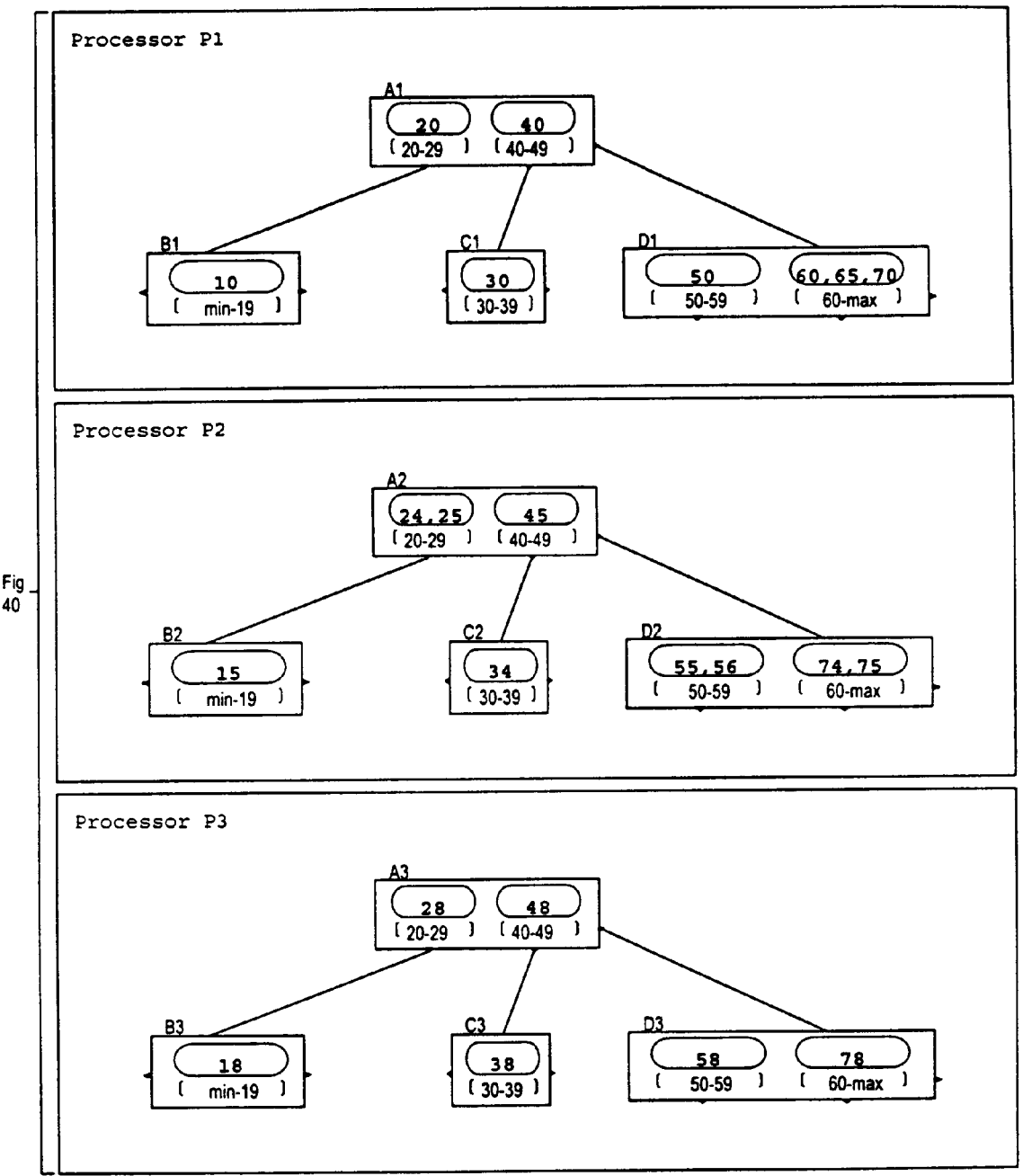
FIG. 40 B-tree of FIG. 38 after another addition.

Root-node A1: [(65)>(20–29)] move right; [(65)> (40–49)], travel down right-most link to node D1; node D1: insert 65 into second G-node in node D (FIG. 40).

Step 2

Figure 41:
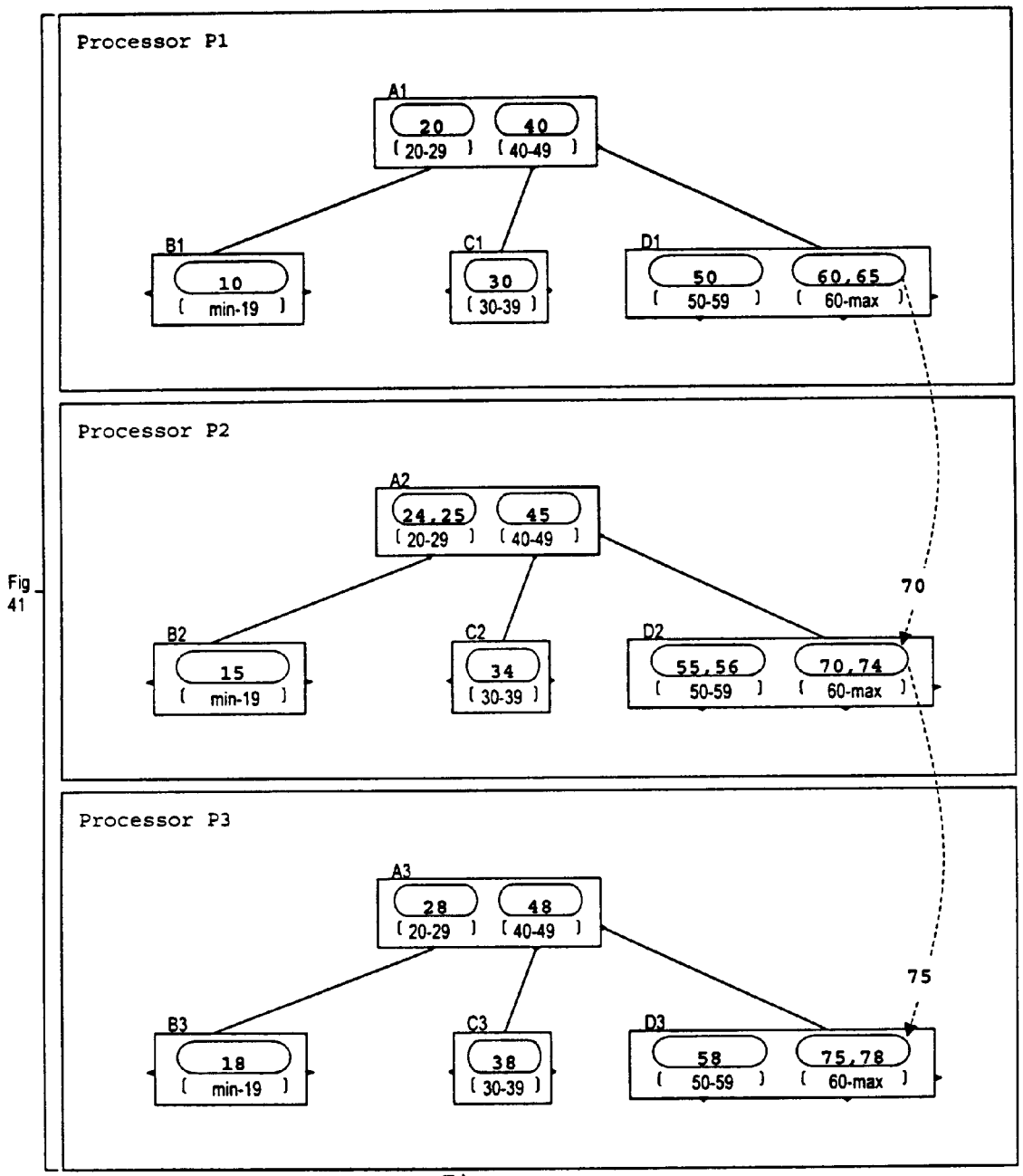
FIG. 41 shows redistribution of elements to maintain Ordering Scheme.

As FIG. 40 shows, the second G-node in D1 at processor P1 has 3 values. This is greater than maximum number of values per processor per G-node, so we perform Step 2 to properly order the values within the G-node, Processor P1 sends the value 70 to P2, and P2 sends 75 to P3. This exchange of elements maintains the Ordering Scheme within G-nodes, locating the proper processors for each value (rule 2 listed above) (FIG. 41).

Step 3

After addition of 65 to this G-node, the G-node is full, therefore we perform a G-node Split. The G-node Split divides the values 60,65,70,74,75,78 into two ranges. The lower range is placed into a newly created G-node, the upper range is kept in the existing G-node (FIG. 15).

Figure 42:
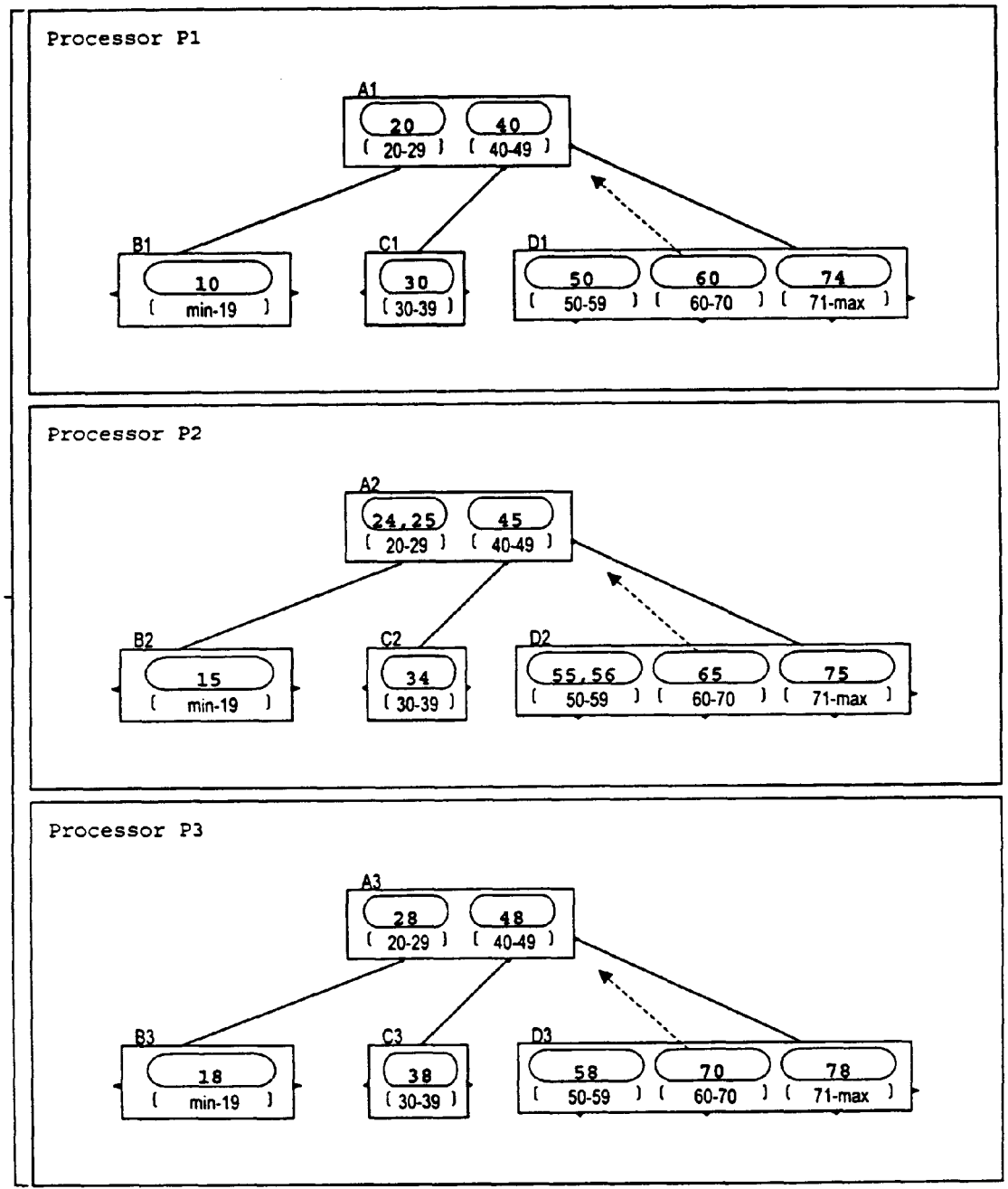
FIG. 42 B-tree of FIG. 38 after insertion of G-node.
Figure 43:
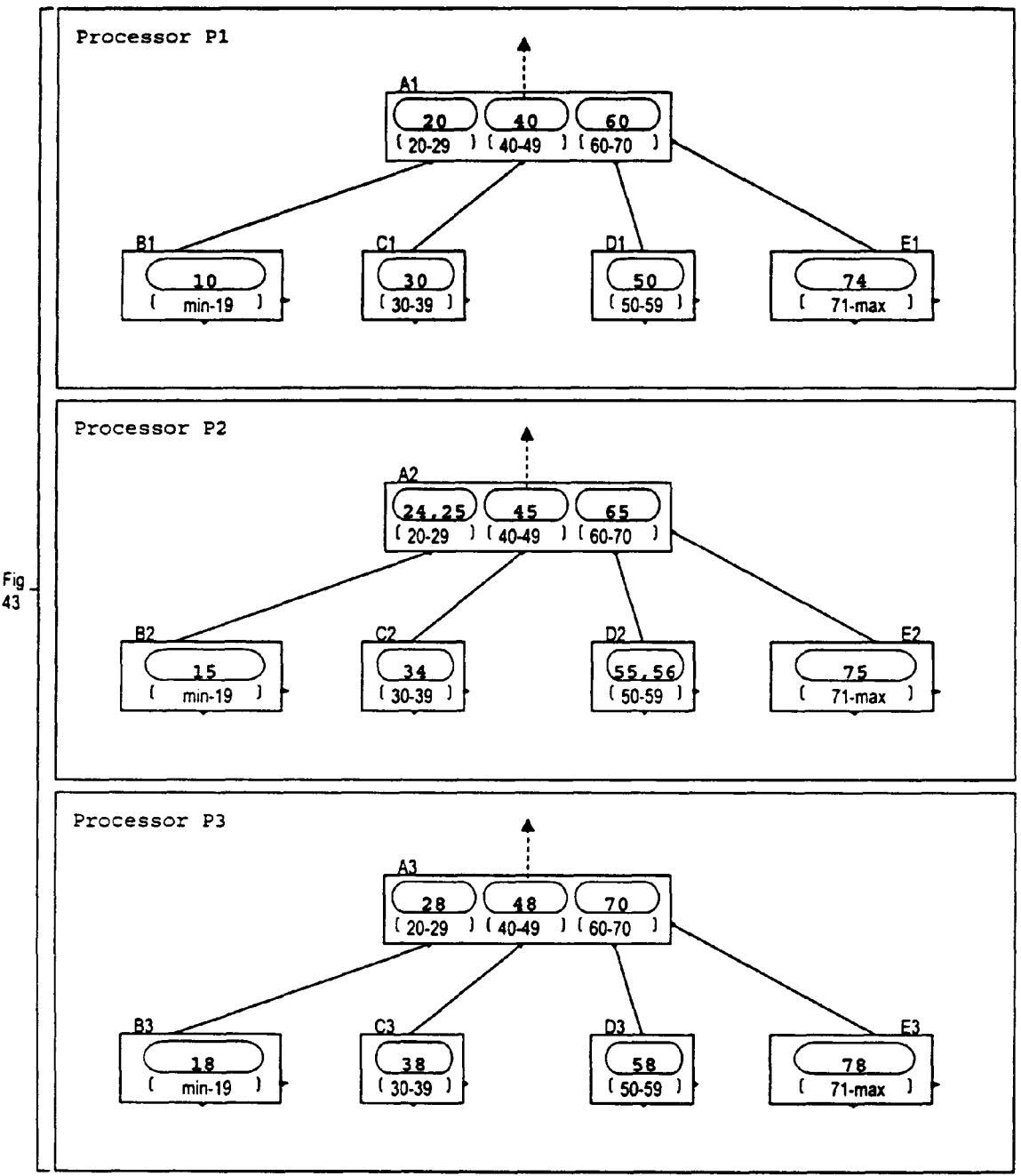
FIG. 43 B-tree of FIG. 38 after b-tree node split.
Figure 44:
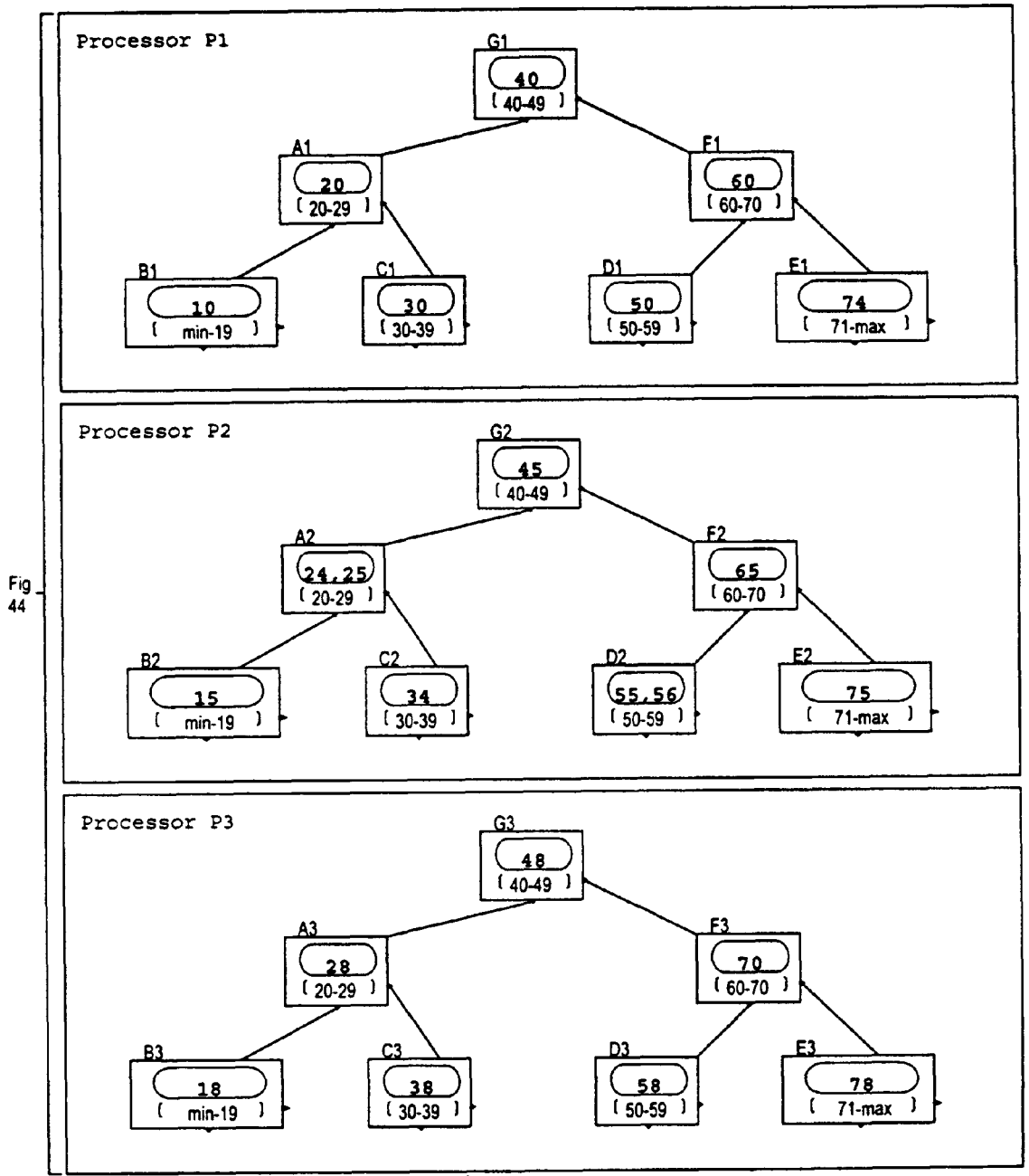
FIG. 44 B-tree of FIG. 38 after additional b-tree node split.

The new G-node is placed to left of the existing G-node because its G-node Range (60–70) is less than the G-node Range (71-max) (FIG. 42). D now contains 3 G-nodes and must be split (B-tree split). The right most G-node goes in the new B-tree node (E). The left most G-node is kept in B-tree node D; the middle G-node with G-node Range (60–70) becomes the parent value of D and is re-inserted at the parent node A (FIG. 43). The parent node A (B-tree-root-node) now has 3 G-nodes and must be split. The right most G-node goes in the new B-tree node (F). The left most G-node is kept in node A; the middle G-node (40–49) becomes the parent value of A and is re-inserted at the parent (no parent exists for the root, so a new root is created—B-tree node G) (FIG. 44).

2.) Insert(80),Insert(89),Insert(85)

These three Insertions are performed simultaneously. Because the Insertions at processors P1, P2, and P3 all follow the same procedure, we will follow Step 1 only at processor P2.

Insert(80) at P1, Insert(89) at P2, Insert(85) at P3 Step 1 at processor P2:

Root-node G2: [(89)>(40–49)], travel right to node F2; node F2: [(89)>(60–70)], travel right to node E2; node E2: [(89)=(71-max)]—89 falls within G-node Range (71-max), so we add 89 to this G-node at processor P2. Following identical comparisons at processors P1 and P3, the values 80 and 85 have been added to the same G-node (FIG. 45).

Step 2

Figure 45:
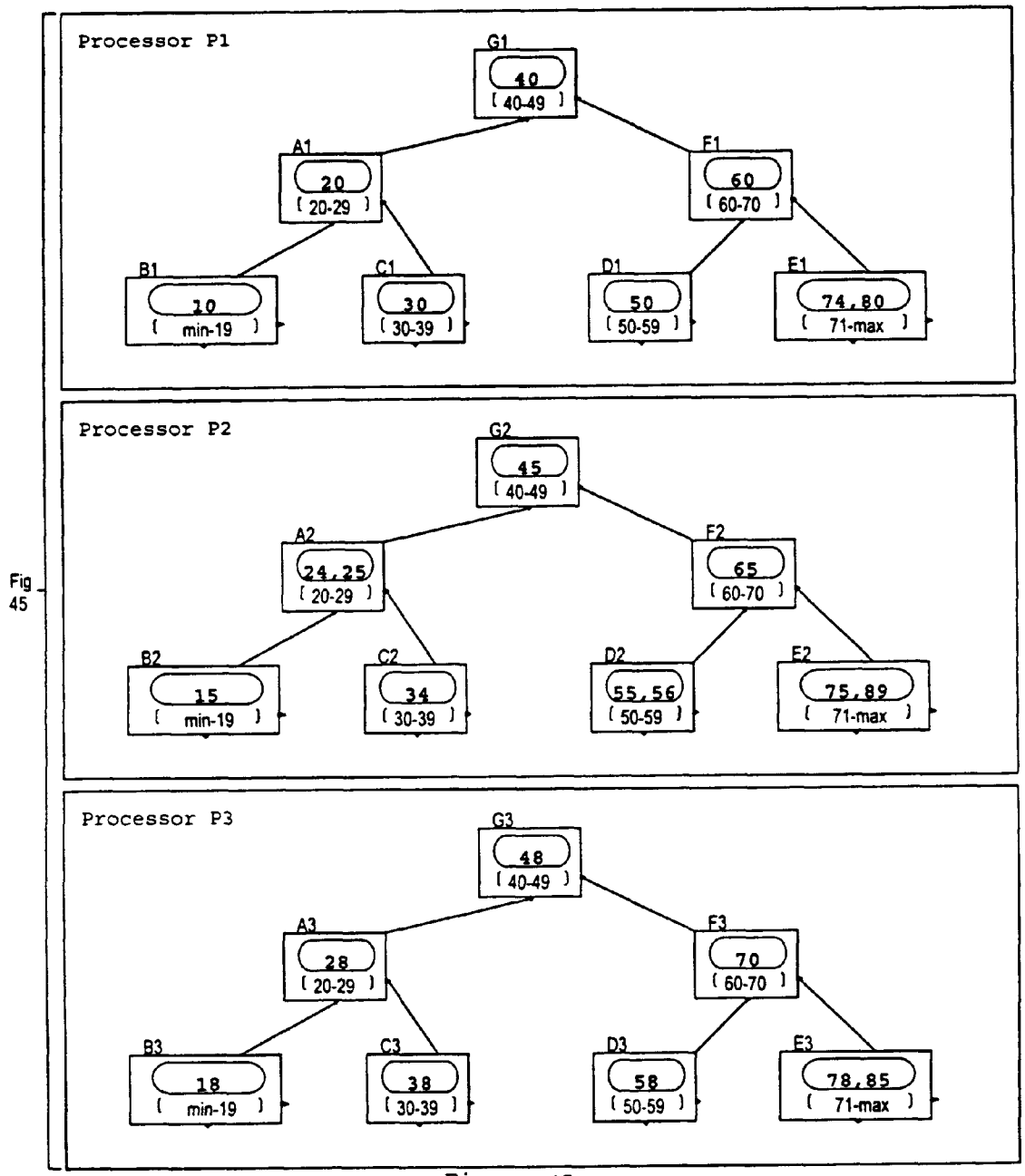
FIG. 45 B-tree of FIG. 38 after another addition of elements.
Figure 46:
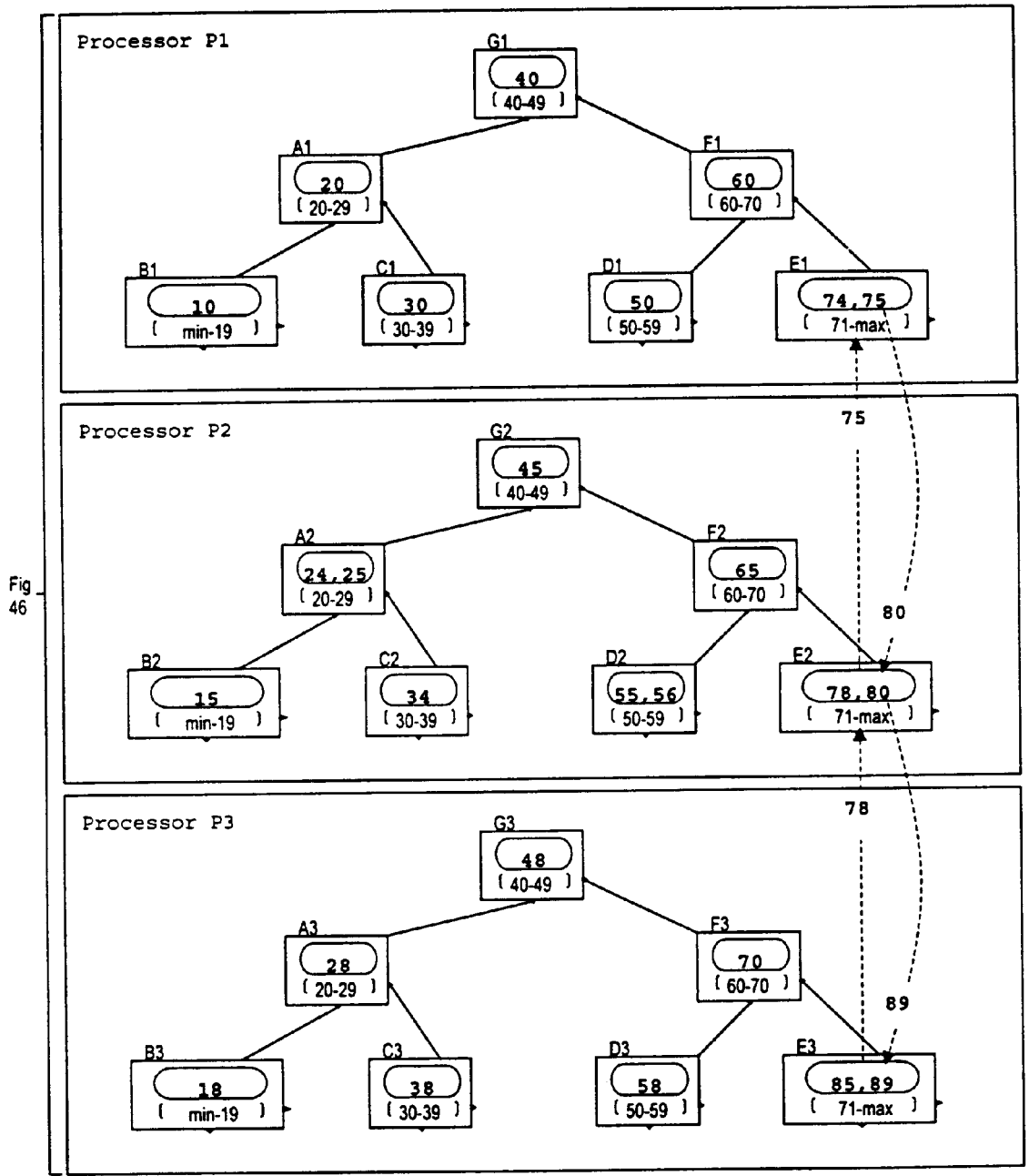
FIG. 46 shows redistribution of elements to maintain Ordering Scheme.

As FIG. 45 shows, the values are not arranged in ascending order within the G-node at E, so we perform Step 2. Processor P1 sends the value 80 to P2, and P2 sends 75 to P1 and also 89 to P3, P3 sends 78 to P2. This exchange of elements maintains the Ordering Scheme within G-nodes, locating the proper processors for each value (rule 2 listed above) (FIG. 46).

Step 3

After addition of 80, 89 and 85 to this G-node, the G-node is full, therefore we perform a G-node Split. The G-node Split divides the values 74,75,78,80,85,89 into two ranges. The lower range is placed into a newly created G-node, the upper range is kept in the existing G-node (FIG. 20).

Figure 47:
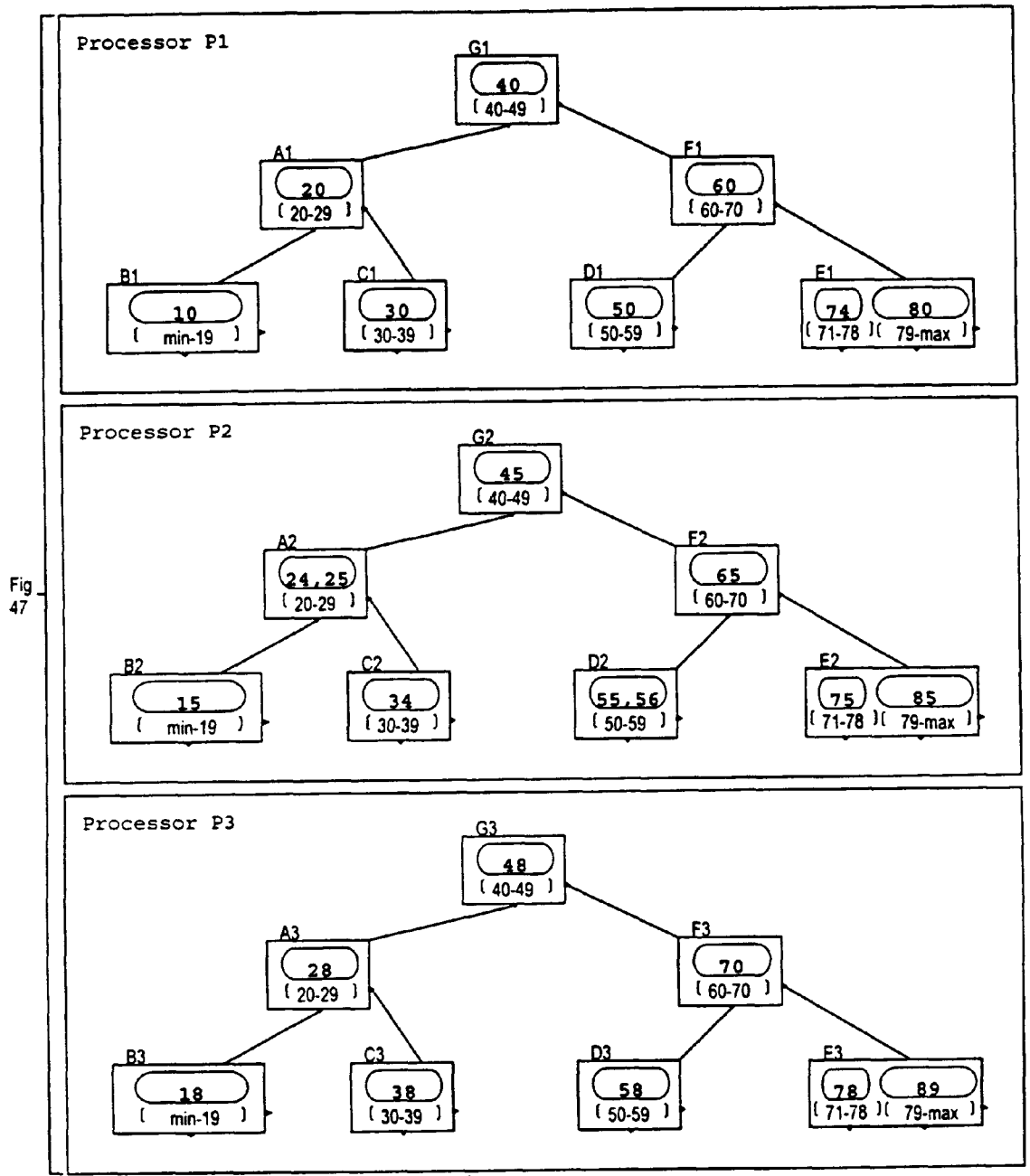
FIG. 47 B-tree of FIG. 38 after insertion of G-node.

The new G-node is placed to left of the existing G-node because its G-node Range (71–78) is less than the G-node Range (79-max) (FIG. 47).

3.) Insert(98),Insert(95),Insert(90)

These three Insertions are performed simultaneously. Because the Insertions at processors P1, P2, and P3 all follow the same procedure, we will follow Step 1 only at processor P3.

Insert(98) at P1, Insert(95) at P2, Insert(90) at P3

Step 1 at processor P3:

Root-node G3: [(90)>(40–49)], travel right to node F3; node F3: [(90)>(60–70)], travel right to node E3; node E3: [(90)>(71–78)], move right; [(90)=(79-max)]—90 falls within G-node Range (79-max), so we add 90 to this G-node at processor P3. Following identical comparisons at processors P1 and P2, the values 98 and 95 have been added to the same G-node (FIG. 48).

Step 2

Figure 48:
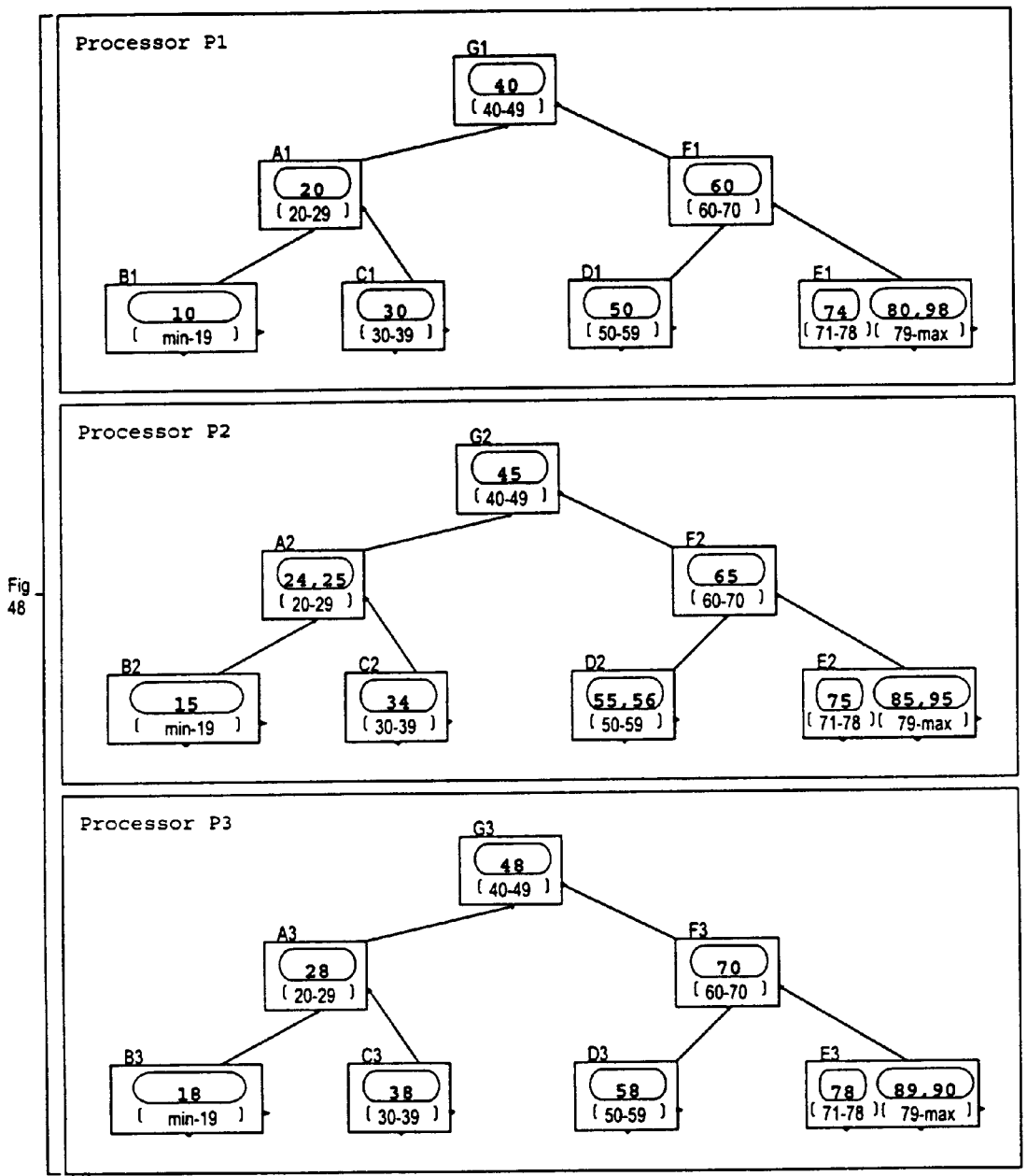
FIG. 48 B-tree of FIG. 38 after another addition of elements.
Figure 49:
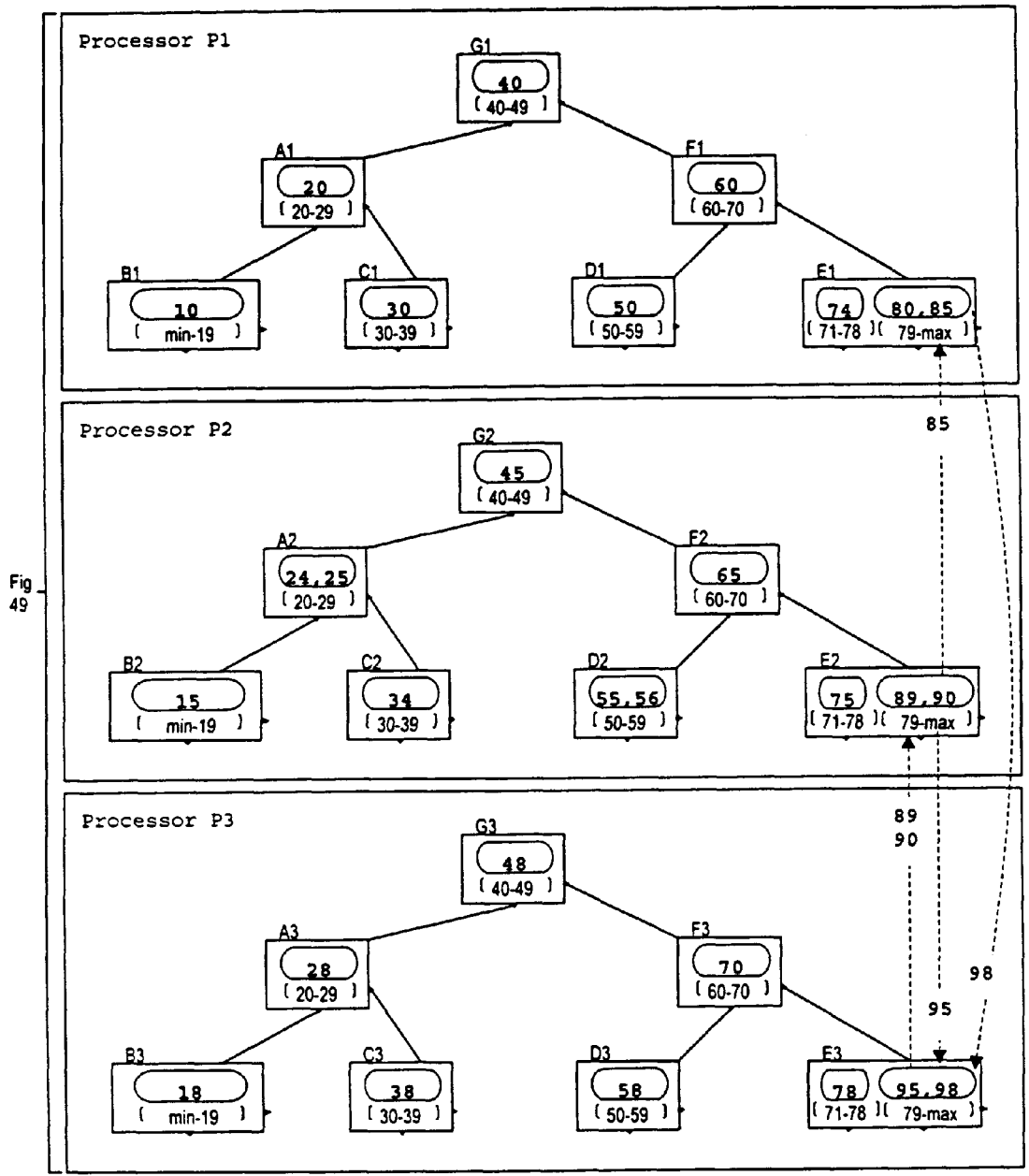
FIG. 49 shows redistribution of elements to maintain Ordering Scheme.

As FIG. 48 shows, the values are not arranged in ascending order within the G-node at E, so we perform Step 2. Processor P1 sends the value 98 to P3, and P2 sends 85 to P1 and also 95 to P3, P3 sends 89 and 90 to P2. This exchange of elements maintains the Ordering Scheme within G-nodes, locating the proper processors for each value (rule 2 listed above) (FIG. 49).

Step 3

After addition of 98, 95 and 90 to this G-node, the G-node is full, therefore we perform a G-node Split. The G-node Split divides the values 80,85,89,90,95,98 into two ranges. The lower range is placed into a newly created G-node, the upper range is kept in the existing G-node (FIG. 24).

Figure 50:
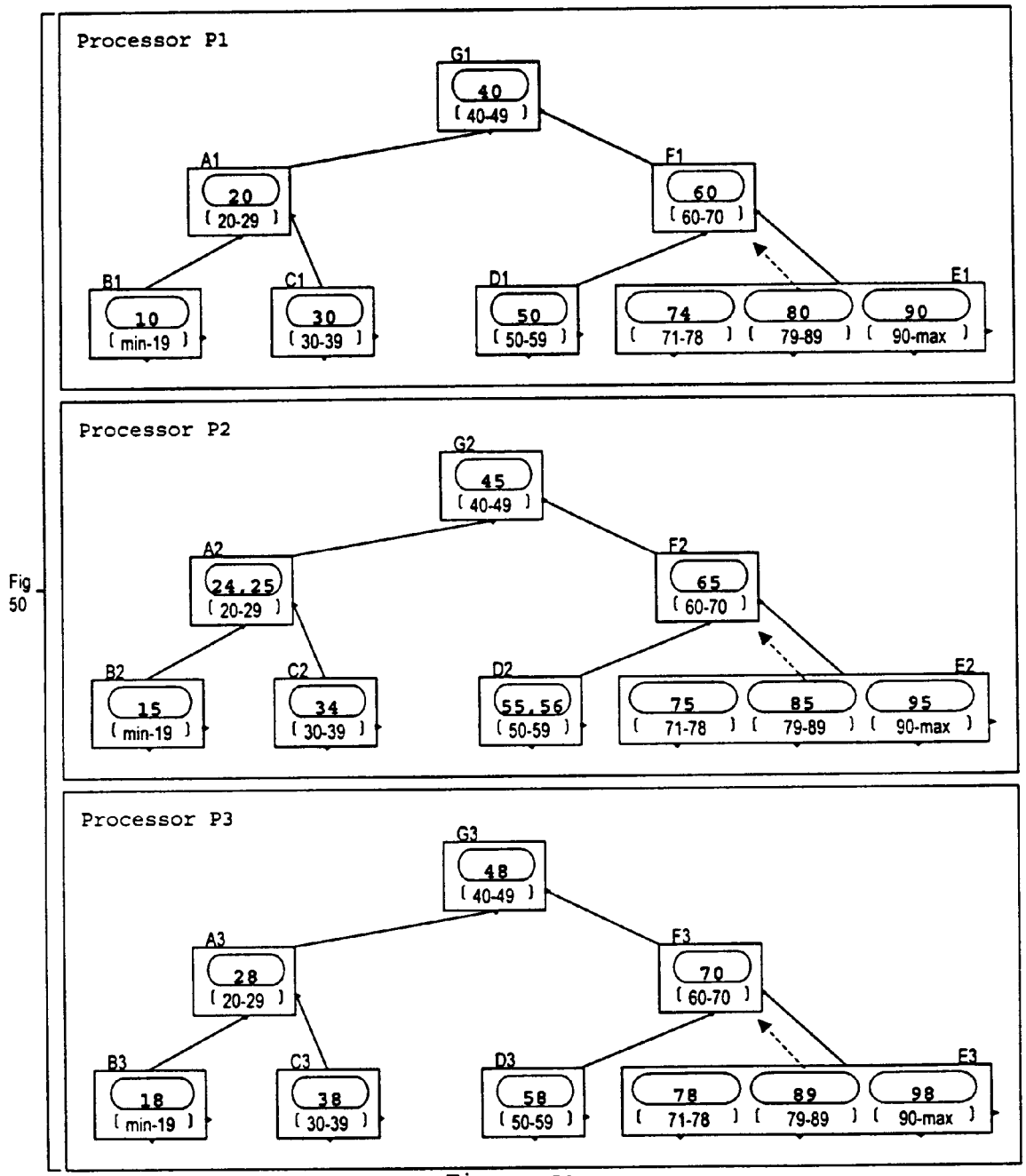
FIG. 50 B-tree of FIG. 38 after insertion of G-node.
Figure 51:
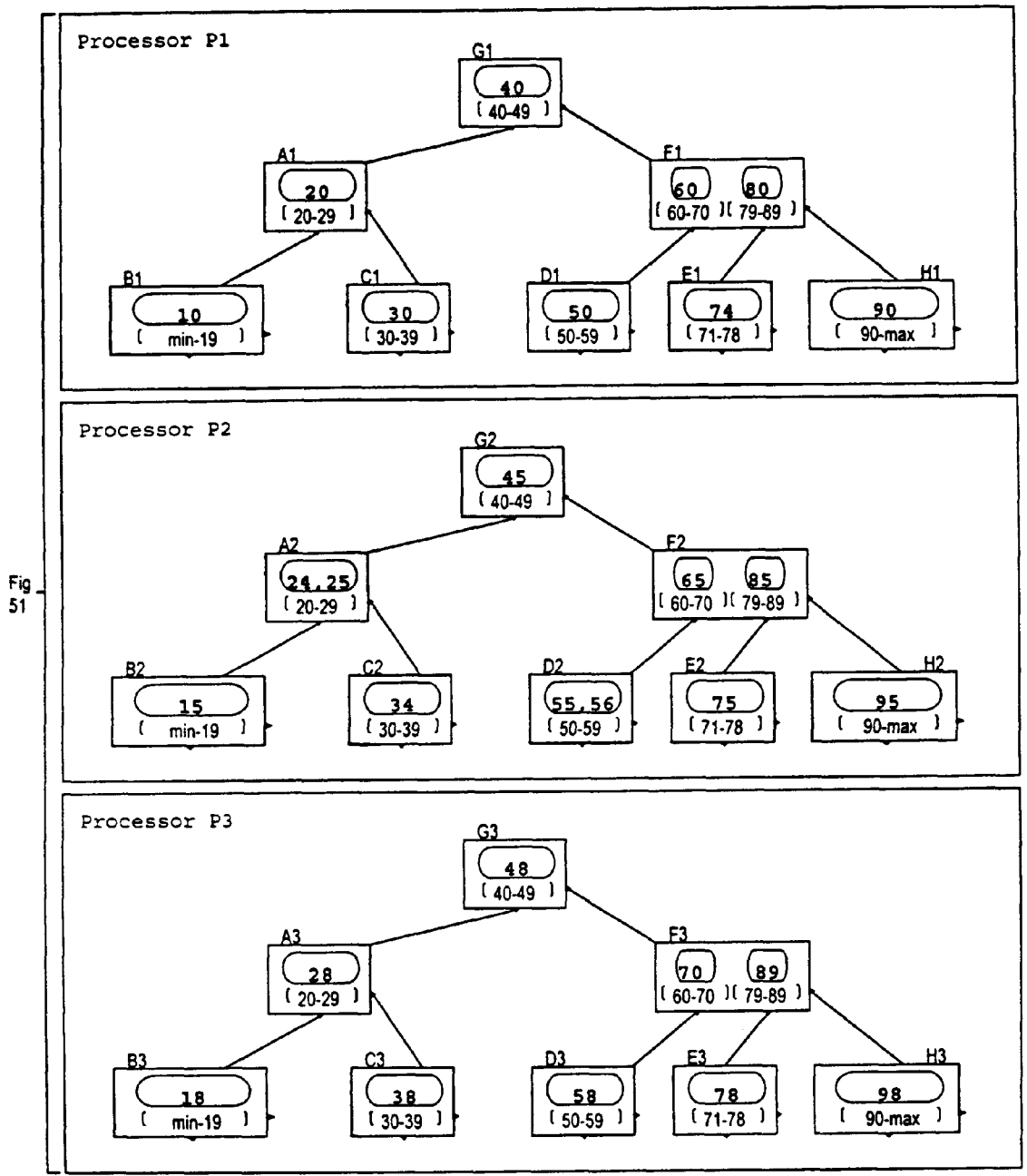
FIG. 51 B-tree of FIG. 38 after b-tree node split.

The new G-node is placed to left of the existing G-node because its G-node Range (79–89) is less than the G-node Range (90-max) (FIG. 50). Node E now has 3 G-nodes and must be split (B-tree split). The right most G-node goes in the new node (H). The left most G-node is kept in node E; the middle G-node (79–89) becomes the parent G-node of E and is re-inserted at the parent node F (FIG. 51).

4.) Remove(55), Remove(65), Remove(70), [after which Remove(60)]

Remove(55) at P1, Remove(65) at P2, Remove(70) at P3 (performed simultaneously)

Remove(55) at P1

Step 1

Root-node G1: [(55)>(40–49)], travel right to node F1; node F1: [(55)<(60–70], travel left to node D1: node D1: [(55)=(50–59)]—55 falls within the G-node Range (50–59), so processor P1 looks in node D1 for the value 55. 55 is not in node D1 at processor P1, so we must perform Step 2.

Step 2

Figure 52:
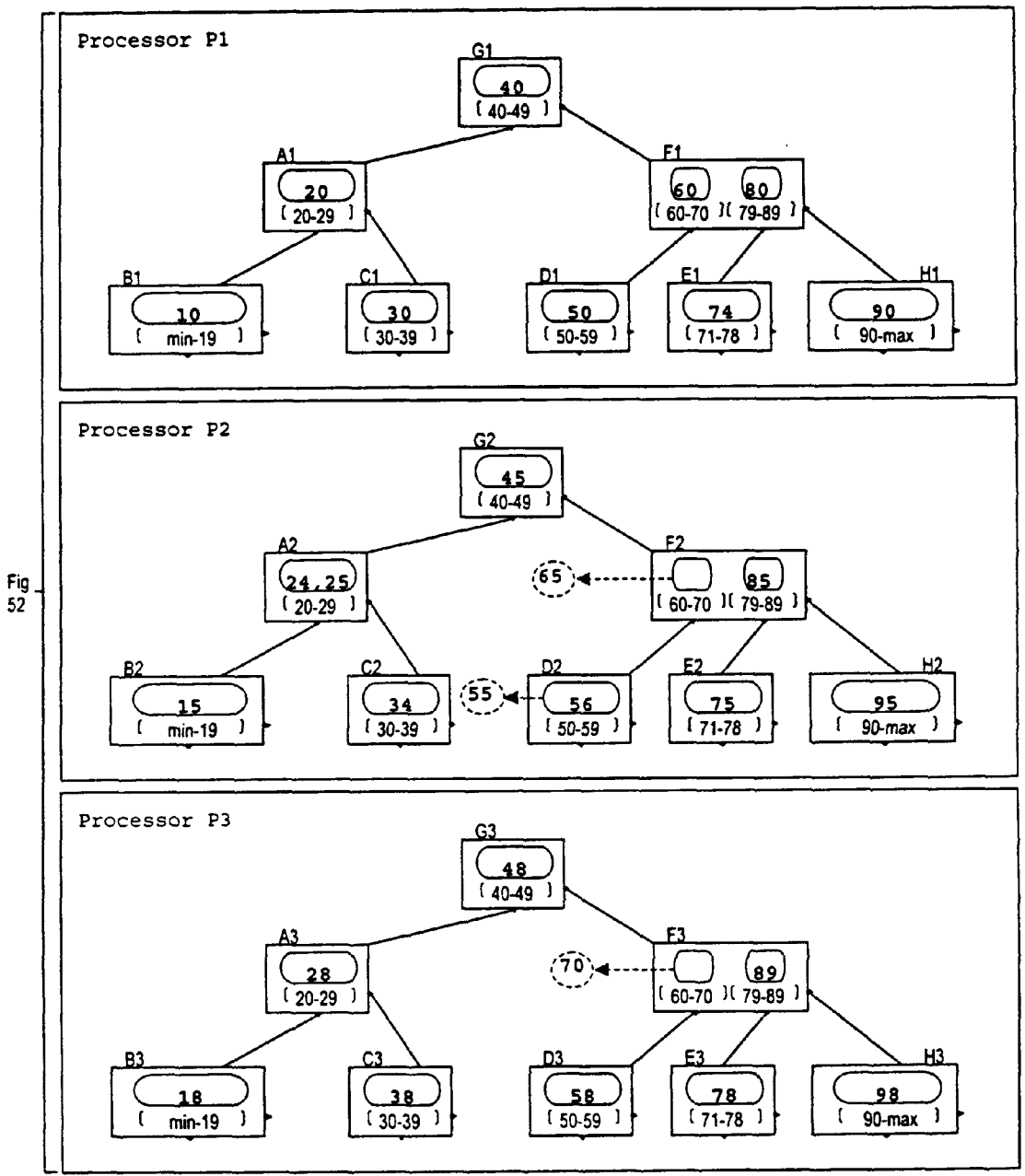
FIG. 52 shows removal of elements from tree of FIG. 38.

P1 send a request to the other processors to look for 55 in their respective nodes D2 and D3. Processor P2 finds 55 in its node D2. P2 removes the value 55 from node D2 and sends it to P1 (FIG. 52).

Step 3

The G-node in D is not empty and so Step 3 is not necessary.

Remove (65) at P2 Root-node G2: [(65)>(40–49)], travel right to node F2; node F2: [(65)=(60–70)]—65 falls within the G-node Range (60–70), so processor P2 looks in node F2 for the value 65 and finds 65 in F2. P2 then removes 65 from node F2.

Step 2

The value that P2 searched for (65) was found at P2, therefore Step 2 is not necessary (FIG. 52).

Step 3

The G-node in F is not empty and so Step 3 is not necessary.

Remove(70) at P3

Root-node G3: [(70)>(40–49)], travel right to node F3; node F3: [(70)=(60–70)]—70 falls within the G-node Range (60–70), so processor P3 looks in node F3 for the value 70 and finds 70 in F3. P3 then removes 70 from node F3.

Step 2

The value that P3 searched for (70) was found at P3, therefore Step 2 is not necessary (FIG. 52).

Step 3

The G-node in F is not empty and so Step 3 is not necessary.

Remove(60) at P2

Root-node G2:[(60)>(40–49)], travel right to node F2; node F2: [(60=(60–70)]—60 falls within the G-node Range (60–70), so processor P2 looks in node F2 for the value 60. 60 is not in node F2 at processor P2, so we must perform Step 2.

Step 2

Figure 53:
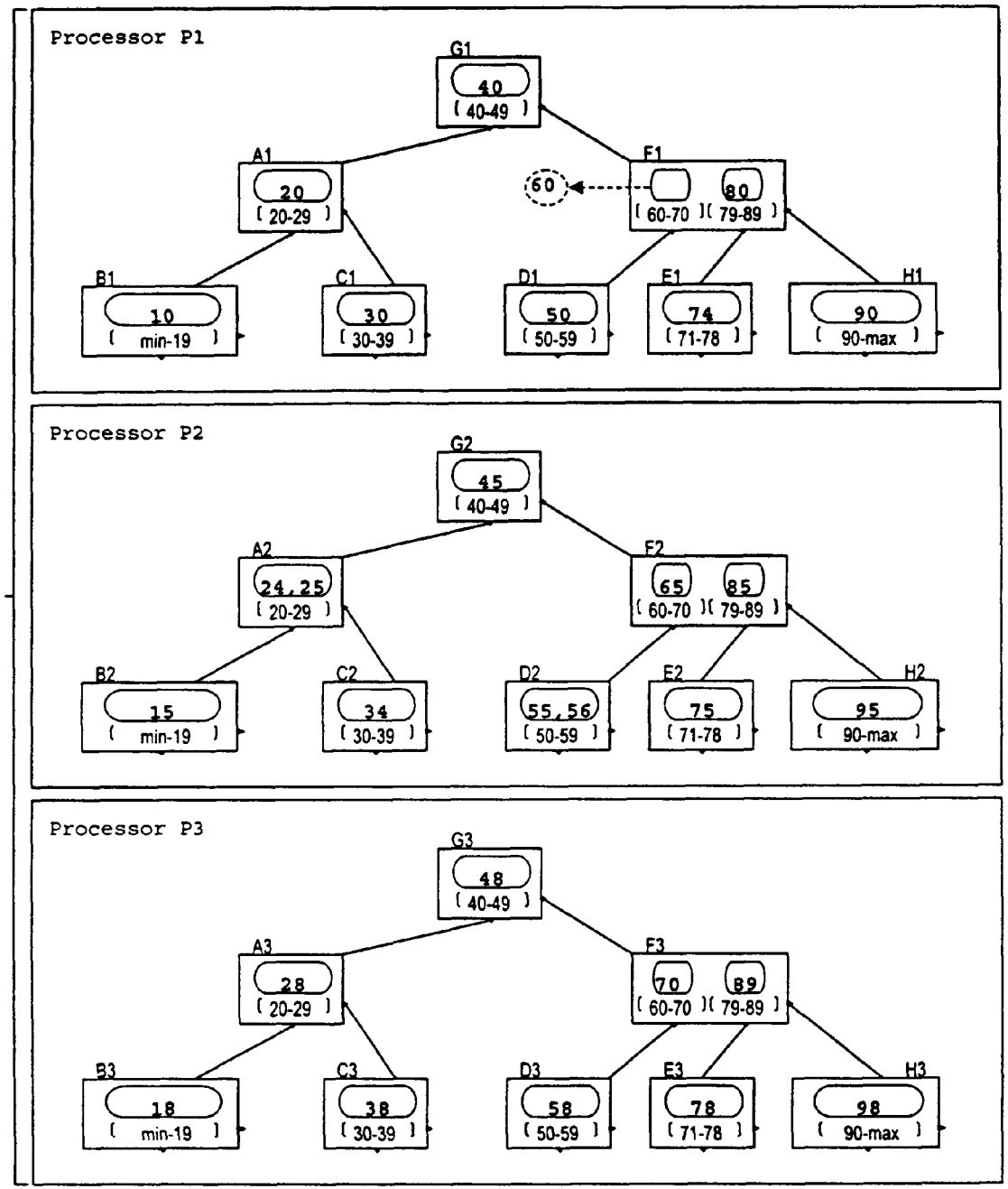
FIG. 53 shows another removal of element from tree of FIG. 38.

P2 sends a request to the other processors to look for 60 in their respective nodes F1 and F3. Processor P1 finds 60 in its node F1. P1 removes the value 60 from node F1 and sends it to P2 (FIG. 53).

Step 3

Figure 54:
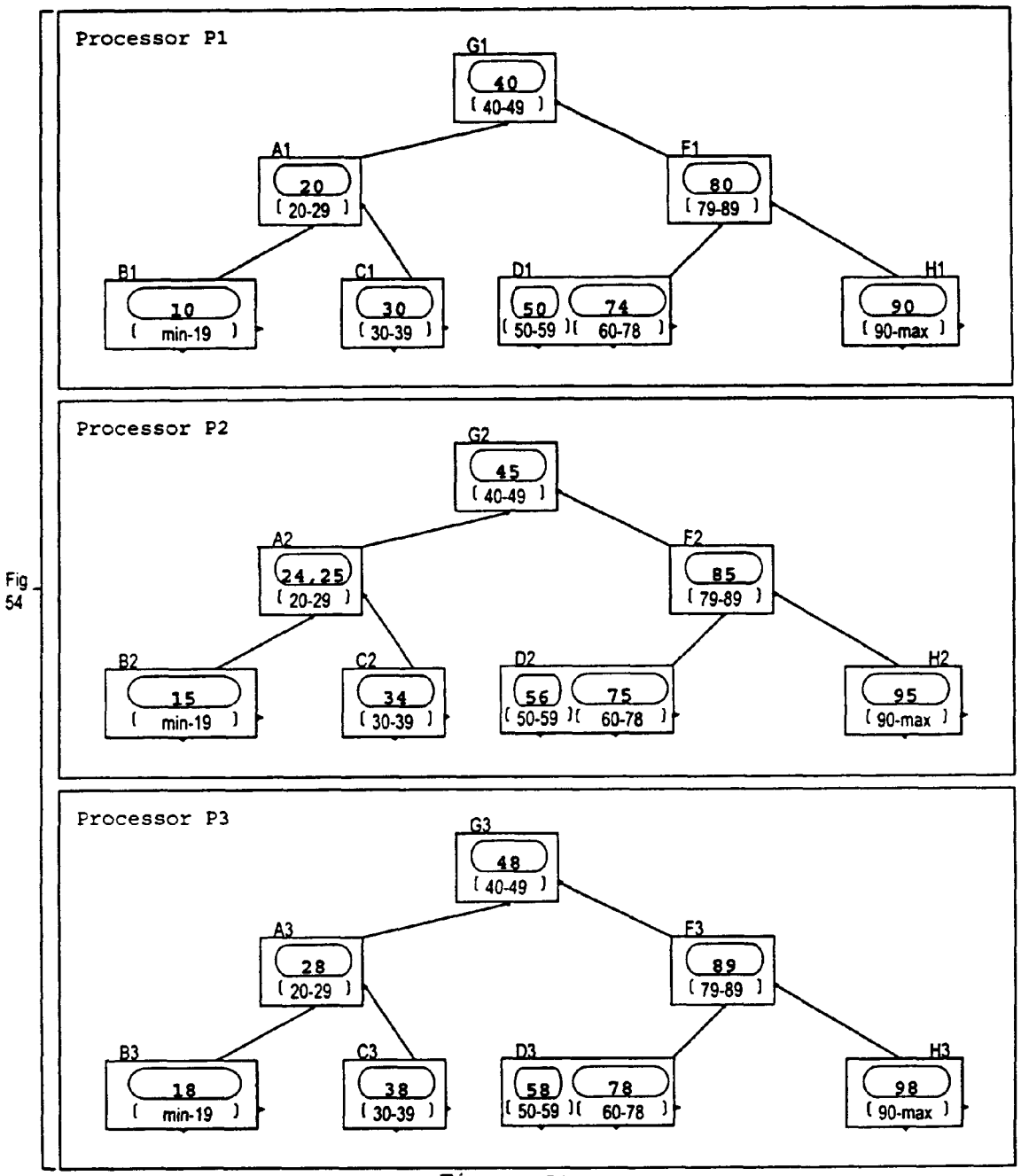
FIG. 54 shows result of G-node removal from tree of FIG. 38.

The G-node in F is empty and so we perform Step 3. The removal of the G-node is simply a matter of each of the processors P1, P2 and P3 performing a normal B-tree-node removal. P1 removes the G-node from F1 in its tree; P2 removes from F2; P3 removes from F3. Each of the processors re-orders the tree according to the single-processor B-tree method and removes node E, places its G-node (71–78) in node D, makes (79–89) the parent value of node D and performs range adjustment (FIG. 54).

Preferred Embodiment
Rules for Fullness and Ordering Scheme for B-trees Stored on Disk The usage of Rules for Fullness and Ordering Schemes is described in the previous sections. The Rule for Fullness and Ordering Scheme chosen for those examples assume that the parallel data-structure is not stored on disk. A different rule and scheme should be chosen if the processing-elements of the parallel data-structure are disk-packs rather than actual CPU's. It should also be noted here that the terms "processor" and "processing-element" are used to refer to system components to which work may distributed in the maintenance of the parallel data-structure: in this section the processing-elements are assumed to be disk-packs on a system with multiple disk drives; the work distributed amongst the disk-packs is the actual reading and writing of the blocks that contain the parallel B-tree-nodes.

In this section, another Example of a parallel data-structure is given. The purpose of the example is to illustrate the functionality of the Rules for Fullness and Ordering Scheme chosen for the B-tree stored on disk. The example describes one possible embodiment of an adapted B-tree. The manner of describing this example is the same as the manner used in the previous sections.

The main difference between storing data in memory and on disk is that disk access is slower. Assuming that the location of the memory block or disk block is known, accessing data on disk might take milli-seconds whereas accessing data in memory would take only micro-seconds. Therefore, the goal in designing data-structures to be stored on disk is to minimize the number of disk accesses necessary to locate the desired data-block. The goal in the design of the parallel data-structures described in this invention is to allow the same data-structure to be accessed simultaneously by multiple processing-elements (or disk-packs in this section) and thus distribute the work amongst the processing-elements. Because the goal in designing data-structures for disk is to minimize accesses, the Rule for Fullness and the Ordering Scheme of a disk-stored parallel B-tree must be defined to minimize parallel communication between processing-elements (disk-packs) and provide the most efficient access paths possible to desired P-nodes. Steps 2 and 3 described in the Verbal Description require parallel communication: the parallel communication in Step 2 can be minimized by choosing an Ordering Scheme that does not involve all of the disk-packs in locating the proper disk-pack for placement of a value. The Rule for Fullness can also be altered so that determining the fullness or emptiness of a G-node does not involve all of the disks.

The following Rule for Fullness and Ordering Scheme will be used in the example for this section:

1. Rule for Fullness/Emptiness: The fullness of a G-node in this Example is dependent on the fullness of the B-tree node that contains the G-node. A B-tree node is considered full when it contains five values (integers) and is thereby ready to undergo a B-tree split. A G-node may be considered full when one-half of the B-tree-nodes that contain the G-node are ready for a B-tree split; a G-node may be considered empty when one-half of the B-tree-nodes that contain it are ready for a merge or deletion. This information can be stored for each parallel B-tree-node outside of the parallel data-structure (possibly in memory). Once one-half of the parallel B-tree-nodes are ready to split, one of the G-nodes within the B-tree-nodes is split.

2. Ordering Scheme: This example uses three disk-packs. Disk 1 will contain the bottom (smallest) one-third of the range of values in a given G-node; Disk 2 will contain the middle one-third; Disk 3 will contain the top (largest) one-third of the Range. (If the G-node Range were (1–100), then Disk 1 would contain any value between 1 and 34; Disk 2 would contain any values between 35 and 67; Disk 3 would contain values between 68 and 100).

Figure 55:
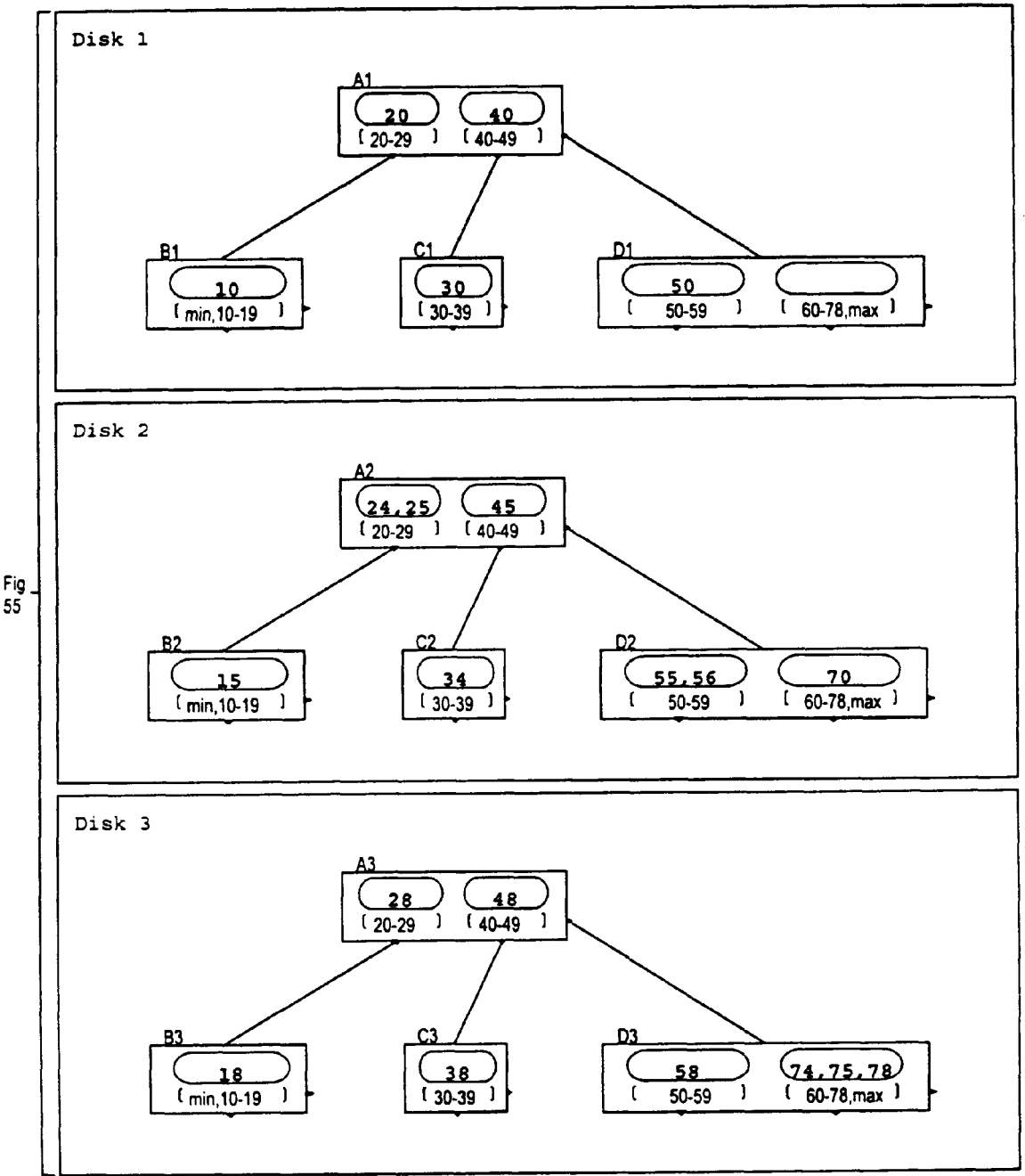
FIG. 55 parallel B-tree stored on three disks for Example of B-trees Stored on Disk section.

The Rule for Fullness/Emptiness above minimizes the need to access all portions of the B-tree-node in question because the information for determining the fullness of the parallel B-tree-node is stored external to the tree. The Ordering Scheme above minimizes the need to access all portions of the B-tree-node in question because the location of the proper Disk for a given value in a given Range can be calculated mathematically: this allows the direct location within memory storage of the exact individual node (P-node) contained in a given G-node that could contain a given data value within the G-node's G-node Range. This Example begins with FIG. 55 showing a parallel B-tree ordered according to Rules 1 and 2 above. Note that although the same values are stored in the tree in FIG. 55 as those stored in FIG. 38, the right-most G-node in the tree is ordered differently: this is because of the Ordering Scheme rule above. At the beginning of this Example none of the B-tree-nodes located in the data-structure are ready to be split.

We now proceed to Insert a number of values into the disk-stored B-tree in FIG. 55.

Figure 56:
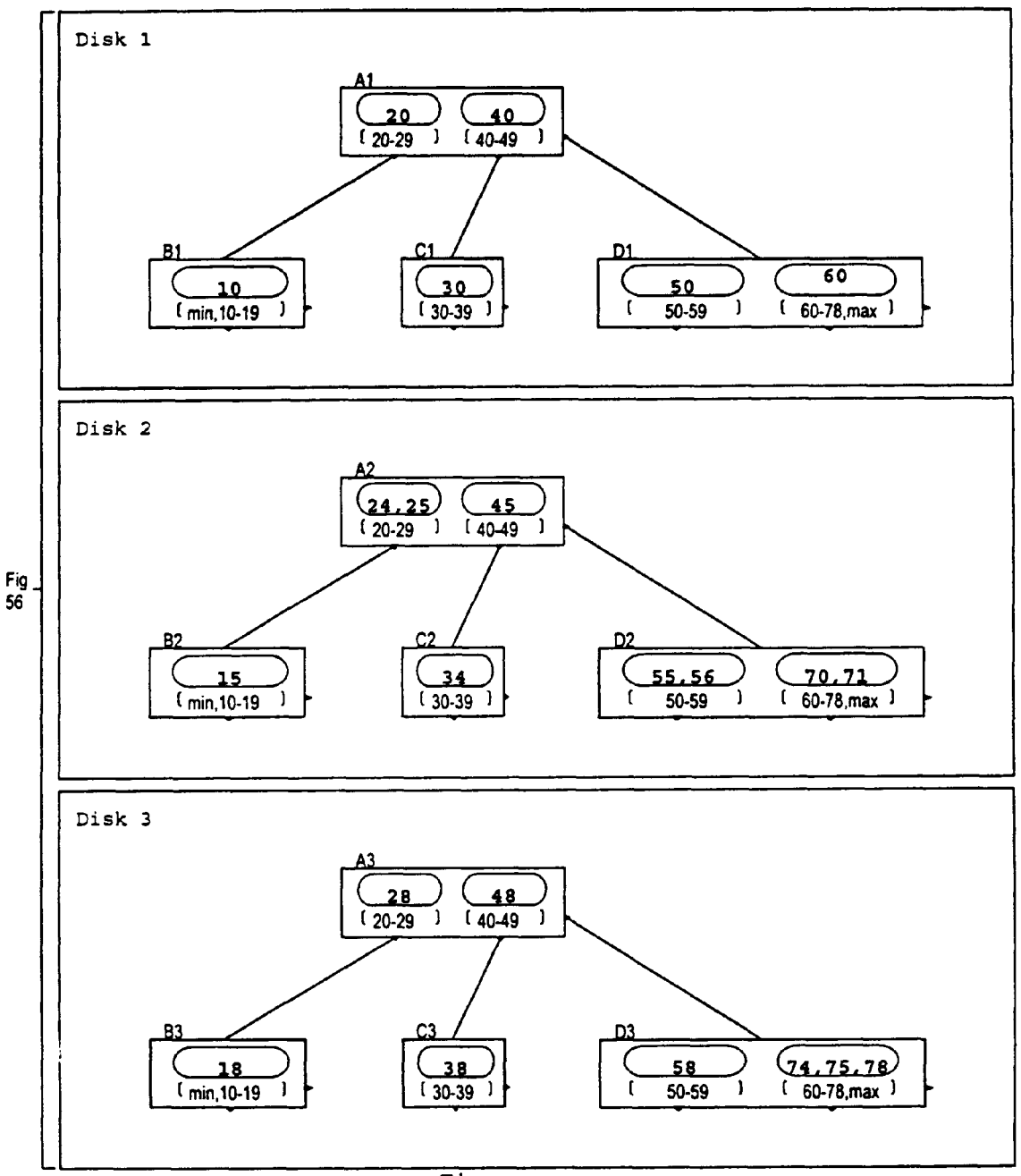
FIG. 56 B-tree of FIG. 55 after element addition.

1.) Insert(60) on Disk 1 and Insert(71) on Disk 2 Simultaneously
Step 1
Root-node A1: [(60)>(20–29)], move right; [(60)>(40–49)], travel down the right most link to D1; node D1: insert 60 into right most G-node in D1. (Disk 2 follows the same pattern)
Step 2
The values are properly ordered within the G-node, so Step 2 is unnecessary.
Step 3
The G-node is not full (no G-node Split)(FIG. 56)

Figure 57:
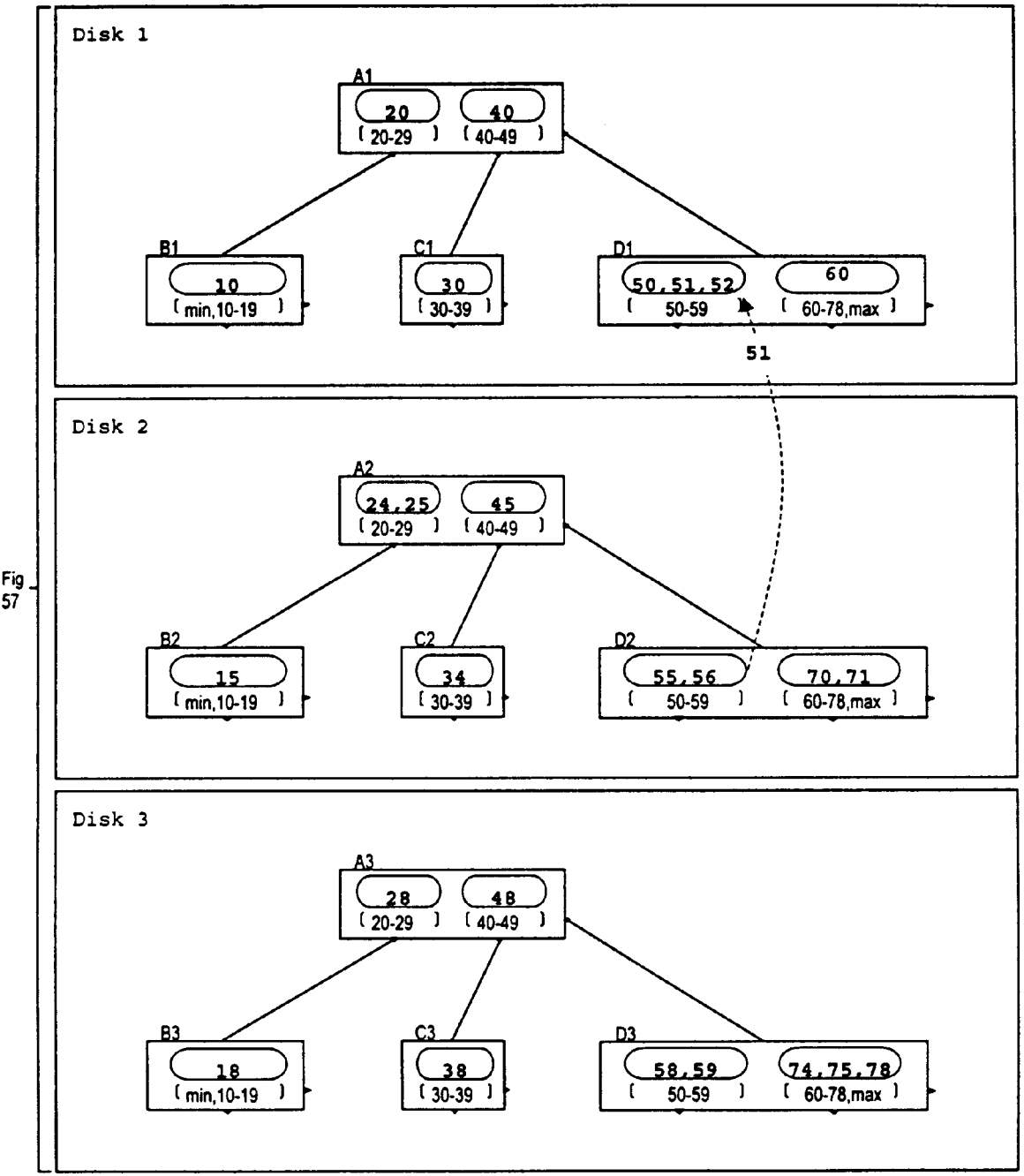
FIG. 57 shows redistribution of elements to maintain Ordering Scheme.

2.) Insert(52) at Disk 1, Insert(51) at Disk 2, Insert(59) at Disk 3
Step 1
(Step 1 is followed at Disk 2 in order to illustrate the functionality of the Ordering Scheme)
Root-node A2: [(51)>(20–29)], move right; [(51)>(40–49)], travel down right-most link to node D2; node D2: the value 51 belongs in the G-node with Range (50–59).
Step 2
Send the value 51 to Disk 1 and place it in the G-node with Range (50–59). According to the Ordering Scheme, 51 must be sent to Disk 1 because it is in the bottom one-third of the Range (50–59). Note that Disk 3 is not involved in Step 2 because the values contained in node D3 play no part in determining the proper Disk for 51: one disk access is saved by the Ordering Scheme.
Step 3
B-tree-node D3 now contains five (5) values because of the insertion of the value 59. The addition of the fifth value and resulting fullness of the B-tree-node D3 is recorded. Nodes D1 and D2 are still less than full; therefore less than one-half of the parallel nodes are full, and there is no Split—Step 3 is unnecessary at this time. (FIG. 57)

3.) Insert(53) at Disk 1

Step 1

The pattern of locating the proper B-tree- node has been well established at this point—see other examples. The correct G-node for insertion of 53 is the G-node in B-tree-node D1 with Range (50–59).

Step 2

53 falls in the bottom one-third of the Range (50–59); therefore Step 2 is unnecessary (FIG. 58).

Step 3

The Insertion of 53 into B-tree-node D1 causes D1 to be full. Node D3 is already full. Therefore, more than one-half of the parallel nodes are full, and we must perform a B-tree Split and a G-node Split. This requires accessing the data in node D on all three disks.

Figure 59:
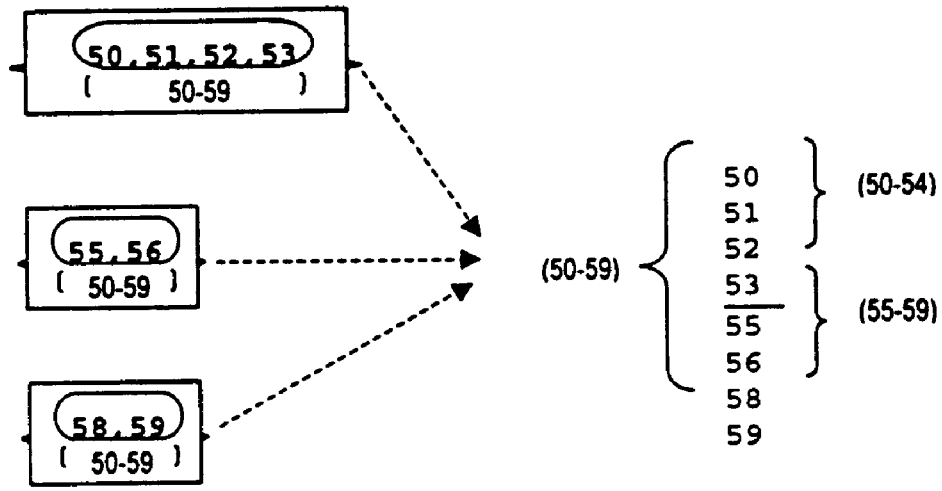
FIG. 59 shows range split and redistribution of elements resulting in creation of new G-node (G-node Split) for B-tree of FIG. 55.
Figure 59:
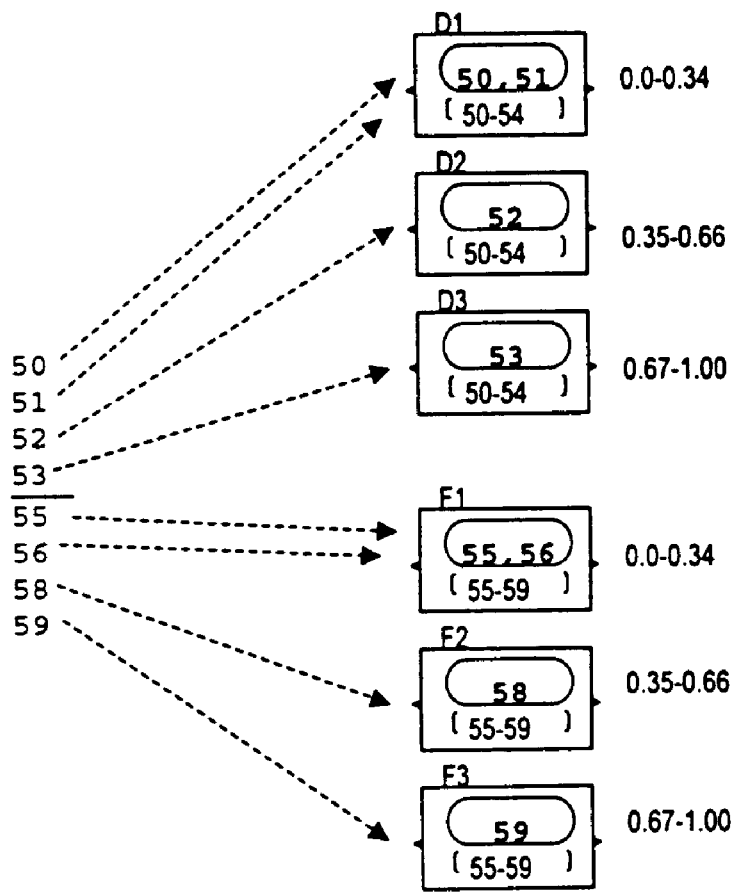
Figure 60:
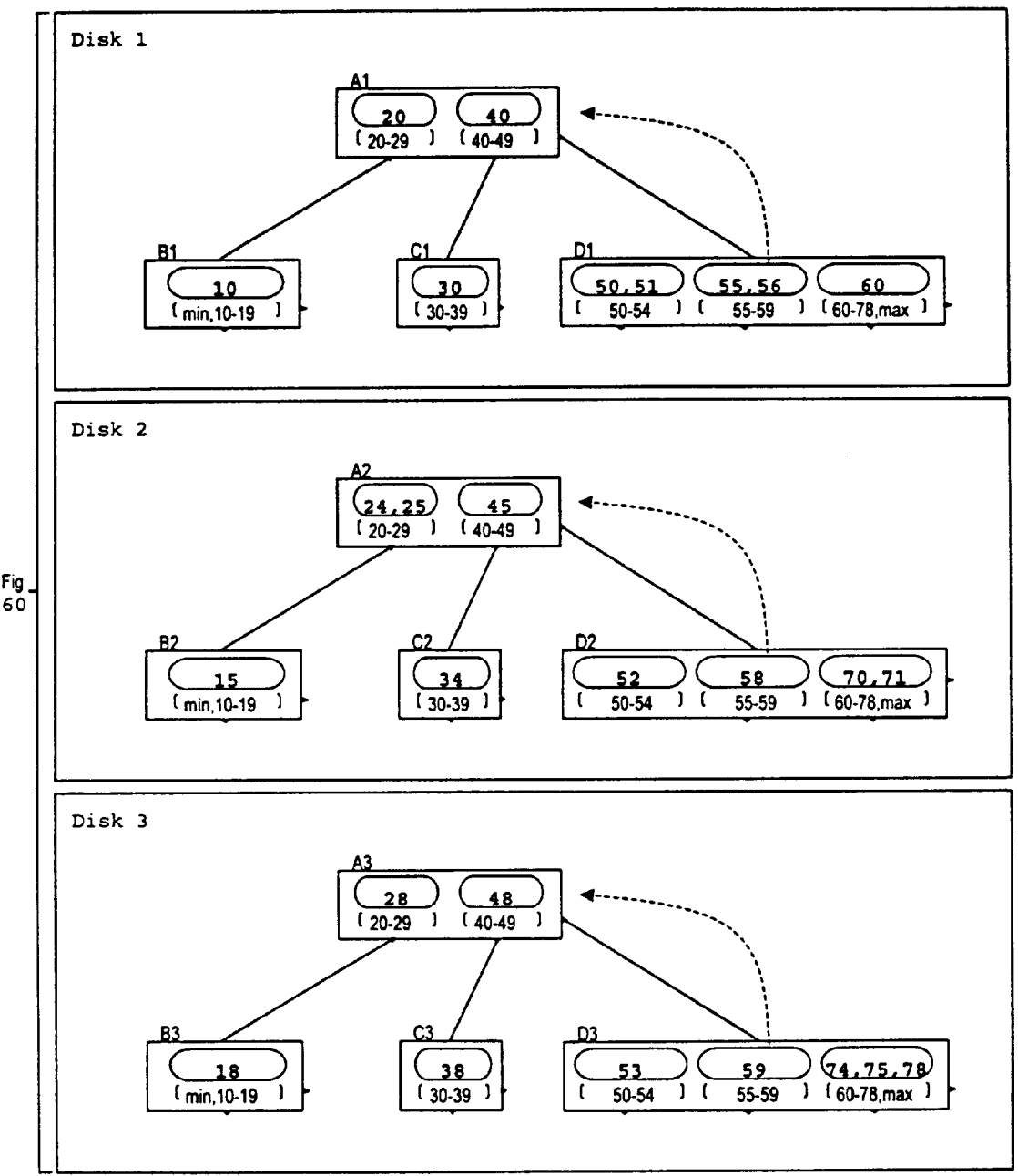
FIG. 60 B-tree of FIG. 55 after insertion of G-node.
Figure 61:
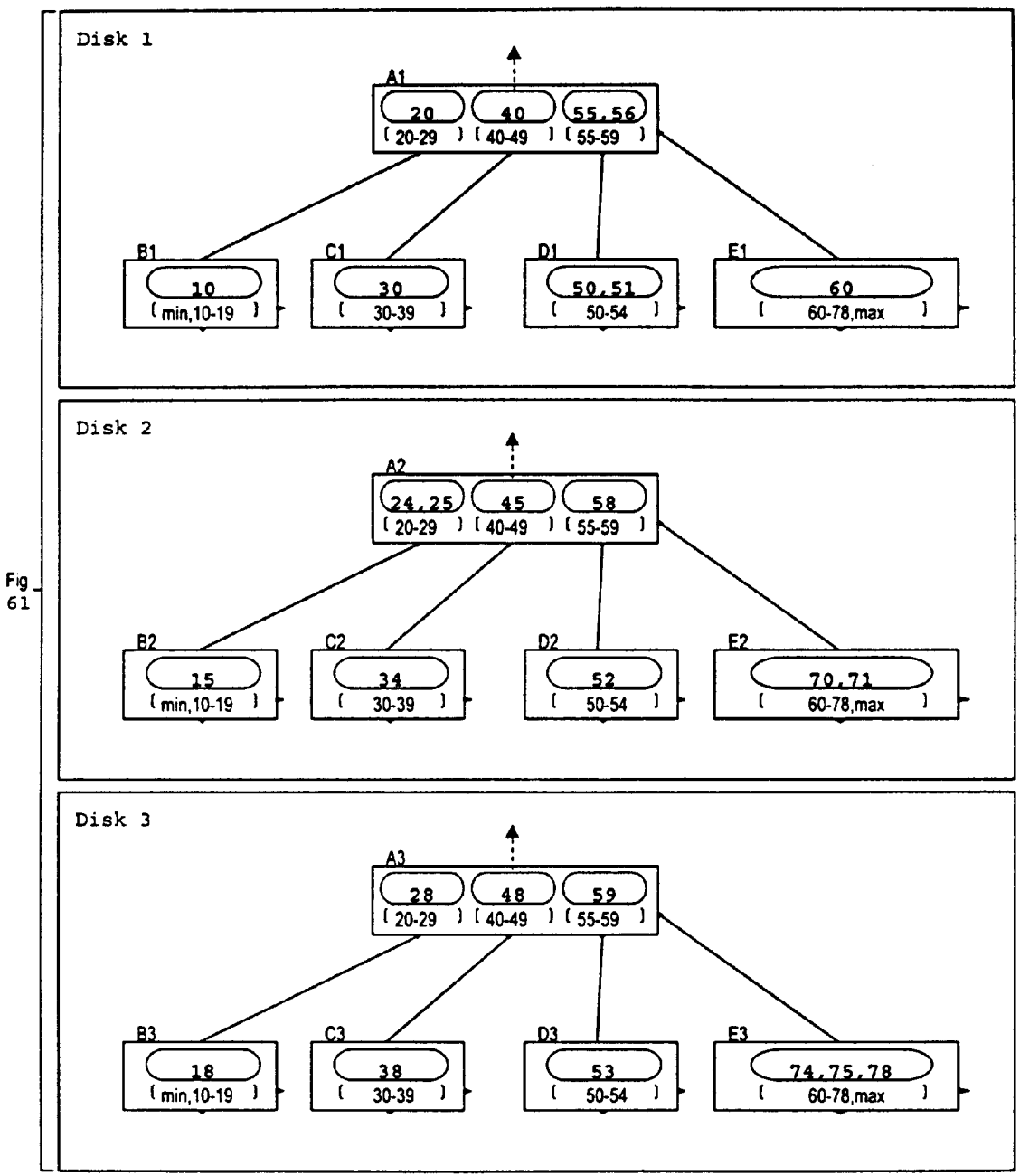
FIG. 61 B-tree of FIG. 55 after b-tree node split.
Figure 62:
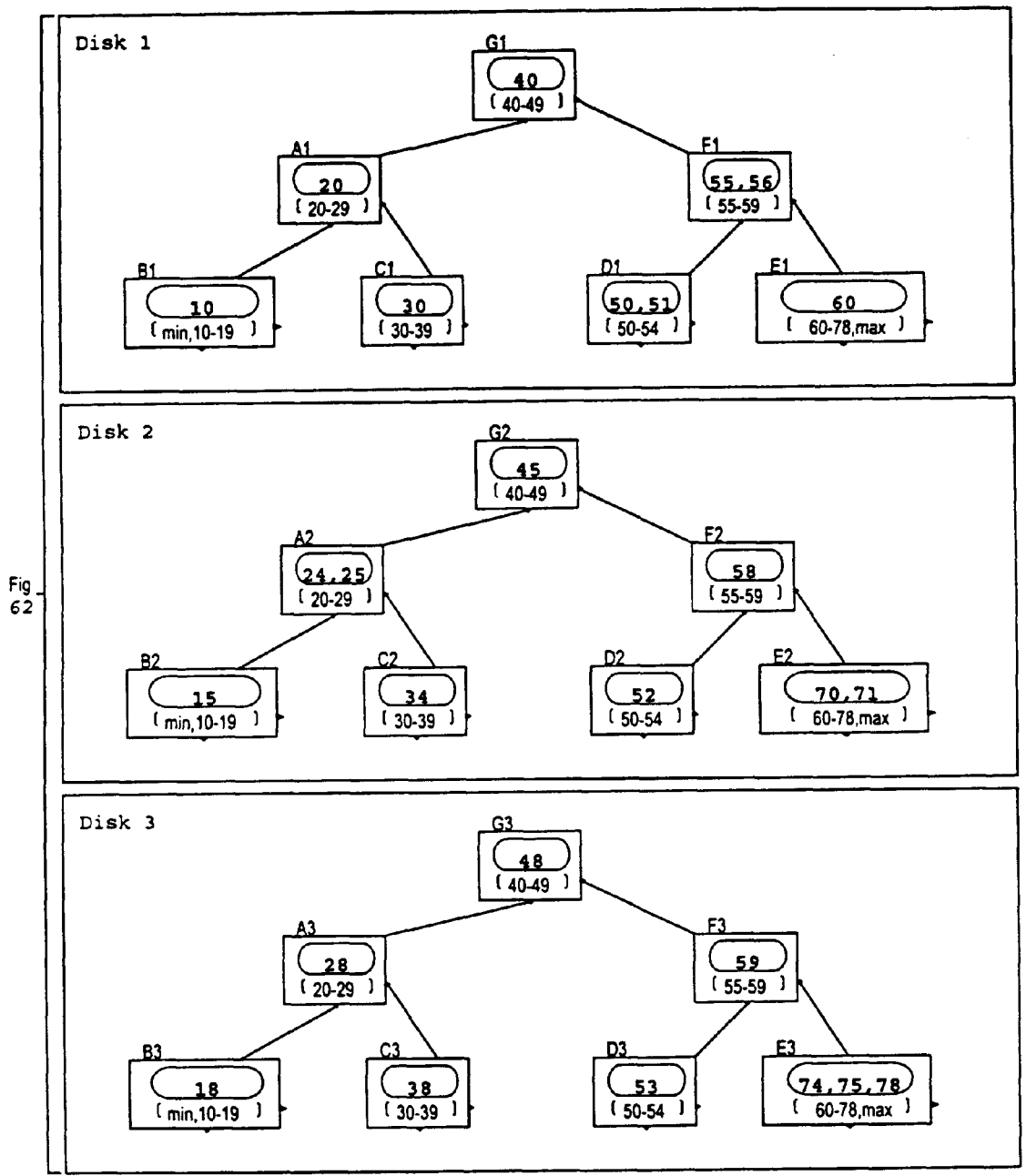
FIG. 62 B-tree of FIG. 55 after additional b-tree node split.

Parallel node D contains two G-nodes: one with Range (50–59), the other with Range (60–78)[Max]. The G-node with Range (50–59) contains 8 values; the other G-node contains only 6, so the G-node with (50–59) is chosen for the Split: the two resulting G-nodes have Ranges (50–54) and (55–59) (FIG. 59). The resulting B-tree-node configuration shows that parallel B-tree-node D contains 3 G-nodes and must be split (B-tree Split). The G-node with range (55–59) must be re-inserted at the Root-node A. All three Disks perform this Step in parallel. Re-insertion of the G-node (55–59) causes the Root-node A to Split (FIGS. 61 and 62).

Preferred Embodiment
Program Adaptation

The sequential maintenance program to be adapted can be made parallel simply by modifying the S-nodes into P-nodes, grouping the P-nodes into G-nodes (the creation of a P-node is done along with the creation of the G-node that contains it), and then adding a few functions in addition to the original sequential functions. Fullness Rules and Ordering Schemes may be chosen or defined for efficiency. The original sequential functions are used to create and maintain the data-structure configuration: these functions are simply modified to sort, search and arrange according to the relationships between G-node Ranges, rather than the relationships between S-node element values. In the preferred instance, G-node Range $R(X)<R(Y)$ if all of the elements $x_i$ in Range $R(X)$ are less than all elements $y_j$ in G-node Range $R(Y)$: this establishes the relationships between G-nodes in the adapted data-structures. The method of altering algorithms is generally to replace comparisons between x and y in the sequential algorithms with comparisons between $R(X)$ and $R(Y)$ for the parallelized functions.

Function List:
 1. Create-G-node (element y)
 2. Find-G-node (element y)
 3. Search-G-node(G-node v, element y)
 4. Add-to-G-node(G-node v, element y)
 5. Split-G-node(G-node v)
 6. Semi-sort-G-node(G-node v)
 7. Adjust-G-node-Ranges(G-node v)
 8. Insert-G-node(G-node v)
 9. Remove-G-node(G-node v)
 10. Resolve-Range-conflict(G-node u, G-node v)
 11. Remove-from-G-node(G-node v, element y)

Some of the functions listed above (2, 8 and 9) call the slightly modified sequential functions for a given data-structure. "G-node u,v;" and "element y, z, . . . ", etc. are variable declarations or parameters.

Preferred Embodiment Program Adaptation
Function Explanations:

1. Create-G-node(element y). This function creates a G-node by creating one P-node per-processor in the same per-processor location in the data-structure. It places the element y in the P-node of the processor chosen to hold y. Any or all processors may place their own elements $y_i$ in their own P-nodes as well. This function defines the G-node Range: because the new G-node will generally be in an undefined state, the G-node Range may be partially or fully undefined; this is represented in most cases, by the use of MAXVAL and/or MINVAL. If the G-node is the first created in the structure, its Range will generally be $R(X)=$ {MINVAL, MAXVAL} for ordinal data. This function works cooperatively with the other processors. Because G-nodes are composed of P-nodes, this function is a parallel node creation function as well as a global node creation function.

2. Find-G-node(element y). The find global node function is a searching function that locates a G-node with a G-node Range into which the element y falls; this function can provide individual access to each separate graph or data-structure, locating a G-node Range without involving the entire global data-structure. Sequential data-structures that already have Search() functions need only modify those functions to work with G-node Ranges as opposed to element values (using the range function R(G-node)). For sequential data-structures that normally have no Search() functions, knowledge of the sequential data-structure must be used to create a proper Find-G-node() function; in such cases, the G-node found may be one of many possible G-nodes if the Ranges overlap. This function returns the G-node location found. After the G-node location is found and returned, this function may be combined with the Search-G-node() function to provide parallel access to the parallel data-structure.

3. Search-G-node(G-node v, element y). This function searches the G-node v cooperatively for the element y as a parallel access function. G-node v obviously must have a Range capable of holding y. This function may be initiated by a given processor i and then have the other processors return the results of their search to the processor i; thus any one processor may search the entire parallel data-structure for an element y by (1) locating the proper G-node at will in its own separate graph and (2) performing a Search-G-node() in cooperation if necessary thus accessing all of the separate graphs together as parallel data-structure.

4. Add-to-G-node(G-node v, element y). The add to global node function is called after the appropriate G-node for element y has been located. This function inserts the element y into G-node v. This function may arrange the G-node elements in any way desirable for a given data-structure according to Rules for Fullness or Ordering Scheme, or this function may simply place element y in an empty cell in the P-node of the requesting processor that is part of G-node v; if this is not possible, then the requesting processor may cooperate with other processors to find an empty cell in which to place y in G-node v.

5. Split-G-node(G-node v). {returns new G-node} This function calls functions 6 and 7. This function is called when G-node v is full. The first step is to call function (6) Semi-sort-G-node() which arranges the elements in G-node v such that they are split into two sets X,Y (X∪Y=W); the resulting sets are partially sorted such that every element $x_i$ falls into a G-node Range distinct from the Range containing all elements $y_i$. Without loss of generality, we assume unique ordinal elements, an ordinal relationship of "less-than," and the preferred method of Range calculation for the data-structure: thus every element $x_i$ is less than every element $y_i$; the set X is contained in cells $v_{iO1}$, the set Y in $v_{io2}$ (i taking on the values $1 \leq i \leq P$). The second step is to create new P-nodes at all processors and move set X or Y into the new P-nodes at each processor i. The third step is to call function (7) Adjust-G-node-Ranges() which resets the G-node Ranges according to the new distribution of elements and creates a new Range for the new G-node. This function (Split-G-node()) may be called on a defined or undefined G-node; after the function ends there will be two G-nodes, one of which will usually remain where it was in the data-structure, the other must be reinserted by function (8) Insert-G-node() or placed appropriately. Generally, if the original G-node v was a defined G-node, then both resulting nodes will be defined; if not, then at least one of the resulting G-nodes will be partially defined. The defined G-node is reinserted (for example see (7) Adjust-G-node Ranges()).

6. Semi-sort-G-node(G-node v). As explained above, this function divides or partially sorts the elements in G-node v and places the resulting distinct sets into the proper processors. This function sub-divides and distributes the portion of data defined by the G-node Range, in essence creating new ranges. The function may also send the minimum and maximum values of the two sets to each processor (or other information for the calculation of Ranges, Fullness, Ordering, etc.).

7. Adjust-G-node-Ranges(G-node v). The Adjust-G-node-Ranges() function is key to the adaptation process, performing range determination to group data into value ranges; this function is a range addition and removal function that works in combination with the insert G-node and remove G-node functions. Like the Find-G-node() function it depends on the configuration and rules of the sequential data-structure being adapted. Examples of Split-G-node() and Adjust-G-node-Ranges() are given together because they are so closely related. There are different ways of adjusting Ranges for different data-structures. Also, the G-node v is not the only G-node which will have its Range adjusted; there may be adjustments on any nodes which have their Ranges wholly or partially dependent on G-node v. The goal is as maintain the rule which governs the relationships between nodal values by adjusting the Ranges to fit the new placement of the elements and/or G-node(s). The Adjust-G-node-Ranges() function can operate simultaneously but blindly on all processors. This function may use the minimum and maximum values of the elements of the G-nodes in addition to the values of old Ranges. When adjustments on each processor are made blindly, they are depended upon to be identical over all processors because they use the same values. Example: split and adjustment made in a parallel ordered list with N G-nodes.

Original List

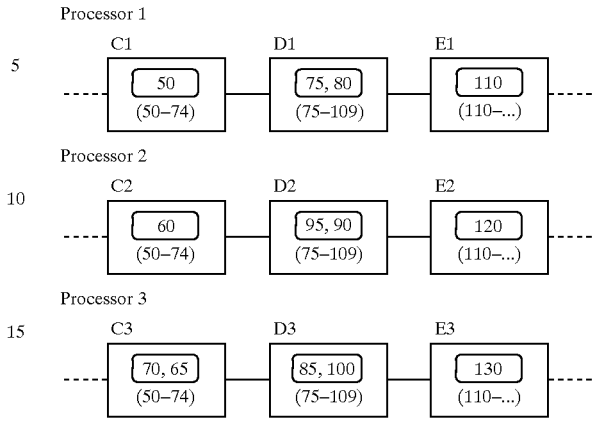

G-node Ranges: $R(C)=R(c_{o1o})=\{50, 74\} R(D)=R(d_{o1o})=\{75, 109\} R(E)=R(e_{o1o})=\{110, \ldots\}$ Step 1: Call Semi-sort-G-node(D)

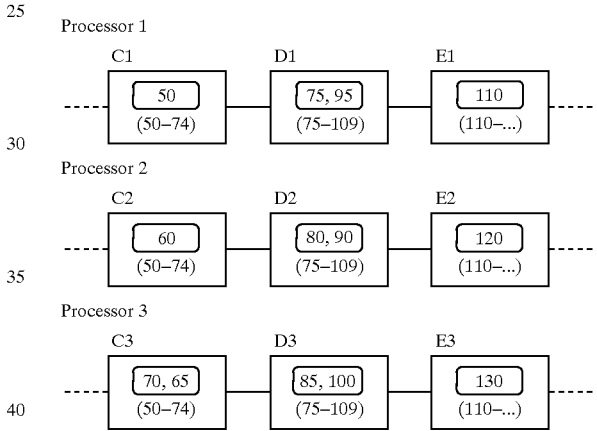

Step 2: Split G-node D creating G-node V

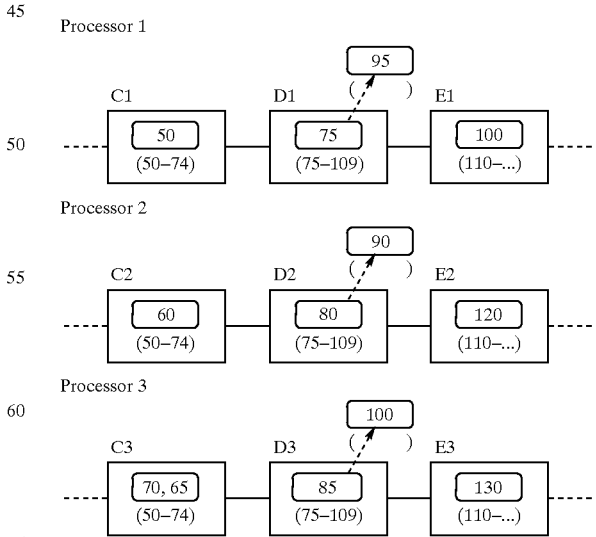

Step 3: Re-insert V (Insert-G-node(V))

In this circumstance (ordered list) the re-insert is predictable and obvious. Step 4 will adjust all G-node Ranges at the same time.

Graph for Step 3

(Note that the Range for G-node V is depicted although it is not calculated until step 4.)

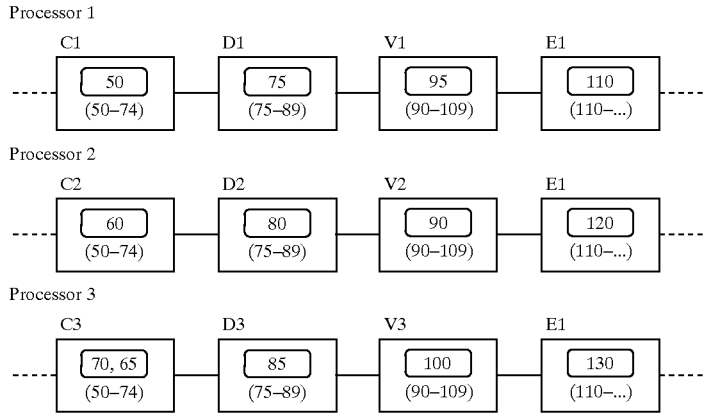

Step 4: Set new G-node Ranges

Under other circumstances, the new Ranges for D would be set as well as for V; after which, insertion of V would take place and a new resetting of Ranges done for the insert; here all Ranges are set at Step 4 because the placement and Range-setting are obvious. However, the pattern should be clear:

Ranges:

R(C): unchanged—{50,74}. R(C)'s second value $R(C_{o12})$ is still based on $R(d_{o11})$ which is unchanged.

R(D): $R(d_{o12})$ is changed: {75,89}, $R(d_{o12})=R(v_{o11})-1=90-1=89$.

R(V): {90,109}

$R(v_{o11})$=minimum value of V=90

$R(v_{o12})=R(e_{o11})-1=110-1=109$

R(E) : unchanged.

For this parallel ordered list data-structure, the formula for G-node Ranges R(X) (X taking on values 2<X<(N−1) where N=number of G-nodes) is

---

R(X) = {
 $R(x_{o11})$ = minimum element of X,
 $R(x_{o12}) = R( (X + 1)_{o11} - 1$}

---

The formulas for other data-structures, though more complex in general, are very similar. At the extreme ends of the spectrum for the parallel ordered list we have special values:

For N G-nodes we have:

$R(a_{o11})$=MINVAL $R(n_{o12})$=MAXVAL

The G-nodes A and N are partially defined G-nodes.

The above example shows G-node addition, adding one new G-node and one new range to the parallel data-structure. If the new G-node v were then removed, the process would simply be reversed, removing G-node v and removing G-node v's range by merging the range of G-node V into the range of G-node D.

8. Insert-G-node(G-node v). This function works the same as the Insert() function for the sequential data-structure except that it uses the values of G-node Ranges to arrange and relate the G-nodes rather than element values to arrange S-nodes (using the range function R(G-node)).

Adding a new node to a sequential data-structure generally requires reconfiguring the links to represent changes in the logical relationships. Each decision (e.g. IF statement) in the sequential algorithm can be modified to use the range function R() to produce or adjust the proper relationships and position the nodes within the order of the data-structure by range.

All processors may perform this function simultaneously and blindly; however, in the event that two G-nodes with overlapping Ranges collide, the Resolve-Range-conflict() function may be called; Resolve-Range-conflict() is cooperative. In most respects, this function, Insert-G-node(), is identical to the sequential Insert().

9. Remove-G-node(G-node v). All of the statements made about function (8.) Insert-G-node() also apply to this function with respect to the sequential Remove() function. In most respects, this function is identical to the sequential Remove().

10. Resolve-range-conflict (G-node u,v). This function resolves the problem of overlapping G-node Ranges. A difficulty presents itself if a data-structure creates overlapping Ranges because of non-contiguous data placement. Two G-nodes may try to occupy the same or adjacent positions in the data-structure. If two such G-nodes conflict, then the elements in the G-nodes must be divided between them in such a way that the new ranges calculated for an element arrangement do not overlap. This function may determine ranges and force re-distribution of the element values or it may semi-sort the elements across the nodes u and v forcing re-determination of ranges based on the semi-sort.

11. Remove-from-G-node(G-node v, element y). The remove from global node function is called after the appropriate G-node for element y has been located. This function removes the element y from G-node v. This function may arrange the G-node elements in any way desirable for a given data-structure according to Rules for Fullness or Ordering Scheme, or this function may simply remove element y from the P-node that contains it.

Preferred Embodiment
Generalized Parallel Method

The following is a generalized parallel method which uses the previously defined functions to create the parallel data-structures. The configurations of the data-structures in question are determined by the Insert() and Remove() functions of the sequential data-structures that have been modified slightly to use G-node Ranges to establish ordinable relationships. The slightly modified functions are called from within functions Insert-G-node() and Remove-G-node(). The indications of steps 1, 2 and 3 to the left of the pseudo-code are the steps explained in the Verbal Description section.

Preferred Embodiment
Function Parallel-Insert (element y):

This function is called by any processor wishing to insert the element y into the parallel data-structure. It is assumed that the first G-node of the data-structure has already been created.

```
Parallel-Insert (element y)
G-node u,v
Step 1 →   v = Find-G-node(y)
Step 2 →   if (there is an empty cell in P-node v)
           then
               place y in P-node v
           else
               Add-to-G-node(v,y)
           end if
Step 3 →   if (G-node v is full)
           then
               u = Split-G-node(v)
               Insert-G-node(u)
               Adjust-G-node-ranges(u)
           end if
END FUNCTION
```

Preferred Embodiment
Function Parallel-Remove (element y)

This function finds and removes a specific value y. Some data-structures remove elements by location (example: priority-queue); in such cases, the Find-G-node() function may be adapted to find the proper location, and then the G-node may be sorted or searched for the appropriate value.

```
Parallel-Remove(elementy)
        G-node v;
Step 1 →   v = Find-G-node(y)
Step 2 →   if (G-node v is found)
           then
               Search-G-node(v,y)
               if (y is found in G-node v)
               then
                   Remove y from cell and
                   send to proper processor
               end-if
           end-if
Step 3 →   if (G-node v is empty)
           then
               Remove-G-node(v)
               Adjust-G-node-Ranges (u)
           end-if
END FUNCTION
```

It is assumed in the preferred instance that most sequential functions for the adaptable sequential data-structures can be encapsulated in the sequential Insert() and Remove() functions, or that they can be adapted and used in the same manner as those functions. The Parallel-Insert() and Parallel-Remove() functions describe the formation and functioning of the parallel data-structures in their important aspects.

Preferred Embodiment Program Adaptation
Find Function

This section contains a small section of C like Pseudo-code intended to illustrate the simplicity of adapting single processor functions to multiple processor functions. The code is not intended to be in perfect C syntax, only to give the basic concepts that could be used for creating the Find function in parallel form. Nor is the code intended to be the only possible embodiment of the Find function (Find-G-node). This example should also help to illustrate the nature of the "slightly adapted" single processor Insert and Remove functions mentioned previously because the majority of the work done for those functions is the location of the proper position in the data-structure for an element value.

The pseudo-code shown is a Find function for a binary search tree; the concepts expressed are given to be useable for other data-structures as well. The pseudo-code shows that the primary difference between single and multiple processor functions is the replacing of the comparisons of element values with comparisons of G-node-Ranges: it is easiest to illustrate this by taking advantage of operator overloading with regard to the <,>, and == operators -- these operators are assumed to work equally well on element values and G-node-Ranges.

Single Processer Definitions and Pseudo-code

```
struct node_st{
        key_type        key;
        node_st         *leftchild;
        node_st         *rightchild;
}
node_st *Find(node_st *node, key_type element)
{
        if (node->key == element)
            return(node);
        if (node->key < element)
            return(Find(node->rightchild,element));
        else
            return(Find(node->leftchild,element));
}
```

Multiple Processor Definitions and Pseudo-code

```
x = Maximum number of elements per P-node;
struct Range{
        key_type lowerbound;
        key_type upperbound;
}
struct Pnode_st{
        node_number     int;
        key_type        key[X];
        Pnode_st        *leftchild;
        Pnode_st        *rightchild;
        Gnode_Range     Range;
}
Pnode_st *PFind(Pnode_st *node, key_type element)
{
        if (node->Gnode_Range == element)
            return(node);
```

```
        if (node->Gnode_Range < element)
            return(PFind(node->rightchild,element));
        else
            return(PFind(node->leftchild,element));
}
```

Preferred Embodiment
Data Model

Figure 63:
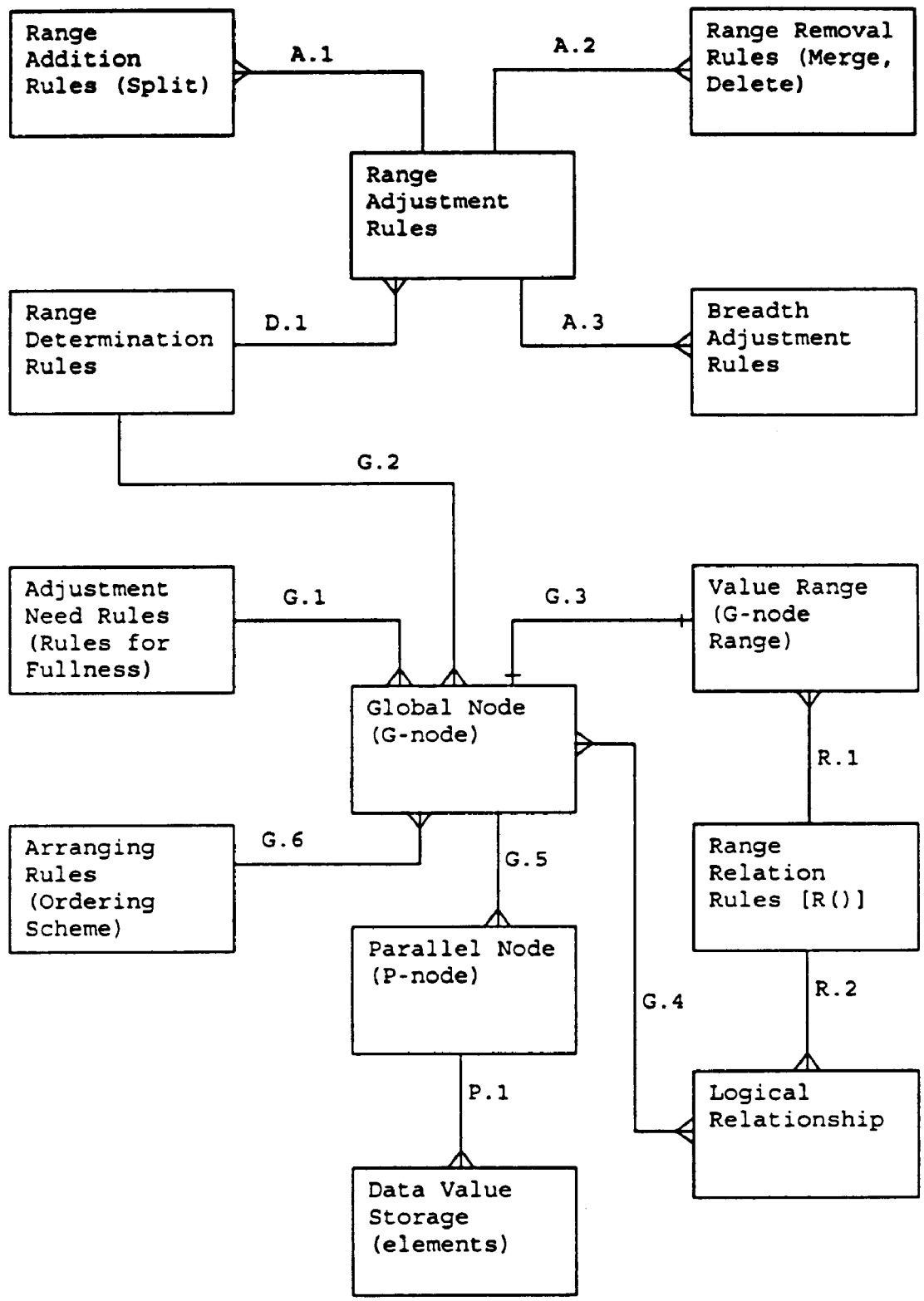
FIG. 63 data model for a preferred instance of present invention.
Figure 64:
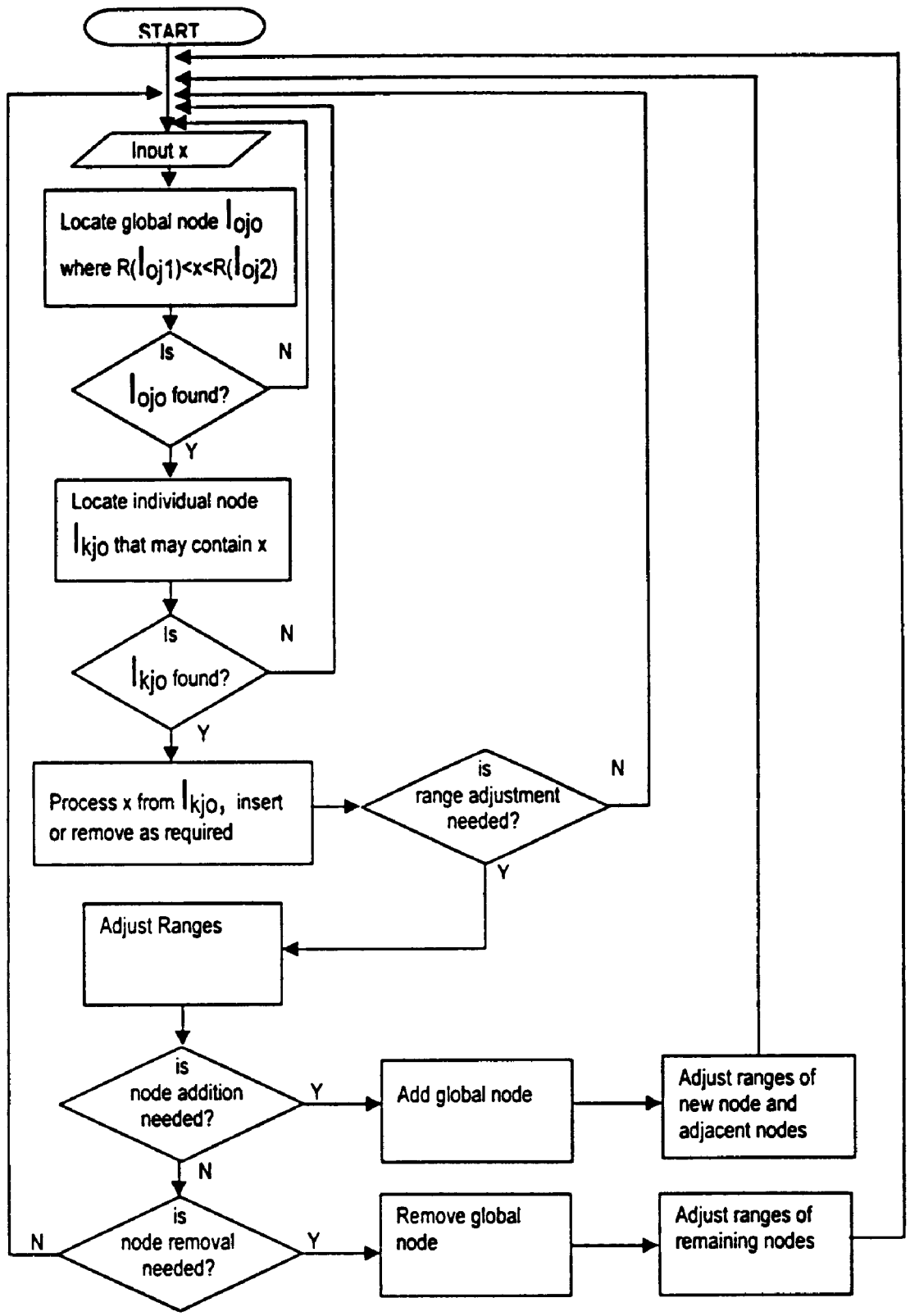
FIG. 64 flow chart for a preferred instance of present invention.

FIG. 63 depicts a possible data model for an embodiment of the present invention. Each box is a data entity expressing an aspect of the program design for the embodiment. Each data entity is a set of rules, data-structure, record, other set of data and/or associated maintenance functions used to create the parallel maintenance system. No particular modeling technique is implied.

The data model shown is only one possible model, given to express the parallel system components from a data model perspective. The relationships are described below.

- A.1—indicates a set of range adjustment rules may comprise or relate to multiple sets of range addition rules;
- A.2—a set of range adjustment rules may comprise or relate to multiple sets of range removal rules;
- A.3—a set of range adjustment rules may comprise or relate to multiple sets of range breadth adjustment rules;
- D.1—a set of range determination rules may comprise or relate to multiple sets of range adjustment rules;
- G.1—a set of adjustment need rules applies to many G-nodes;
- G.2—a set of range determination rules applies to many G-nodes;
- G.3—a G-node and G-node Range have a one-to-one relationship;
- G.4—a logical relationship may relate many G-nodes, and a G-node may have many logical relationships;
- G.5—a G-node contains many P-nodes;
- G.6—a set of arranging rules applies to many G-nodes;
- P.1—a P-node contains many data value storage entities or elements;
- R.1—a set of range relation rules applies to many ranges;
- R.2—a set of range relation rules applies to many logical relationships;

Notes on B-tree Section

The two rules (Ordering Scheme and Rule for Fullness) used in this section are not the only possible rules for storing a parallel B-tree or other data-structure on multi-component Dynamic Access Storage Devices such as disk drives. Many other Fullness and Ordering rules may be used (defined), but the essential pattern of the present method remains the same. Well known methods exist for storing information on the locations of data storage blocks. These can be used to store information on the fullness of the parallel B-tree-nodes. A bit-map stored in memory would suffice, as would a bit-map stored in high-speed secondary storage (e.g. a faster, more expensive disk drive than the others used). Many other possibilities exist for the storage of the information; the only requirement is that it allows the determination of the fullness of B-tree-nodes and G-nodes without accessing every drive.

It should also be noted that the preferred embodiment and the data-structures and maintenance routines that result from it function by sending the locations of data-structure nodes between processing elements. This may require a method of storing or calculating the location of the memory or disk space allocated for the different portions of data-structure storage: one such method would be keeping an index to a storage space as it is allocated for nodes one each device; another would be the storage or definition of explicit pointers in each P-node to the other P-nodes within a given G-node; for disk drives, many indexing techniques already exist to perform functions very similar to this. Some such techniques are described in "Operating System Concepts" by Silberschantz and Galvin, Addison-Wesley Publishing, 1994 (fourth edition).

The amount of data stored on the B-trees in these examples is small. It is not reflective of the size of B-trees on real systems. In addition, the nodes themselves are relatively small, and the methods of storing data from node-to-node could make use of additional techniques to improve efficiency. Commonly known techniques for single-processor B-trees include the techniques used for B* trees and B+ trees. Also, the use of overflow blocks and techniques derived from B* and B+ trees could be added to the examples given here.

Other Embodiments
Definition of G-nodes for the B+ Tree

A variation on the B-tree is the B+ tree. The following describes one embodiment of the parallel B+ tree. The file structures book referenced in this application defines a B+ tree as a B-tree for which data-file record pointers are stored only at the leaves of the tree. This indicates that the definition of the B-tree nodes in a B+ tree takes two forms: one form for the non-leaf nodes and one form for the leaf nodes. The same may be done for the definition of G-nodes and their Ranges for parallelized data-structures. I use the parallel B+ tree to illustrate this concept.

Because the elements (tuples) stored in the B+ tree only contain data-file record pointers at the leaf-nodes of the tree, the G-node Ranges in the non-leaf nodes do not require the storage of actual tuples containing record pointers. This means that the only useful information in the non-leaf nodes is the storage of G-node Ranges: the Ranges are used to locate the desired leaf-nodes. B+ tuples are never inserted into non-leaf nodes and therefore the parallel Ranges need not be defined to contain values. Single values may be stored in the non-leaf nodes to represent non-leaf Ranges (the minimum value of the Range may equal the maximum value of the Range).

The leaf nodes of the B+ tree have G-nodes and G-node Ranges defined in the manner described in previous sections. Insertions of new Ranges into the non-leaf nodes occur at the time of B-tree node splits. All non-leaf Range values are based on the values contained in the leaf-nodes of the tree.

Other Embodiments
Complex Ranges

More complex range calculations than those described in other sections are possible and justifiable. For example, an additional embodiment of an adapted AVL tree may be created by the use of a different set of range relation rules or range determination rules. The AVL tree previously described herein used range relation rules defined in a linear contiguous fashion: $R(A_{o1o}) < R(B_{o1o})$ if and only if $R(A_{o12}) < R(B_{o11})$ (i.e. Max of A less than Min of B); this produced a distribution of the total data set such that the possible storage of a given value x on a processor was only determinable by locating its G-node Range.

Imagine instead a range function such that the highest order digit is ignored. Thus, a range (#50–#70) could contain values 150,250,350,165,266,360,370, etc. In addition imagine an Ordering Scheme such that processor 1 contains only values whose first digit is 1, processor 2 only values whose first digit is 2, etc. This combination of range function R() and Ordering Scheme create a parallel structure such that a given value is known to be stored on a given processor i or not at all before search begins (e.g. the value 563 will be found on processor 5 or not at all, the value 828 on processor 8 or not at all, etc.) If leading zeros are assumed, then the combination also creates a data structure composed of ten separate structures, each having its own range of possible values (i.e. (000–099),(100–199),(200–299), etc.).

An advantage gained by the grouping of elements into ranges as described above while simultaneously grouping the elements by G-node Ranges is that the elements are sorted by high order digits and sub-sorted by low order digits and simultaneously sorted by low order digits and sub-sorted by high order digits.

Such sorting may even be useful if the P-nodes related by high order digits are grouped and contained on a single graph, rather than the multiple graphs described in other embodiments herein.

Such complex range calculation as described above shows a more advanced grouping of elements by range than other embodiments described herein. The elements contained in the data structure are organized in two fashions: by high order digits and low order digits. This grouping illustrates an element's or a P-node's membership in multiple complex sets. Another instance (a refinement or improvement of the concept of membership in multiple sets) could provide a P-node membership in a plurality of sets, each set organized for access by different aspects of the data stored (e.g. last, first and middle name, etc.).

Figure 65:
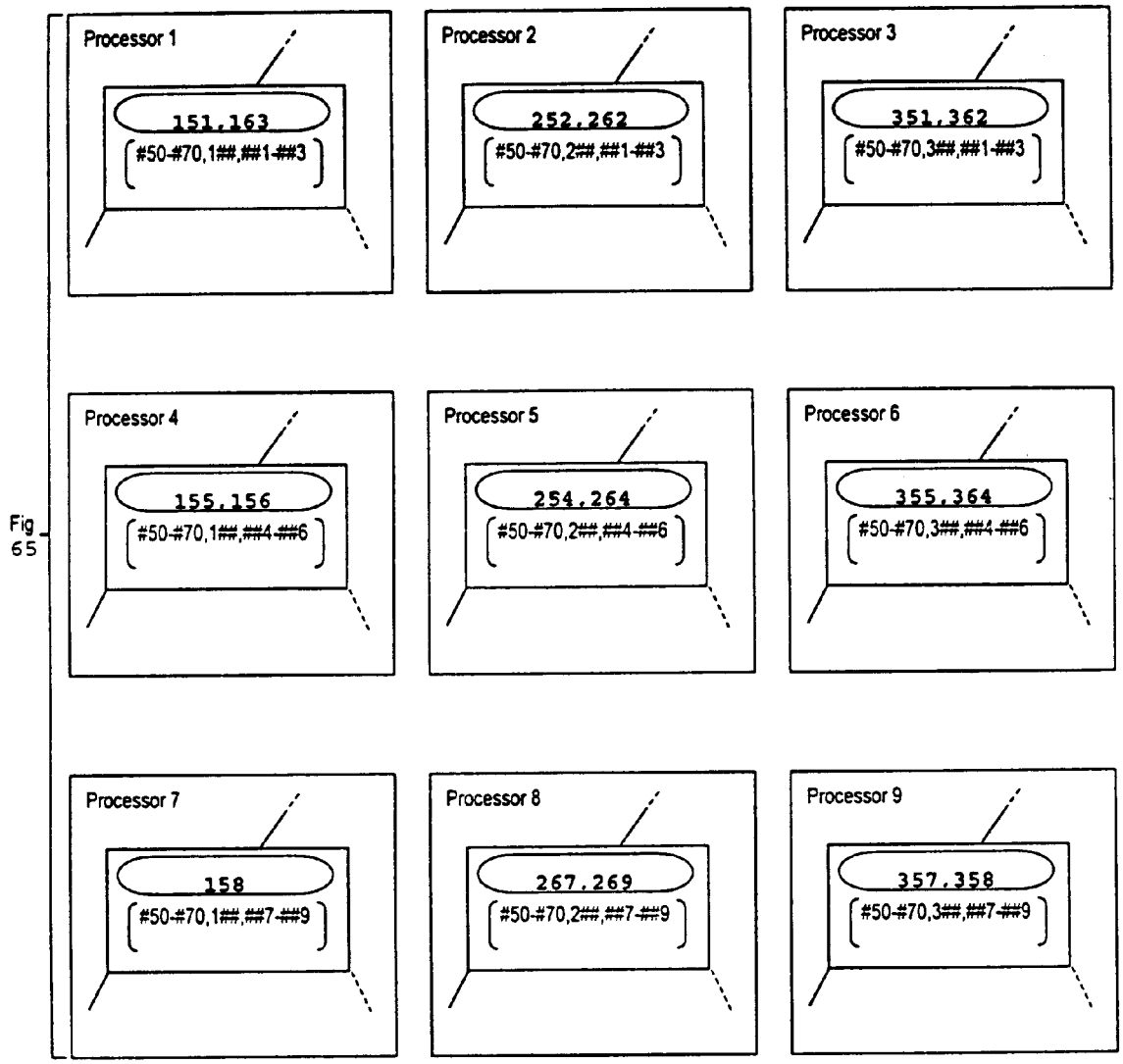
FIG. 65 shows nine P-nodes related by complex G-node Range.

FIG. 65 shows nine P-nodes, all related by commonality of complex G-node ranges: the nine P-nodes are all part of a complex G-node. The ranges may of course be stored implicitly and partially calculated by processor number; however, on the diagram, they are explicitly listed. Pound signs indicate wildcards; numeric entries separated by dashes indicate ranges; the first two entries may be combined to form an ordinal range and then further refined by adding the last entry: therefore processor 5, having complex G-node Range (#50–#70,2##,##4–##6) may contain numbers between 250 and 270 whose last digit is between 4 and 6. If the nine processors depicted are on a two dimensional mesh of processors, then each linear array may be accessed according to the common key attribute being sought by a user or system process (e.g. any key being sought between 100 and 199 will be found on processor 1, 4 or 7). The rules for insert (i.e. range relation rules) for the data structure in FIG. 65 are assumed to apply to the "#50–#70" portion of the complex range: that is, the links are configured by that portion of the complex range such that if x>y then R(#x) >R(#y). FIG. 65 represents a parallel data-structure considered to have two dimensions at the processor or storage level; the possibility of more dimensions is implied.

The great variety of combinations offers a wide range possible uses according to the needs of a given system or data-structure.

Other Embodiments

Dependant Ranges

Imagine a decision-tree used, for instance, to play chess. A given function can identify when a piece on the board is threatened by an opposing piece. This increases the priority of moving that piece. A given node in the tree representing this situation on the board will have a wider range of possible moves than nodes dependant on the given node. Each possible movement of the threatened piece is within the range defined by its identity as a move of the piece and its dependency on other nodes. This range may be distributed to multiple processing elements according to range determination, Rules for Fullness and Ordering Schemes defined for the decision tree algorithm's use in a parallel environment. In this instance, the values and ranges for the nodes are created together, rather than input and inserted or removed.

Addendum

G-node Ranges

The calculation of G-node-Ranges is key to the entire process. Generally, it is simply a matter of determining which nodes on a data-structure most closely determine the positions of the other nodes; that is to say which nodes contain values that determine the values that may be contained in a given node. Partially defined G-node Ranges may frequently be found at the extreme points of the data-structure; for instance, the root and leaves of a heap, or the right most and left most node of a binary search tree, 2–3 tree, or B-tree.

Addendum

Ordinal vs. Ordinable Data

Most of the Examples for this application are given for ordinal data types. However, any data-structure having the capacity of the data values to be grouped into suitable G-node Ranges will be adaptable. If the G-node Ranges can be constructed such that the nodes which branch off from the members of the Range can be said to relate to all of those members in a similar fashion, then the parallel or global links between nodes are justified and will be consistent with the data-structure and/or method rules. Such data-structures and/or methods are adaptable by this process.

Addendum

Use of Space/Merging G-nodes

Because the G-node-Remove() function is only used on sufficiently empty G-nodes, it is possible to have large data-structures with large numbers of partially empty P-nodes; however, the present method is capable of adjustment to make efficient use of space. A G-node-Merge() function to merge two sparsely populated G-nodes into one would be one way to resolve this problem; another would be to alter the Rule for Fullness, changing the lower limit on the number of elements in a G-node to half P and remove P-nodes that break the rule, reinserting their elements.

Addendum

Contiguity of Data Distribution

Non-contiguous data distribution like that of a heap makes difficult the efficient search, and therefore efficient placement, of elements into unique G-node Ranges. One solution to this is the Resolve-Range-Conflict() function; however, for those data-structures that can be forced into a contiguous configuration and thereby make efficient searching possible, this function may not be necessary. Non-contiguous methods of defining ranges or distributing values may also be defined and used for the present invention.

Addendum

Data-Structures/Methods

The data-structures and methods listed in this application are only examples of adaptations from sequential to parallel. Many other data-structures and methods not listed can be adapted through this process. No restriction on types of data stored or manner of storage is implied. Many distributed or parallel data-structures may be created in accordance with the principles of the present invention. The present invention may also be used to create new data-structures without serial counter-parts.

Examples of Application of Preferred Embodiment

The following two examples illustrate the functioning of two adapted parallel data-structures on a working system. Two examples are given to show that the parallel routines and data-structures may function on a variety of different systems. Specifically, one Example is stored in memory on a parallel-processing hypercube network, and the other is stored on disk. Although the data-structures can be used by any program, whether batch or on-line, the examples illustrate the functioning of the data-structures by assuming multiple users accessing the same system simultaneously.

Example of Application 1

Figure 66:
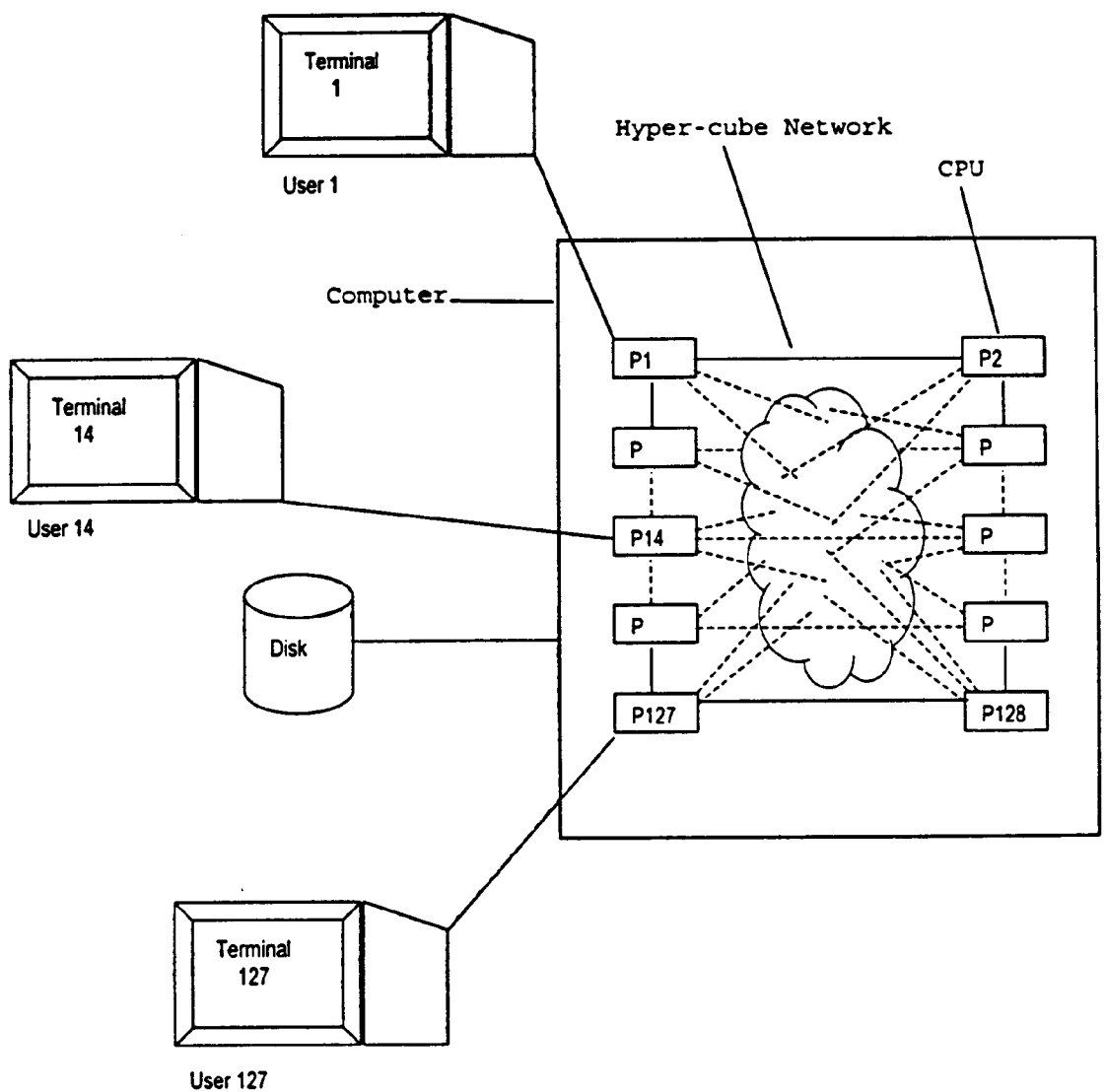
FIG. 66 diagram of hypercube network with terminals and disk storage for Example of Application 1.

FIG. 66 shows a parallel machine with 128 processors connected by a hypercube network. A powerful machine such as this could serve a great number of users simultaneously, but only three are depicted. Each of the terminals (numbered 1, 14, and 127) have allocated their respective processors 1, 14, and 127, and are conducting on-line accesses to a file located on disk in a hashed file with secondary keys stored in an Adapted parallel data-structure: the keys are stored in the memories of the various processors distributed throughout the hypercube on a parallel m-way search tree. Each processor has 16 Mega-bytes of memory. Each processor stores approximately $\frac{1}{128}$th of the file's keys in its local memory. If we assume that the search-tree can store each key using 20 bytes of memory (including pointers, indexes, etc.), and we also assume that each processor uses a maximum of approximately 1 Mega-byte of RAM, then approximately 50,000 keys may be stored on each processor: 50,000×128=6,400,000 keys may be stored in parallel memory. The same tree stored in a single processor's memory would require 128 Mega-bytes of memory and probably force the storage of the tree onto disk. In addition, each user on the system may search the tree simultaneously: little or no queuing will result from simultaneous accesses to the tree, unless more than 128 users are logged on.

(Note that FIG. 38 used for this example was designed for 3 processors in the General Example: the key ranges and size of the tree are accordingly small, and the processor numbers illustrated are different.) If we assume that the processors 1, 14, and 127 contain the search-tree nodes depicted in FIG. 38, then User 1 could request key 56, User 14 could request key 15, and User 127 could request key 10 simultaneously. Each processor would then access two nodes of its own locally stored tree to reach the bottom level, send requests for keys to other processors as necessary, and receive replies. The same values stored on a single-processor tree would require more accesses (a taller tree) and queuing. In either case the disk could be accessed after retrieval of the keys from the search tree, and the users would receive the appropriate records from disk.

Example of Application 2

Figure 67:
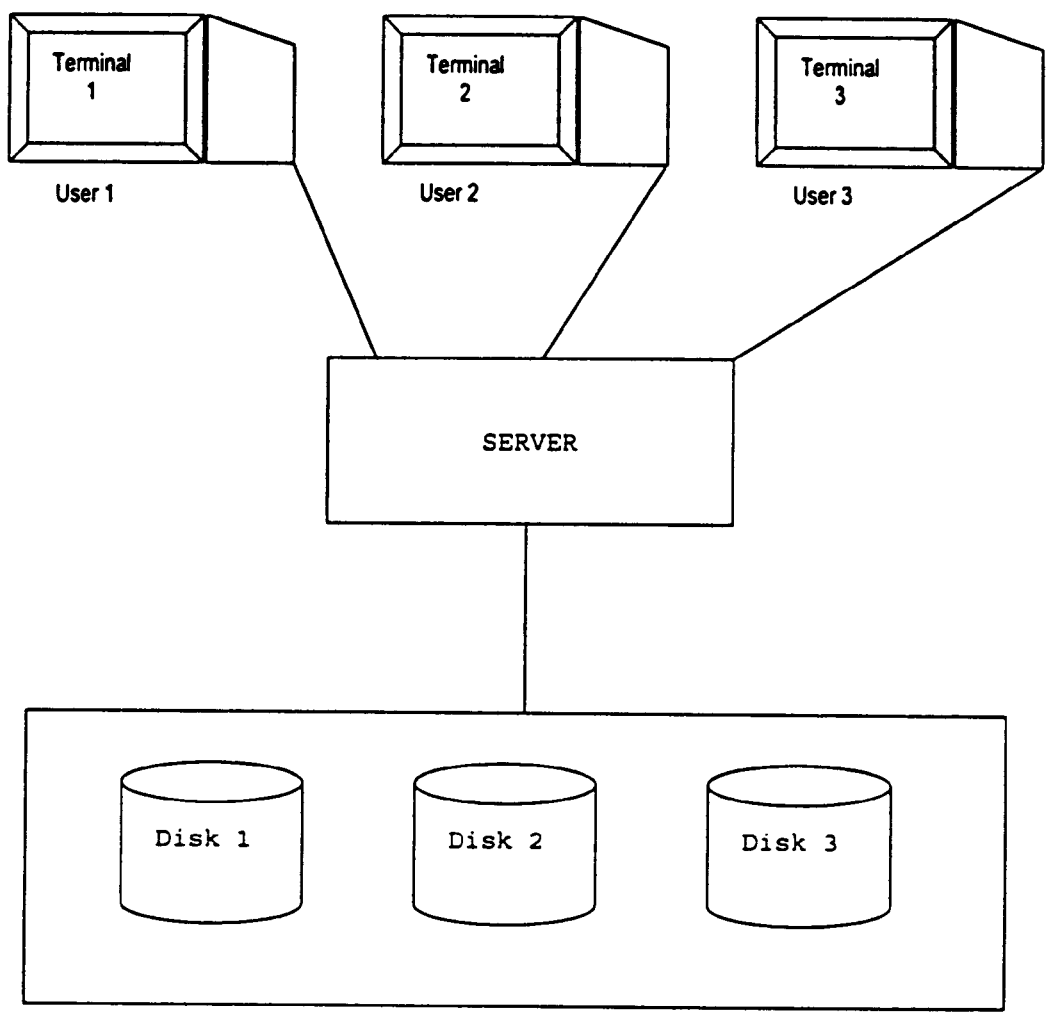
FIG. 67 diagram of distributed network showing three client terminals, one server and three disk-packs for Example of Application 2.

FIG. 67 shows three terminals connected to a server, the server is connected to three disk-packs. A parallel B-tree distributed amongst the three disk-packs can be accessed simultaneously by each user. If Users 1, 2 and 3 all make requests to access the B-tree index at the same time, then the server would have to queue these requests and distribute them among the disk-packs one-at-a-time. However, disk access is much slower than memory access, so the queuing and distribution of the requests in the server's memory might take 10 microseconds per request. Therefore, the last request to disk would be made 30 microseconds after the user made the request. If we assume that each key is stored on the fourth level down in the B-tree, and we assume that each disk access requires 10 milliseconds, then the last request for a key is fulfilled 40 milliseconds +30 microseconds after the request. If the B-tree were stored on a single disk, then in the worst case, each key request would take 10 milliseconds ×4 tree levels ×3 user-requests =120 milliseconds + queuing time.

The precise make-up of the two systems described above differs, but in each case the work is successfully distributed amongst processing-elements, giving better response time. The times suggested and precise make-up of the systems depicted are given only for the purpose of example. The times given are estimates and the calculations are simple illustrations of the functioning of the types of systems that could make use of the Adapted data-structures.

Conclusion, Ramifications and Scope

Thus the reader can see the results of combining the various aspects of this method of creating and using parallel data-structures. The present invention provides a great variety of possible combinations of rules for fullness of nodes, range determination, parallel and global node definition, and data distribution such that each aspect of the invention, in addition to others not listed, may be used in combination with one or more of the others, or alone, to enhance performance of the parallel data structures and define new data-structures, including parallel forms of serial data-structures and many others.

The combinations of components in the embodiments herein are not the only combinations possible. Not only are different combinations possible, but different instances of the components themselves, such differences exemplified by the various rules for fullness, ordering schemes, and range calculations described and contrasted in this application, though not limited to those descriptions or those components.

While my description above contains many specifics, these should not be construed as limitations on the invention, but rather as an exemplification of preferred embodiments thereof. Many other variations are possible. Accordingly, the scope of the invention should not be limited to the embodiments illustrated; the scope of the invention should be determined by the appended claims and their legal equivalents.

I claim:

1. A method of maintaining order for data on a computer system by creating a parallel data-structure, said data stored on one or more memory storage means, accessed by one or more processing elements, said order represented either explicitly or implicitly as a graph or graphs containing nodes that represent sets of data values grouped into ranges and incident links that represent logical relationships between said sets of data values, the nodes and links either explicitly or implicitly stored on said memory storage means, said memory storage means and said order maintained by said processing elements, i. wherein said memory storage means is divided into logically corresponding storage units or partitions, said partitions defined by a parallel storage location of said nodes on said memory storage means, and ii. wherein one form of said logical relationship is a serial or local relationship relating two Or more differing said ranges to each other according to their differences, said local relationships relating said ranges within said partition of said memory storage means, and iii. wherein a second form of said logical relationship is a global relationship relating two or more similar said ranges to each other according to their similarity or commonality, said global relationships relating said ranges between multiple said partitions, and iv. wherein said nodes form individual nodes having said local relationships with other said individual nodes with different said ranges, said individual nodes also referred to as parallel nodes, and v. wherein said nodes form global nodes comprising multiple said individual nodes having said global relationships with other said individual nodes, said global nodes thereby comprising multiple said individual nodes with the similar or common said ranges, each said individual node within a given said global node having the common range, such that said global node is a composite of said individual nodes, the method comprising the steps of:

a. determining said ranges for said sets of data values, b. assigning said ranges to said nodes and assigning said sets of data values to said nodes by determining the ranges into which they fall, c. positioning said individual nodes within said order using said links by determining said local relationships and said global relationships between said ranges, d. storing said nodes in different portions of said memory storage means such that said ranges with said commonality are stored on multiple said individual nodes, each said individual node with the common said range stored in a different said portion thereby defining said partitions and said global nodes comprising a plurality of said individual nodes, and thereby storing said local relationships as explicit or implicit said links within said partition and said global relationships across multiple said partitions, whereby a combination of the local and global relationships creates a composite global data-structure comprising multiple serial or local data-structures, and whereby said data is maintained in said order on each of said partitions in a uniform manner and on all of said memory storage means combined, and a plurality of system processes are enabled to access the data values simultaneously by accessing said individual nodes in a given said partition of choice, thus gaining access to said global node having desired said range and to the global data-structure as a whole.

2. A method as recited in claim 1 wherein said order is expressed as a plurality of separate said graphs, each said graph stored separately within said memory storage means, each said graph arranged by arranging rules of an adapted sequential data-structure, thus creating said parallel data-structure capable of the same functions as said sequential data-structure in a distributed environment.

3. A method as recited in claim 2 wherein each said individual node contained in a given said global node has an identical said range to all other said individual nodes in the given global node and wherein all the logical relationships between all said individual nodes belonging to the given global node and all said individual nodes belonging to another said global node are identical.

4. A method as recited in claim 2 wherein said memory storage means is composed of a plurality of disks, and said order is defined by a set of rules for maintaining a serial b-tree as adapted to function using said ranges in a parallel environment, thus creating a plurality of b-trees located on said disks, each said b-tree represented as a separate said graph composed of said individual nodes, every said individual node contained on a given said portion of said disks belonging to a different said global node from all other said individual nodes contained on the given portion of said disks.

5. A method as recited in claim 2 wherein the plurality of separate said graphs is created and maintained by the present method and each of said separate graphs has an identical structure as every other said separate graph, said structure defined by an identical positioning of each said individual node contained in a given said global node to each other said individual node contained in each adjacent said global node, that is, each said individual node belonging to the given said global node holds the same position within each said separate graph as every other said individual node belonging to the given said global node holds in its said separate graph, whereby each said separate graph is identical in form and function to each other said separate graph and is thus able to function as a separate data-structure on a single said processing element and is also able to be combined with the other said separate graphs and function as said parallel data-structure on multiple said processing elements.

6. A method as recited in claim 1 further employing the steps of:

a. identifying where said range is too broad for a given said global node thereby indicating a need to split said range, b. upon the indication of need to split said range, splitting said range by performing the range determination on the range being split and adjusting adjacent said ranges as necessary thereby creating at least one new said range, assigning the new range or ranges to a new said global node or nodes and performing the positioning to position the new nodes and existing nodes as necessary using said links thereby adding the new nodes to said order and maintaining said order, c. identifying where said range is too narrow for a given said global node thereby indicating a need to broaden said range, d. upon the indication of need to broaden said range, performing the range determination to adjust said ranges for adjacent said ranges as necessary, removing the global node containing the too narrow range if necessary, and performing the positioning as necessary to reconfigure said links for remaining said nodes thereby removing appropriate said nodes from said order and maintaining said order, e. upon the indication that said range or ranges are too broad or too narrow, adjusting said range or ranges by performing the range determination thereby adjusting said range or ranges to proper breadth, whereby said order is manipulated using said ranges, and said logical relationships are manipulated as necessary to change data storage patterns while maintaining said order of said data.

7. A method as recited in claim 6 wherein the range split is performed by creating a new dependent range, said new dependent range based on the range being split, at least a portion of said new dependent range being beyond the range being split thus representing an extension of the range being split and narrowing the range being split by combining the ranges, whereby the range being split is narrowed by combining the range being split with said new dependant range, the combination of two ranges representing the combination of two restrictions and therefore becoming more restrictive or narrower.

8. A method as recited in claim 6 wherein the identification that the range is too broad is achieved by a rule for fullness of said global nodes that employs a measurement of the number and positions of the data values within said global node, the identification of the too broad range defined by an excess of the data values, said excess indicating that said global node is sufficiently full for the range split and thus for the addition of the new node, and wherein the identification that the range is too narrow is performed by the measurement of the number and positions of the data values within said global node, the identification of the too narrow range defined by an insufficiency of the data values, said insufficiency indicating that said global node is sufficiently empty for the removal of the node, and further employing the steps of:

a. locating a proper said global node with a proper said range to contain desired said data values by traveling along said links and choosing a path through said links, said path determined by using said ranges assigned to said global nodes, b. upon determination of the proper global node, determining proper said individual node within the proper global node to contain a given said data value, c. upon determination of the proper individual node, adding or removing said given data value to or from the proper individual node thereby adding or removing the given data value to or from the proper global node, d. upon the addition or removal of the given data value, determining if the proper global node is sufficiently full or sufficiently empty, e. upon determination that the proper global node is sufficiently empty for the global node removal, performing the global node removal wherein the global node removal redistributes the data values as necessary within their respective said ranges, f. upon determination that said global node is sufficiently full for the global node addition, performing the global node addition wherein the global node addition splits the range of the sufficiently full global node and redistributes the data values as necessary within their respective said ranges thereby splitting the sufficiently full global node and adding said new global node or nodes to said order.

9. A method as recited in claim 8 wherein said parallel data-structure is adapted from a set of ordering rules of a sequential data-structure and wherein said parallel data-structure is maintained by said processing elements as controlled by a parallel maintenance process adapted from a sequential algorithm for maintaining said sequential data-structure by utilizing the same said ordering rules applied to said ranges rather than applied to individual said data values.

10. A method as recited in claim 9 wherein the data maintained are ordinal and wherein said ranges defined for said global nodes are unique, non overlapping said ranges covering the expanse of said data.

11. A method as recited in claim 10 wherein the method is used to maintain key values on a distributed database that are accessed by said plurality of system processes or a plurality of users.

12. A method as recited in claim 1 wherein said global relationships are expressed by a specific said parallel storage location of said nodes within said memory storage means such that a first memory address allocated for a first said individual node is used to derive a second memory address allocated for a second said individual node within the same said global node, whereby locating one said individual node within a given said global node enables said processing elements to easily derive the locations of other said individual nodes within said global node.

13. A method as recited in claim 1 further employing a set of rules for arranging the data values within said global nodes to provide efficient locating means to locate within said memory storage means an exact said individual node contained in said global node that could contain a given said data value within said range.

14. A machine to maintain an order for data on a computer system containing one or more processing means, one or more memory storage means, and communication means linking said processing means and said memory storage means to form said computer system comprising:

a. range determination means to group said data into ranges, each said range capable of being arranged in a sequence or sequences with other said ranges such that said range determination means groups said data into multiple said ranges and such that said sequences between said ranges thereby arrange the data said ranges contain, b. distribution means to subdivide and distribute each said range to subsets that define subdivisions stored on multiple parallel or individual nodes on said memory storage means, c. composite global nodes containing the distribution of a given said range, said global node comprising multiple said individual nodes, each said individual node storing a portion of said range defined by said subdivision, d. relation means to define logical relationships between said global nodes and logical relationships within said global nodes by said ranges, wherein said logical relationship between said global nodes is defined by a difference between said ranges, such that if said relation means compares a given said global node with another said global node or their component said individual nodes, then said relation means achieves equivalent comparison results indicating said difference between said ranges, and wherein said logical relationship within said global node is defined by a commonality, such that component said individual nodes contained within said global node all have the same said logical relationship indicating said commonality in said range, such that said processing means are enabled to arrange said individual nodes with each other using said differences and enabled to arrange said individual nodes within said global nodes using said commonality, whereby said order is expressed by grouping said data into said ranges and defining said logical relationships between said ranges, and whereby said ranges are able to be distributed within said computer system creating an arrangement of said data providing the order for said data such that it is easily accessed and maintained by multiple system processes.

15. A machine as recited in claim 14 wherein said subdivisions are grouped into separate sets, each said set having its own valid said logical relationships between said subdivisions and therefore between said ranges, said individual nodes, and said global nodes, each said separate set defining a separate graph stored on a division of said memory storage means, thereby creating a plurality of said separate graphs, each said separate graph expressing said order, and all of said separate graphs together expressing said order thereby creating a parallel data-structure, and further including:
  a. individual access means providing an access to an individual said separate graph as an individual expression of said order, said separate graph accessed as a valid separate data-structure, and
  b. parallel access means to access multiple said separate graphs together as parallel expressions of said order wherein the access to the individual said separate graph enables access to other said separate graphs, thereby accessing multiple said separate graphs together as said parallel data-structure,
whereby a plurality of said processing means, system processes or users are enabled to efficiently access said data through said separate graphs using separate access paths and accessing separate parts of said memory storage means to achieve consistent results.

16. A machine as recited in claim 15 further comprising:
  a. range measurement means to determine if said ranges need adjustment providing said range determination means with cause to regroup said data,
  b. range addition and removal means to add new said ranges and remove old said ranges to and from said graphs wherein said old ranges are deleted or merged with other said ranges, and said new ranges are derived or split from said old ranges and added in addition to said old ranges, and
wherein said range measurement means determine if the ranges must be added or removed, said range addition and removal means add or remove said ranges, said distribution means redistribute the data defined by said ranges as necessary, and said relation means reconfigure said separate graphs by adjusting the logical relationships between said ranges,
whereby said processing means are enabled to alter a configuration of said parallel data-structure while maintaining said order.

17. A machine as recited in claim 15 wherein said distribution means distributes the data to provide said processing means a plurality of dynamically chosen access paths to a given said subdivision or distributed part of range for use by the parallel and individual access means,
whereby said processing means are enabled to choose freely which said separate graph to use for access, accessing a chosen said separate graph until a given said distributed part of range is required, and
whereby said processing means are enabled to efficiently distribute work through the free choice of which said separate graph to use for access to said data.

18. A machine as recited in claim 16 wherein said individual access means searches a given said separate graph for a desired said range thereby identifying a proper said global node to contain the desired range whereupon said parallel access means locates a proper said subdivision or subdivisions within said proper global node, said proper subdivisions partially or completely containing the desired range, the identification of the desired range allowing access to desired said data whereupon said processing means uses said data and may therefore have need to alter said order, the alteration of said order is accomplished by using said range measurement means and said range addition and removal means thereby creating a parallel maintenance program executed by said processing means for maintaining said parallel data-structure.

19. A machine as recited in claim 16 wherein the range addition means divides an existing said range into sub ranges thereby creating said new ranges, and said distribution means includes an efficient ordering scheme to redistribute said data contained in the existing range to the new range or ranges, thereby creating one or more new said global nodes.

20. A machine as recited in claim 18 wherein said parallel maintenance program is adapted from a serial maintenance program for maintaining a serial data-structure, said parallel maintenance program creating said parallel data-structure and utilizing said ranges such that it functions as the adapted serial data-structure in a parallel environment.

21. A machine as recited in claim 14 wherein said memory storage means comprises a plurality of memory storage units and wherein said individual nodes are distributed among said plurality of memory storage units and linked by said relation means to form a parallel data-structure.

22. A machine as recited in claim 21 wherein said processing means comprises a plurality of processing elements, each said processing element containing a maintenance program for controlling said memory storage means, each said processing element able to control one said memory storage unit at a time and able to cooperate with other said processing elements to control multiple said memory storage units using said maintenance program, the plurality of maintenance programs thereby combining to form a parallel maintenance program,
whereby said parallel maintenance program controls and orders said data through control of said parallel data-structure.

23. A machine as recited in claim 22 wherein said parallel maintenance program is adapted from a serial maintenance algorithm, said parallel maintenance program functioning through the use of said ranges, said ranges used as parallel embodiments of the data used in said serial maintenance algorithm.

24. An article of manufacture for a computer system, said computer system comprising a memory means and processing means, said processing means comprising one or more processing elements, said processing elements able to access said memory means as one or more logically corresponding storage locations or memory units, said article controlling an ordering of data on said computer system through a parallel storage of said data defining a parallel data structure, said article comprising:
  a. range determination rules that enable said computer system to group said data into sets according to ranges of said data, said range determination rules able to define multiple said sets with equivalent said ranges,
  b. data storage entity definition rules that enable said computer system to define data storage entities that contain part of said data as defined by said range,
  c. parallel node definition rules that enable said computer system to define parallel nodes, said parallel nodes containing one or more said data storage entities, said parallel nodes defined by said ranges indicating the data values that said parallel node is able to contain,
  d. composite global node definition rules that define global nodes as composites of said parallel nodes, said global nodes comprising multiple said parallel nodes with a sufficient commonality in said ranges, said parallel nodes having said commonality in said ranges being therefore within the same said global node, said parallel nodes having a difference in said ranges between said parallel nodes being therefore within separate said global nodes where said difference produces sufficient distinction between said sets, said parallel nodes within the same said global node stored on logically corresponding said memory units, e. range relation rules that enable said computer system to logically relate said ranges and thereby relate said sets, said data and said parallel nodes, said range relation rules determining said commonality and said difference, whereby said ranges are logically related to each other thereby relating said sets, said parallel nodes, and the data values, and whereby the relations between said parallel nodes create a plurality of serial data structures linked by the commonality of ranges that defines said global nodes, thus expressing said ordering of data by creating the parallel or global data structure as a composite of said serial data structures, and thus providing parallel and global means to control the data structures.

25. An article as recited in claim 24 further including:
   a. global node creation means that creates and defines said global node by grouping together said parallel nodes that are related by said commonality in ranges,
   b. global node relation rules that utilize said range relation rules to logically relate said global nodes to each other,
whereby said computer system is enabled to globally manipulate said global nodes on said memory means.

26. An article as recited in claim 25 further including:
   a. adjustment need rules that determine a need for adjustment to said ranges to maintain said order for said data,
   b. range adjustment rules that enable said computer system to adjust said ranges, changing the breadth of said ranges,
wherein said range relation rules are used to adjust the logical relationships to appropriately relate the adjusted ranges,
whereby said processing means are enabled to alter a first expression of said order to produce a second expression of said order while maintaining the rules that define said order for both of the expressions, and
whereby changing the data organized in said order results in a change in a given expression of said order while maintaining the rules that define said order.

27. An article as recited in claim 26 wherein said range relation rules further define said commonality to produce equivalent comparison results indicating said commonality when comparing one said parallel node within a given said global node to any of said parallel nodes within the same said global node, and further define said differences to produce equivalent comparison results indicating said differences when comparing one said parallel node within a given said global node to any of said parallel nodes within a separate said global node, and wherein said range adjustment rules contain range addition and removal rules to add new said ranges to said order and remove old said ranges from said order, adding new said parallel nodes and removing old said parallel nodes as necessary, and adjusting the logical relationships as necessary.

28. An article as recited in claim 26 wherein said computer system defines said order by using said commonality and said difference to create a parallel expression of a serial data structure with its own rules of ordering, thus defining said parallel data structure, said parallel data structure comprising a plurality of separate said serial data structures related to each other by said commonality in ranges and configured by the rules of ordering said serial data structures.

29. An article as recited in claim 26 wherein said computer system defines said order by using said commonality and said difference to create a plurality of separate data structures stored separately on said memory units, each said separate data structure identical in configuration to each other said separate data structure.

30. An article as recited in claim 27 wherein the range addition is accomplished by splitting said old range into two or more said new ranges, said new ranges being equal to said old range when combined, said new ranges defined such that each has an ordinal range relationship to each other, and wherein said range relation rules relate the ranges in said order to each other by said ordinal range relationship.

31. An article as recited in claim 30 further including:
   a. find global node means by which said order is searched for a desired said range by using said range relation rules,
   b. add to global node means that adds the data values to said global nodes,
   c. remove from global node means that removes the data values from said global nodes,
wherein locating the desired range allows access to a proper said global node to contain a given value of said data, and upon the locating, the data values are added to or removed from the proper global node altering the global node contents as necessary, and said adjustment need rules determine if the alteration of the global node contents results in said need for adjustment, whereupon said ranges are adjusted and the relationships are altered as necessary.

32. An article as recited in claim 31 wherein the logical relationships, said find global node means, the addition of new parallel nodes and the removal of old parallel nodes are adapted parallel versions of a search algorithm, logical relation rules, node or data addition rules and node or data removal rules of a serial data structure,
whereby said parallel data structure is a parallel version of said serial data structure created and maintained in a parallel or distributed environment, said parallel data structure accomplishing the same goals as said serial data structure.

33. An article as recited in claim 31 wherein said ranges are non overlapping ranges that relate to each other in the same fashion as the data values properly contained in said ranges such that said range relation rules express the similarity in relationships to create said parallel data structure.

34. An article as recited in claim 24 wherein said range determination rules and said range relation rules create the range definitions with a wide variety of uses, the range definitions creating complex ranges, said complex ranges defining complex sets, said complex ranges calculated using said data in such a way that a given value of said data can have membership in multiple said complex sets, said multiple complex sets intersecting each other where said multiple complex sets contain the data value with membership in said multiple complex sets.

35. An article as recited in claim 34 wherein said complex ranges are used to create said parallel data structure such that it has at least two dimensions, and wherein each said complex set is organized for access by a different aspect of the data values stored in said parallel data structure.

36. An article as recited in claim 35 wherein said parallel nodes related by said commonality in ranges are said complex sets of said parallel nodes, and wherein each said complex set of parallel nodes creates a complex said global node, said complex global nodes related to each other by said range relation rules.

* * * * *